(12) United States Patent
Braun et al.

(10) Patent No.: US 8,689,202 B1
(45) Date of Patent: Apr. 1, 2014

(54) SCHEDULING OF INSTRUCTIONS

(75) Inventors: Gunnar Braun, Aachen (DE); Andreas Hoffmann, Herzogenrath (DE); Volker Grieve, Aachen (DE); Manuel Hohenauer, Krefeld (DE); Rainer Leupers, Dorsten (DE)

(73) Assignee: Synopsys, Inc., Mountain View, CA (US)

( * ) Notice: Subject to any disclaimer, the term of this patent is extended or adjusted under 35 U.S.C. 154(b) by 1293 days.

(21) Appl. No.: 11/096,184

(22) Filed: Mar. 30, 2005

Related U.S. Application Data

(60) Provisional application No. 60/558,334, filed on Mar. 30, 2004.

(51) Int. Cl.
*G06F 9/45* (2006.01)

(52) U.S. Cl.
USPC ........................................................ 717/161

(58) Field of Classification Search
USPC ............. 717/161, 141, 140, 151, 159, 149, 9, 717/160; 718/102; 370/316
See application file for complete search history.

(56) References Cited

U.S. PATENT DOCUMENTS

| | | | |
|---|---|---|---|
| 5,167,023 A | 11/1992 | de Nicolas et al. | |
| 5,819,088 A * | 10/1998 | Reinders | 717/149 |
| 5,822,745 A | 10/1998 | Hekmatpour | |
| 5,854,929 A | 12/1998 | Van Praet et al. | |
| 5,870,768 A | 2/1999 | Hekmatpour | |
| 5,884,060 A * | 3/1999 | Vegesna et al. | 712/215 |
| 5,887,174 A * | 3/1999 | Simons et al. | 717/161 |
| 5,894,576 A * | 4/1999 | Bharadwaj | 717/156 |
| 5,918,035 A | 6/1999 | Van Praet et al. | |
| 5,933,641 A | 8/1999 | Ma | |
| 5,966,537 A | 10/1999 | Ravichandran | |
| 6,049,866 A | 4/2000 | Earl | |
| 6,055,370 A | 4/2000 | Brown et al. | |
| 6,152,612 A | 11/2000 | Liao et al. | |
| 6,199,152 B1 | 3/2001 | Kelly et al. | |
| 6,247,174 B1 | 6/2001 | Santhanam et al. | |
| 6,305,014 B1 * | 10/2001 | Roediger et al. | 717/154 |
| 6,405,351 B1 | 6/2002 | Steiss et al. | |
| 6,434,590 B1 * | 8/2002 | Blelloch et al. | 718/102 |
| 6,463,582 B1 | 10/2002 | Lethin et al. | |
| 6,467,082 B1 | 10/2002 | D'Arcy et al. | |
| 6,526,570 B1 | 2/2003 | Click, Jr. et al. | |
| 6,606,588 B1 | 8/2003 | Schaumont et al. | |

(Continued)

FOREIGN PATENT DOCUMENTS

EP 490478 A2 6/1992

OTHER PUBLICATIONS

Keith D. Cooper, Phillip J. Schielke, Devika Subramanian, "An Experimental Evaluation of List Scheduling", 1998.*

(Continued)

*Primary Examiner* — Tuan A Vu
(74) *Attorney, Agent, or Firm* — Fenwick & West LLP

(57) ABSTRACT

A method of automatically extracting information from an architecture description. A memory resident directed acyclic graph data structure comprising nodes representing instructions and edges whose weights represent dependencies between pairs of instructions is constructed. A list of ready nodes are maintained in the directed acyclic graph. A list of nodes not scheduled is maintained. And, it is determined whether the next instruction to be scheduled is to be taken from the list of ready nodes or from the list of nodes not yet scheduled.

15 Claims, 24 Drawing Sheets

(56) References Cited

U.S. PATENT DOCUMENTS

| | | | |
|---|---|---|---|
| 6,606,734 | B2 | 8/2003 | Greaves |
| 6,675,380 | B1 * | 1/2004 | McKinsey et al. ............ 717/161 |
| 6,681,383 | B1 | 1/2004 | Pastor et al. |
| 6,704,925 | B1 | 3/2004 | Bugnion |
| 6,708,329 | B1 | 3/2004 | Whitehill et al. |
| 6,769,115 | B1 | 7/2004 | Oldman |
| 6,772,106 | B1 | 8/2004 | Mahlke et al. |
| 6,920,550 | B2 | 7/2005 | Des |
| 6,968,546 | B2 | 11/2005 | Lueh |
| 7,006,960 | B2 | 2/2006 | Schaumont et al. |
| 7,007,271 | B2 * | 2/2006 | Kumar et al. ................. 717/151 |
| 7,047,394 | B1 | 5/2006 | Van Dyke et al. |
| 7,062,724 | B2 | 6/2006 | Nakajima |
| 7,065,719 | B2 | 6/2006 | Nakajima |
| 7,085,702 | B1 | 8/2006 | Hwang et al. |
| 7,107,580 | B2 | 9/2006 | Zemach et al. |
| 7,113,901 | B1 | 9/2006 | Schaumont et al. |
| 7,155,690 | B2 | 12/2006 | Yamashita et al. |
| 7,237,207 | B2 | 6/2007 | Panditharadhya et al. |
| 7,313,773 | B1 | 12/2007 | Braun et al. |
| 7,324,931 | B1 | 1/2008 | Warlock |
| 7,373,638 | B1 | 5/2008 | Schliebusch et al. |
| 7,559,050 | B2 | 7/2009 | Burger |
| 7,707,507 | B1 | 4/2010 | Rowe et al. |
| 7,805,690 | B2 | 9/2010 | Willis |
| 8,006,225 | B1 | 8/2011 | Braun et al. |
| 2002/0013937 | A1 * | 1/2002 | Ostanevich et al. ............... 717/9 |
| 2002/0042908 | A1 * | 4/2002 | Ito et al. ........................ 717/149 |
| 2002/0133810 | A1 | 9/2002 | Giles et al. |
| 2002/0147969 | A1 | 10/2002 | Lethin et al. |
| 2003/0061580 | A1 | 3/2003 | Greaves |
| 2003/0126563 | A1 | 7/2003 | Nakajima |
| 2003/0188299 | A1 * | 10/2003 | Broughton et al. ............ 717/141 |
| 2003/0200511 | A1 | 10/2003 | Nakajima |
| 2003/0200539 | A1 * | 10/2003 | Fu et al. ........................ 717/161 |
| 2004/0123249 | A1 | 6/2004 | Sato et al. |
| 2005/0125786 | A1 * | 6/2005 | Dai et al. ....................... 717/161 |
| 2005/0216899 | A1 * | 9/2005 | Muthukumar et al. ........ 717/151 |
| 2006/0190909 | A1 | 8/2006 | Nakajima |
| 2006/0195812 | A1 | 8/2006 | Nakajima |
| 2007/0157138 | A1 | 7/2007 | Ciolfi et al. |
| 2007/0198971 | A1 * | 8/2007 | Dasu et al. .................... 717/140 |

OTHER PUBLICATIONS

Mark Smotherman, Efficient Dag Construction and Heuristic Calculation for Instruction Scheduling, 1991, ACM Proceedings of the 24th annual international symposium on Microarchitecture, pp. 93-102.*

Sanjay M. Krishamurthy, A Brief Survey of Papers on Scheduling for Pipelined Processors, 1990, ACM SIGPLAN Notices, vol. 25, Issue 7, pp. 97-106.*

Baev, Ivan D. and Meleis, Waleed M. and Abraham, Santosh G., Backtracking-Based Instruction Scheduling to Fill Branch Delay Slots, 2002, Springer Netherlands, International Journal of Parallel Programming, vol. 30, issue 6, pp. 397-418.*

Krishnan Kailas, Ashok Agrawala, CARS: A new code generation framework for clustered ILP processors, 2001, High-Performance Computer Architecture, 2001. HPCA. The Seventh International Symposium, pp. 133-143.*

0. Wahlen et al.; "Extraction of Efficient Instruction Schedulers From Cycle-True Processor Models"; Integrated Signal Processing Systems, Aachen University of Technology, Aachen Germany; CoWare Inc., Aachen Germany; Advanced Algorithms; Infineon Technologies, Germany; 7th International Workshop on Software and Compilers for Embedded Systems (SCOPES), Vienna Austria; Sep. 2003.

O. Wahlen et al.; "Using Virtual Resources for Generating Instruction Schedulers"; Integrated Signal Processing Systems, Aachen University of Technology, Aachen Germany; Nov. 2002, Workshop on Application Specific Processors (WASP) at Micro-35, Istanbul Turkey.

S. Abraham; "Efficient Backtracking Instruction Schedulers"; Hewlett-Packard Company 2000; www.hpl.hp.com/techreports/2000/HPL-2000-56.html.

P. Paulin; "Towards Application-Specific Architecture Platforms : Embedded Systems Design Automation Technologies"; In Proc. of the EuroMicro, Apr. 2000.

D. Lanneer et al.; "Chess: Retargetable Code Generation for Embedded DSP Processors"; VLSI Systems & Design Methodologies Division, IMEC, Leuven, Belguim; In P. Marwedal and G. Goossens, editors, Code Generation for Embedded Processors; Kluwer Academic Publishers; 1995.

G. Hadjiyiannis et al.; "ISDL: An Instruction Set Description Language for Retargetability" ; In Proc. of the Design Automation Conference (DAC); Jun. 1997.

O. Wahlen et al.; "Instruction Scheduler Generation for Retargetable Compilation"; In IEEE Design & Test of Computers; Jan. 2003.

W. Qin et al.; "Flexible and Formal Modeling of Microprocessors With Application to Retargetable Simulation"; In Proc. of the Conference on Design, Automation & Test in Europe (DATE); Mar. 2003.

X. Nie et al.; "A New Network Processor Architecture for High-Speed Communications"; In Proc. of the IEEE Workshop on Signal Processing Systems (SIPS); pp. 548-557; Oct. 1999.

M. Itoh et al.; "PEAS-III: An ASIP Design Environment"; In Proc. of the Int. Conference on Computer Design (ICCD); Sep. 2000.

A. Halambi et al.; "Expression" A Language for Architecture Exploration Through Compiler/Simulator Retargetability; In Proc. of the Conference on Design, Automation & Test in Europe (DATE); Mar. 1999.

P. Grun et al.; "RTGEN: An Algorithm for Automatic Generation of Rerservation Tables From Architectural Descriptions"; In Proc. of the Int. Symposium on System Synthesis (ISSS) pp. 44-50; 1999.

A. Fauth et al.; "Describing Instruction Set Processors Using nML"; In Proc. of the European Design and Test Conference (ED&TC); Mar. 1995.

D.G. Bradlee et al.; "The Marion System for Retargetable Instruction Scheduling"; In Proc. of the Int. Conf. on Programming Language Design and Implementation (PLDI); pp. 229-240, 1991.

O Wahlen et al.; "Application Specific Compiler/Architecture Codesign: A Case Study"; In Proc. of the Joined Conference on Languages, Compilers and Tools for Embedded Systems (LCTES) and Software and Compilers for Embedded Systems (SCOPES), Jun. 2002.

R. Leupers et al.; "Retargetable Code Generation Based on Structural Processor Descriptions"; Design Automation for Embedded Systems; 3(1):1-36, Jan. 1998'; Kluwer Academic Publishers.

Schliebusch, et al. Architecture Implementation Using the Machine Description Language Lisa. In Proc. of the ASPDAC, Jan. 2002.

G. Araujo: Code Generation Algorithms for Digital Signal Processors, Ph.D. thesis, Princeton University, Department of Electrical Engineering, Jun. 1997.

C.W. Fraser, D.R. Hanson, T.A. Proebsting: Engineering A Simple, Efficient Code Generator Generator, ACM Letters on Programming Languages and Systems, vol. 1, No. 3, Sep. 1992.

J. Van Praet D. Lanneer, G. Goossens, W. Geurts, H. De Man: A Graph Based Processor Model for Retargetable Code Generation, European Design and Test Conference (ED & TC), 1996.

R. Leupers, P. Marwedel: Retargetable Generation of Code Selectors From HDL Processor Models, European Design & Test Conference (ED & TC), 1997.

A. Nohl and V. Greive et al. Instruction Encoding Synthesis for Architecture Exploration Using Hierarchical Processor Models. In Proc. of the DAC, Jun. 2003.

A. Nohl, G. Braun, et al. A Universal Technique for Fast and Flexible Instruction-Set Archhitecture Simulation. In Proc. of the DAC, Jun. 2002.

P. Mishra, N. Dutt, and A Nicolau. Functional Abstraction Driven Design Space Exploration of Heterogeneous Programmable Architectures. In Proc. of the ISSS, Oct. 2001.

M. Itoh, M. !Imai et al. Peas-III: An ASIP Design Environment. In Proc. of the ICCD, Sep. 2000.

M. Hartoog, J.A. Rowson et al. Generation of Software Tools From Processor Descriptions for Hardware/Software Codesign. In Proc. of the DAC, Jun. 1997.

(56) References Cited

OTHER PUBLICATIONS

A. Hoffmann, T. Kogel et al. A Novel Methodology for the Design of Application-Specific Instruction-Set Processors (ASIP) Using a Machine Description Language. IEEE Transactions on Computer-Aided Design, Nov. 2001.
P. Viana, E. Barros, S. Rigo, R.J. Azevedo, G. Araujo: Exploring Memory Hierarchy With ARCHC, 15th Symposium on Computer Architecture and High Performance Computing (SBAC), 2003.
W. Qin, S. Malik, Flexible and Formal Modeling of Microprocessors With Application to Retargetable Simulation, Design, Automation, and Test in Europe (DATE), Mar. 2003.
S. Hanono, S. Devadas: Instruction Selection, Resource Allocation, and Scheduling in the AVIV Retargetable Code Generator, 35th Design Automation Conference (DAC), 1998.
A.V. Aho, M. Ganapathi, S.W.K. Tjiang: Code Generation Using Tree Matching and Dynamic Programming, ACM Trans. on Programming Languages and Systems 11, No. 4, Oct. 1989.
C. Liem, P. Paulin, M. Cornero, A. Jerraya: Industrial Experience Using Rule-Driven Retargetable Code Generation for Multimedia Applications, 8th Int. Symp. On System Synthesis (ISSS), 1995.
S. Weber, K. Keutzer et al. Multi-View Operation-Level Design-Supporting the Design of Irregular ASIPS. Technical Report UCG/ERL M03/12, UC Berkeley, Apr. 2003.
L. Nowak: Graph Based Retargetable Microcode Compilation in the Mimola Design System, Association for Computing Machinery (ACM), 1987.
Kobayashi, S. et al: Design Space Exploration for DSP Applications Using the ASIP Development System Peas-III, Dept. of Informatics and Mathematical Science, Graduate School of Engineering Science, Osaka University, 2002.
Gonzalez, R.: Xtensa: A Configurable and Extensible Processor, IEEE Micro, 2000.
X. Nie and L. Gazi. A New Network Processor Architecture for High-Speed Communications. In Proc. Of the SIPS, 1999.
Kitajima et al. "Design of Application Specific CISC using Peas-III", 2002, IEEE, pp. 1-7.
Pasricha et al. "A Framework for GUI-driven Design Space Exploration of a MIPS4K-like Processor", Apr. 2003, University of California, Irvine, pp. 1-26.
Qin et al., "Architecture Description Languages for Retargetable Compilation", 2002, CiteSeerX, pp. 1-33.
Bayoumi, M.A. et al., "SPHINX: A High Level Synthesis System for DSP Design", IEEE, 1992, pp. 172-175.
Bedichek, R., "Some Efficient Architecture Simulation Techniques," 1990, 12 pages.
Bjornsen, J. et al., "Behavioral Modeling and Simulations of High-Speed Analog-to-Digital Converters Using System C", IEEE, 2003, pp. III-906-III-909.
Blank, C. et al., "Symbolic Simulation Techniques- State-of-the-art and Applications", IEEE, 2001.
Proceedings of Sixth IEEE International High-Level Design Validation and Test Workshop, 2001, pp. 45-50.
Braun, G. et al., "Using Static Scheduling Techniques for the Retargeting of High Speed, Compiled Simulators for Embedded Processors From an Abstract Machine Description," In Proc. of the Int. Symposium on System Synthesis, 2001, pp. 57-62.
Cmelik, B. et al. "Shade: A Fast Instruction-Set Simulator for Execution Profiling," ACM 1994, pp. 128-137.
Coppola, M. et al., "IPSIM: SystemC 3.0 Enhancements for Communication Refinement," Proceedings of the Design, Automation and Test in Europe Conference and Exhibition (Date '03), 2003, pp. 106-111.
Duncan, A.A. et al., "The COBRA-ABS High-Level Synthesis System for Multi-FPGA Custom Computing Machines", IEEE Transactions on Very Large Scale Integration (VLSI) Systems, vol. 9, No. 1, Feb. 2001, pp. 218-223.
Ebciouglu, K. et al. "Dynamic Binary Translation and Optimization," IEEE Transactions on Computers, Jun. 2001, pp. 529-548, vol. 50, No. 6.
Elleithy, K.M. et al., "Synthesizing DSP Architectures from Behavioral Specifications: A Formal Approach", IEEE, 1990, pp. 1131-1134.
Engel, F. et al., "A Generic Tool Set for Application Specific Processor Architectures," In Proc. of the Int. Workshop on Hw/SW Codesign, 1999, 5 pages.
Ernst, R. et al., "TSG-a Test System Generator for Debugging and Regression Test of High-Level Behavioral Synthesis Tool", IEEE, 1989, p. 937.
Gehringer, E.F., "Data Hazards," Elsevier Science, 2003, 10 pages.
Hagersten, E. et al. "Simple COMA Node Implementations," 1994, 12 pages.
Keppel, D., "A Portable Interface for On-the-Fly Instruction Space Modification," ACM, 1991.
Kobayashi et al., "Compiler Generation in Peas-III: An ASIP Development System," Proc. SCOPIES 2001 Workshop Software and Compilers for Embedded Systems, Mar. 2001, 6 pages.
Leupers, R. et al., "Generation of Interpretive and Compiled Instruction Set Simulators," In Proc. of the Asia South Pacific Design Automation Conference, 1999, 4 pages.
Magnusson, P. et al. "Efficient Memory Simulation in SimICS," IEEE 1995, pp. 62-73.
Mills, C. et al. "Compiled Instruction Set Simulation," Software—Practice and Experience, Aug. 1991, 877-889, vol. 21, No. 8.
NN8812170, "Simulation Technique for Analog Functions in a Mixed Analog and Digital Semiconductor Chip Design Environment", IBM Technical Disclosure Bulletin, vol. 31, No. 7, Dec. 1988, pp. 170-173 (5 pages).
NN87055229, "Testcase Pattern Generation for Design Verification Using a System Level Simulator", IBM Technical Disclosure Bulletin, vol. 29, No. 12, May 1987, pp. 5229-5232 (6 pages).
Parekhji, R.A. et al., "Simulator for Ideal—Implementation and Environment", IEEE, 1991, pp. 187-194.
Pasquier, O. et al., "An Object-Based Executable Model for Simulation of Real-Teim Hw/Sw Systems", Proceedings of 1999 Design, Automation and Test in Europe Conference and Exhibition, 1999, pp. 782-783.
Pees, S. et al., "LISA—Machine Description Language for Cycle-Accurate Models of Programmable DSP Architectures," DAC '99 Proceedings of the 36th Annual ACM/IEEE Design Automation Conference, 1999, pp. 933-938.
Pees, S. et al., "Retargetable Compiled Simulation of Embedded Processors Using a Machine Description Language," ACM Press; Oct. 2000; pp. 815-834.
Schnarr, E. C. et al., "Facile: A Language and Compiler for High-Performance Processor Simulators," May 2001; ACM Press, pp. 321-331.
Schnarr, E. et al., "Fast Out-of-Order Processor Simulation Using Memorization," In Proc. 8th Int. Conf. on Architectural Support for Programming Languages and Operating Systems, Oct. 1998, 12 pages.
"Synopsys, HDL Compiler for Verilog Reference Manual," Synopsys, Version 2000.05, May 2000, 435 pages.
Tabacznyj, C., "Abstract Clustering for Program Comprehension," (http://dl.acm.org/citation.cfm?id=2227390), Proceedings of the 4th Irish Conference on Formal Methods, IW-FM'00 Proc., pp. 93-108, 2000.
Witchel, E. et al. "Embra: Fast and Flexible Machine Simulation," ACM Sigmetrics '96, 1996.
Zhu, J. et al. "A Retargetable, Ultra-Fast Instruction Set Simulator," Mar. 1999.
Zivojnovic et al., "LISA—Machine Description Language and Generic Machine Model for HW/SW CO-Design," IEEE, 1996, pp. 127-163.

\* cited by examiner

200

```
OPERATION register_alu_instr IN pipe.ID
{
    DECLARE {
        GROUP Opcode = { ADD || SUB };
        GROUP Rs1, Rs2, Rd = {gp_reg};
    }

CODING { Opcode Rs2 Rs1 Rd 0b0[10] }
    SYNTAX { Opcode ~" " Rd ~" " Rs1 ~" " Rs2}

BEHAVIOR {
        PIPELINE_REGISTER(pipe, ID/EX).src1 = GP_Regs[Rs1];
        PIPELINE_REGISTER(pipe, ID/EX).src2 = GP_Regs[Rs2];
        PIPELINE_REGISTER(pipe, ID/EX).dst = Rd;
    }

ACTIVATION {Opcode}
}
```

- 205: DECLARE block
- 210: CODING
- 215: SYNTAX
- 220: BEHAVIOR
- 225: ACTIVATION

```
initialize (node_priorities, unsched_list, ready_list);
loop(until_all_insns_scheduled)
    get_next_current_insn_to_be_scheduled(unsched_list, ready_list);
    for_current_insn_compute(early_cycle, late_cycle);
    force_cycle = max(attempted_cycle_of_current_insn+1, early_cycle);
    unforcefull_scheduled = false;
    loop(current_cycle ranging from early_cycle to late_cycle)
        try_schedule_current_insn_into(current_cycle);
        if(success)
            //this is normal scheduling
            update_lists(unsched_list, ready_list);
            unforcefull_scheduled = true;
            break;
        elseIf((current_cycle >= force_cycle) and
        current_insn_has_higher_priority_than_conflicting_in(current_cycle))
            //this is displace scheduling
            unschedule_each_conflict(current_cycle);
            schedule_current_insn_into(current_cycle);
            update_lists(unsched_list, ready_list);
            unforcefull_scheduled = true;
            break;
        end if
    end loop
    if (unforcefull_scheduled == false)
        //this is force scheduling
        unschedule_each_conflict(current_cycle);
        schedule_current_insn_into(force_cycle);
        attempted_cycle_of_current_insn=force_cycle;
        update_lists(unsched_list, ready_list);
    end if
end loop         © 2003, COWARE, INC.
```

610 (label pointing to the force_cycle area)

| Clause | Parameter |
|---|---|
| BARRIER | BARRIER |
| CALC | <text> |
| CHANGE | <registers> |
| CLOBBER | <regsiter_nt> |
| CONDITION | <conditoin> |
| CONTROL | branch |
| COST | <int> |
| EVAL | <text> |
| INTERFERE | <register_nt> |
| LOCK | <empty> |
| PREEMIT | <text> |
| PREFER | |
| READ | MEMORY |
| RESULT | <register_nt> |
| SCRATCH | <register_nt> |
| UNIQUE | <empty> |
| WRITE | MEMORY |

Available Rule Clauses — 832

Instruction Mapping | Extended

Specified Rule Clauses

| Clause | Parameter |
|---|---|
| Condition | IS_INT(o)&&IS_EQUAL(o) |

834

OK / Cancel

830

SCHEDULING OF INSTRUCTIONS

RELATED U.S. APPLICATION

This Application claims priority to U.S. Provisional Application entitled, "METHOD AND SYSTEM OF SCHEDULING INSTRUCTIONS," Application No. 60/558,334, filed on Mar. 30, 2004, which application is hereby incorporated by reference.

This Application is related to U.S. Application entitled, "GENERATION OF COMPILER DESCRIPTION FROM ARCHITECTURE DESCRIPTION," application Ser. No. 10/815,228, filed on Mar. 30, 2004.

A portion of the disclosure of this patent document contains material that is subject to copyright protection. The copyright holder has no objection to the facsimile reproduction by any one of the patent disclosure, as it appears in the Patent and Trademark Office files or records, but otherwise reserves all copyright rights whatsoever.

FIELD OF THE INVENTION

Embodiments of the present invention relate to the field of software tools for system level design. Specifically, embodiments of the present invention relate to semi-automatically generating a compiler description from an architecture description.

BACKGROUND ART

The design and test of modern electronic devices, such as embedded processors (EP) and systems-on-a-chip (SoC) is a complex process involving many stages. For example, many systems, such as mobile devices, networking products, and modems require new embedded processors (EP). These EPs can either be general purpose, such as microcontrollers (μC) and digital signal processors (DSP), or application specific, using application specific instruction set processors (ASIP).

Compared to ASICs, DSPs, ICs, and general-purpose processors, ASIPs provide a tradeoff of computational performance and flexibility on the one hand and power consumption on the other. Therefore, ASIPs that are designed to execute specific tasks very efficiently can be found in a wide range of embedded systems.

However, designing systems with ASIPs is far more complex than assembling systems with standard processors. Typically, designing ASIPs comprises an iterative exploration in which hardware and software are explored and modified. This iterative process is referred to as an architecture exploration loop. The architecture exploration requires a number of tools, such as an assembler, linker, and simulator. If hardware and software are available, profiling results are acquired that usually lead to architecture modifications making the processor more efficient. To be consistent with these modifications, the software tools potentially need to be changed, as well.

The algorithm that is executed by the ASIP is usually specified by algorithm designers in a high level language, such as the C programming language. The overall design time can be significantly reduced by introducing into the architecture exploration loop a compiler that reflects the architecture. Besides reducing the implementation and verification time, the availability of a compiler also increases the system reusability for similar applications.

However, using a compiler in the architecture exploration loop is only beneficial if the compiler itself can be created accurately and efficiently. Thus, there is a need for an efficient and accurate technique for creating a compiler that is usable in an architecture exploration loop.

There have been a number of attempts at generating a compiler for use in architecture exploration. However, these conventional techniques have various weaknesses, such as being limited to the type of architecture that may be explored.

A detailed overview of work related to compiler generation from processor architecture description languages (ADLs) or compiler specifications is given by R. Leupers and P. Marwedel in, "Retargetable Compiler Technology for Embedded Systems," Kluwer Academic Publishers, Boston, October 2001.

A compiler development environment that is mainly useful for VLIW architectures is the Instruction Set Description Language (ISDL), "ISDL: An Instruction Set Description Language for Retargetability," G. Hadjiyiannis, S. Hanono, and S. Devadas. In Proc. of the Design Automation Conference (DAC), June 1997. This conventional technique hierarchically describes the processor and lists invalid instruction combinations in a constraints section. This list becomes very lengthy and complex for DSP architectures like the Motorola 56k. Therefore, this technique is mainly useful for orthogonal processors.

A technique described by Trimaran is capable of retargeting a sophisticated compiler. However, the technique is limited to a very restricted class of VLIW architectures called HPL-PD. HPL-PD (Hewlett-Packard Laboratories PlayDoh) is a parametric processor architecture conceived for research in instruction-level parallelism (ILP). Trimaran's tool input is a manual specification of processor resources (functional units), instruction latencies, etc. (Trimaran. "An Infrastructure for Research in Instruction-Level Parallelism" http://www.trimaran.com.)

An extension of the CoSy® environment (ACE Associated Computer Experts by. "The CoSy® Compiler Development System" http://www.ace.nl.) can be retargeted from a FlexWare2 description. (P. Paulin. "Towards Application-Specific Architecture Platforms Embedded Systems Design Automation Technologies." In Proc. of the EuroMicro, April 2000.) Unfortunately, for the generation of the other software tools, FlexWare2 requires separate descriptions. This redundancy introduces a consistency/verification problem.

The concept for scheduler generation has been proposed in EXPRESSION. (Peter Grun, Ashok Halambi, Nikil D. Dutt, and Alexandru Nicolau. "RTGEN: An Algorithm for Automatic Generation of Reservation Tables from Architectural Descriptions." In Proc. of the Int. Symposium on System Synthesis (ISSS), pages 44-50, 1999.) The concept for scheduler generation has also been proposed in PEAS-III. (M. Itoh, S. Higaki, J. Sato, A. Shiomi, Y. Takeuchi A. Kitajima, and M. Imai. "PEAS-III: An ASIP Design Environment." In Proc. of the Int. Conf. on Computer Design (ICCD), September 2000). Both of these conventional techniques extract structural information from the processor description that allows the tracing of instructions through the pipeline. Instructions are automatically classified by their temporal I/O behavior and their resource allocation. Based on this information, a scheduler can be generated. In PEAS-III, all functional units that are used to model the behavior of instructions are taken from a predefined set called flexible hardware model database (FHT).

MIMOLA traces the interconnects of functional units to detect resource conflicts and I/O behavior of instructions. (R. Leupers and P. Marwedel. "Retargetable Code Compilation based on Structural Processor Descriptions." Design Automation for Embedded Systems, 3(1):1-36, January 1998. Kluwer Academic Publishers). For non-pipelined architectures, it is possible to generate a compiler called MSSQ, which also includes an instruction scheduler. However, the abstraction level of MIMOLA descriptions is very low, which slows down the architecture exploration loop.

The CHESS (D. Lanner, J. Van Praet, A. Kiffl, K. Schoofs, W. Geurts, F. Thoen, and G. Goosens. "Chess: Retargetable Code Generation for Embedded DSP Processors." In P. Marwedel and G. Goosens, editors, Code Generation for Embedded Processors. Kluwer Academic Publishers, 1995.) code generator is based on an extended form of the nML ADL (A. Fauth, J. Van Praet, and M. Freericks. "Describing Instruction Set Processors Using nML." In Proc. of the European Design and Test Conference (ED & TC), March 1995). Similar to the MSSQ compiler, the scheduler uses the instruction coding to determine which instructions can be scheduled in parallel. In contrast to MSSQ, the CHESS compiler can be used to generate code for pipelined architectures. This is achieved by manually attaching latency information (e.g., number of delay slots) to the instructions. CHESS is primarily useful for retargeting compilers for DSPs.

The Marion system uses the Maril language to generate a compiler. (D. G. Bradlee, R. E. Henry, and S. J. Eggers. "The Marion System for Retargetable Instruction Scheduling." In Proc. of the Int. Conf. on Programming Language Design and Implementation (PLDI), pages 229-240, 1991.) However, the system is restricted to RISC architectures: All target machines need to have general purpose register sets, each instruction produces at most one result, and only load and store operations can access memory.

The Mescal group, which is part of the Gigascale Research Center, recently proposed an operation state machine (OSM) based modeling framework. (W. Qin and S. Malik. "Flexible and formal modeling of microprocessors with application to retargetable simulation." In Proc. of the Conference on Design, Automation & Test in Europe (DATE), March 2003.) OSM separates the processor into two interacting layers: an operation and timing layer and a hardware layer that describes the micro-architecture. A StrongARM and a PowerPC-750 simulator could be generated.

An operBT/listBT backtracking scheduler has been proposed. (S. G. Abraham, W. Meleis, and I. D. Baev. "Efficient backtracking instruction schedulers." In IEEE PACT, pages 301-308, May 2000.) However, the technique described in that paper is limited in its ability to handle delays. The paper presents two different backtracking scheduler techniques: The operBT scheduler and the listBT scheduler. Both schedulers assign priorities to the nodes of the dependence DAG. In contrast to other schedulers, the operBT scheduler does not maintain a ready list. It utilizes a list of nodes not yet scheduled that is sorted by node priority. It takes the highest priority node from this list and schedules it using one of the following three scheduling modes:

Schedule an operation without un-scheduling (normal).

Un-schedule lower priority operations and schedule into current_cycle (displace).

Un-schedule high priority operations to avoid invalid schedules and schedule an instruction into a so-called force_cycle (force).

The operBT scheduler has the drawback of being relatively slow due to many un-scheduling operations. To overcome this drawback, the operBT scheduler was extended to the listBT scheduler. This scheduler tries to combine the advantage of the conventional list scheduler (fast) with the advantage of the operBT scheduler (better schedule). The listBT scheduler does maintain a ready list. This means only nodes that are ready can be scheduled. Unfortunately the delay slot filling of the listBT scheduler does not work for all cases.

SUMMARY OF THE INVENTION

Therefore, it would be advantageous to provide a method and system that reduce the time required for the design exploration phase. It would be further advantageous to accurately and efficiently generate a compiler description that may be used in an architecture exploration. It would be still further advantageous to meet the above constraints while being compatible with existing technologies for developing embedded processors, systems-on-a-chip, and ASIPs.

Accordingly, embodiments of the present invention provide methods of and systems that reduce the time required for the design exploration phase. Embodiments of the present invention accurately and efficiently generate a compiler description that may be used in an architecture exploration. Embodiments of the present invention meet the above constraints while being compatible with existing technologies for developing embedded processors, systems-on-a-chip, and ASIPs. Embodiments of the present invention provide these advantages and others not specifically mentioned above but described in the sections to follow.

An embodiment of the present invention comprises a computer-implemented method of automatically extracting information from an architecture description. This embodiment comprises constructing a memory resident directed acyclic graph data structure comprising nodes representing instructions and edges whose weights represent dependencies between pairs of instructions; maintaining a list of ready nodes in the directed acyclic graph; maintaining a list of nodes not scheduled; and determining whether the next instruction to be scheduled is to be taken from the list of ready nodes or from the list of nodes not scheduled.

Systems and devices in accordance with embodiments of the present invention are also described herein.

BRIEF DESCRIPTION OF THE DRAWINGS

FIG. 2 illustrates an exemplary single LISA operation, which may form part of an architecture description of an embodiment of the present invention.

FIG. 6 depicts exemplary pseudocode of a scheduling algorithm, in accordance with an embodiment of the present invention.

DETAILED DESCRIPTION OF THE INVENTION

In the following detailed description of embodiments of the present invention, semi-automatically generating a compiler description from an architecture description, numerous specific details are set forth in order to provide a thorough understanding of the present invention. However, it will be recognized by one skilled in the art that the present invention may be practiced without these specific details or with equivalents thereof. In other instances, well-known methods, procedures, and components have not been described in detail as not to unnecessarily obscure aspects of the present invention.

NOTATION AND NOMENCLATURE

Some portions of the detailed descriptions that follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "executing" or "receiving" or "generating" or "processing" or "computing" or "translating" or "mapping" or "determining" or "maintaining" or "importing" or "storing" or "constructing" or "accessing" or "extracting" or "selecting" or "removing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
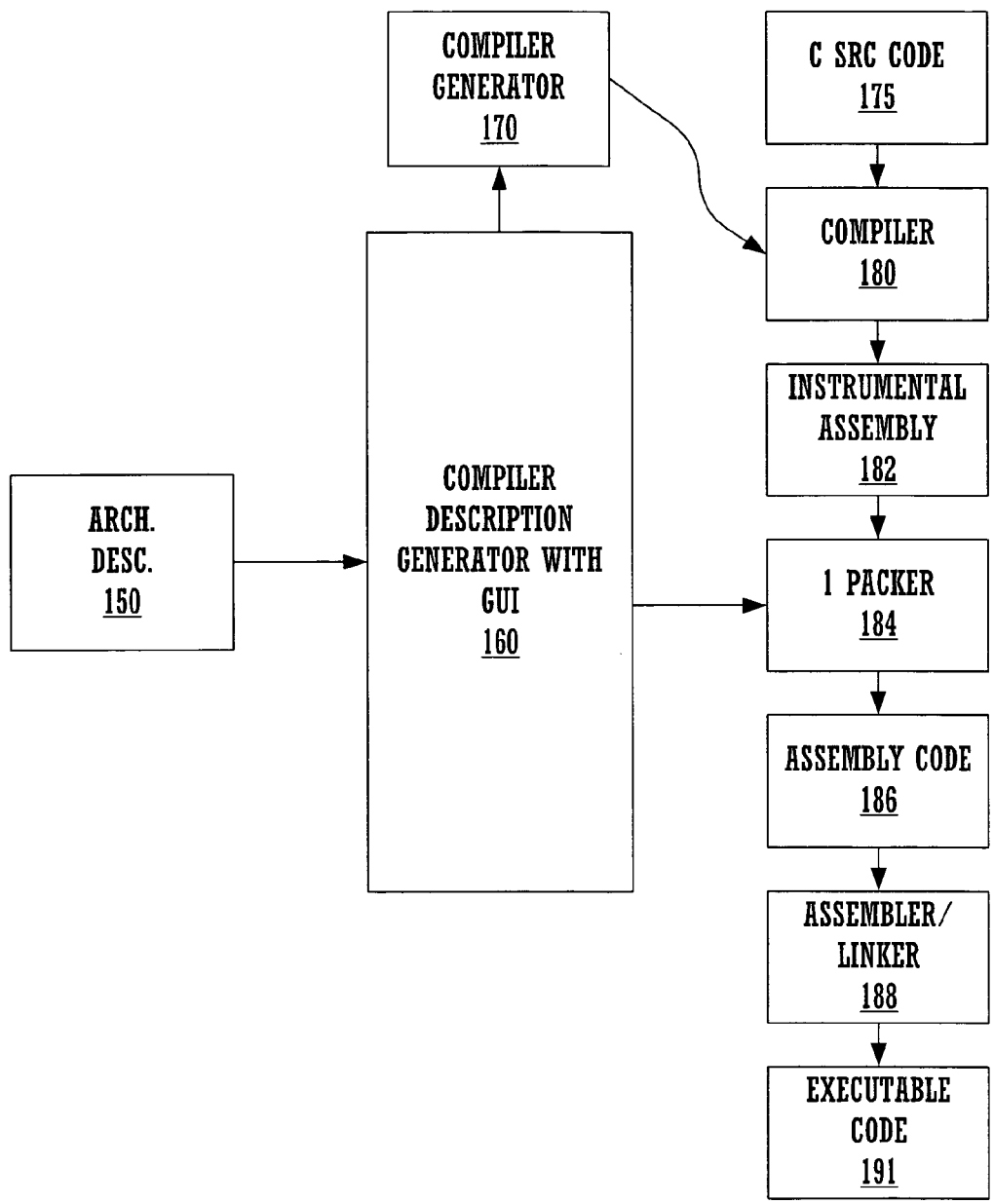
FIG. 1 is a diagram illustrating an overview of compiler generation from an architecture description, in accordance with an embodiment of the present invention.

FIG. 1 is a diagram illustrating an overview of compiler generation from an architecture description, in accordance with an embodiment of the present invention. A description 150 of the architecture that is being designed and developed is input into the compiler generator having a graphical user interface (GUI) 160. The architecture description 150 is written in an architecture description language (ADL). For example, in one embodiment in accordance with the present invention, the architecture description 150 is written in an ADL that is substantially compliant with the LISA architecture description language. The architecture description 150 may describe a processor being designed and developed. The processor may be an application specific instruction set processor (ASIP).

Figure 7A:
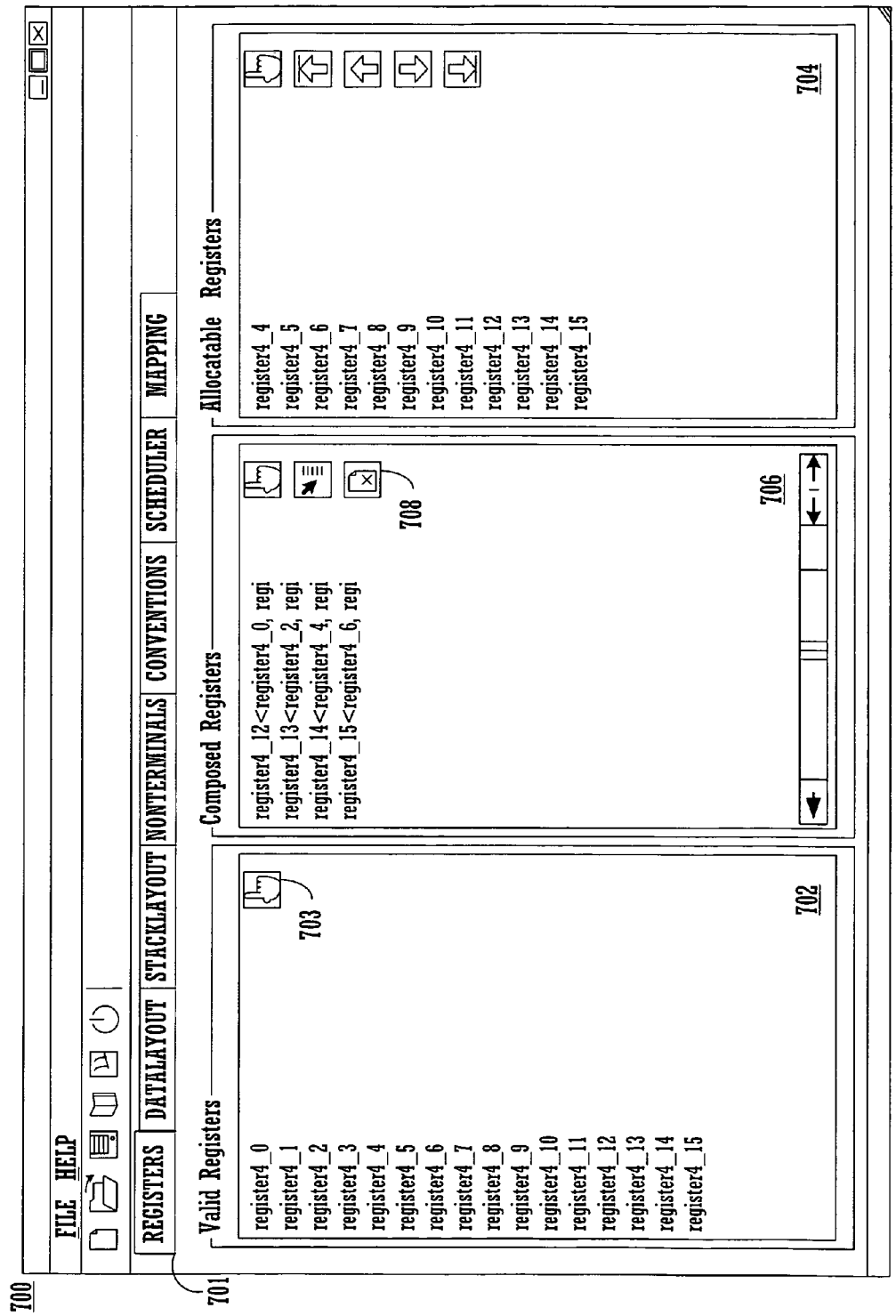
FIGS. 7A-7N are exemplary dialog screens that allow a user to refine an architecture description such that a compiler description may be generated, in accordance with embodiments of the present invention.

The compiler generator with GUI 160 extracts information from the architecture description 150 that is useful in generating a compiler description. This extracted information is imported into a computer program that displays this information in a GUI. The GUI allows the architecture's designer to input additional information that is useful in generating the compiler. The GUI also allows the architecture's designer to modify the extracted information, if so desired. FIGS. 7A-7N depict various dialog windows of the GUI that allow the user to input and modify information that is useful in generating a compiler description for the architecture being developed. The compiler generator with GUI 160 outputs a compiler description, based on the information extracted from the architecture description 150 and the information that the architecture's designer input and/or modified using the GUI.

Figure 5:
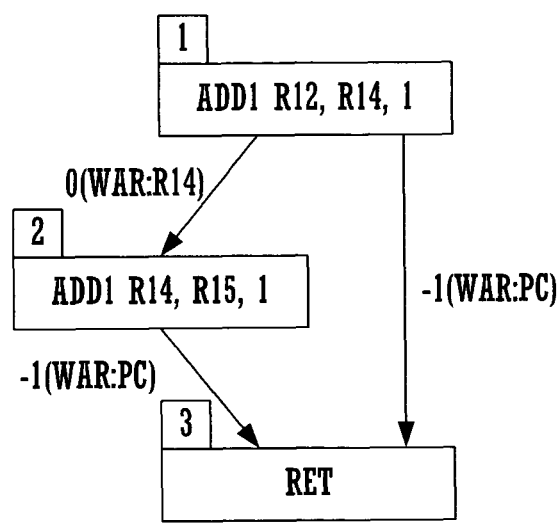
FIG. 5 illustrates a directed acyclic graph (DAG) used to schedule a sequence of instructions, in accordance with an embodiment of the present invention.

The compiler description is input into the compiler generator, which outputs the compiler 180. A suitable compiler generator 170 is the COSY® Compiler Development System provided by Associated Computer Experts (ACE) of Amsterdam, The Netherlands. However, the present invention is not limited to this compiler generator. The compiler 180 parses the C code 175, applies typical high level optimizations, utilizes a tree pattern matcher for code selection and conducts a global register allocation. The output of the compiler 180 is unscheduled instrumented assembly code 182. This means that each assembly instruction contains an instruction class identifier and information about the resources (e.g., registers, memory) that it reads or writes. From this input, the Ipacker tool 184 creates a dependence directed acyclic graph (DAG). An exemplary dependence DAG is illustrated in FIG. 5. The DAG is fed into a mixedBT scheduler, which is implemented in the Ipacker tool 184. Exemplary pseudocode for an implemented mixedBT scheduler is depicted in FIG. 6. The scheduling result is assembly code 186 that is compliant with the ADL model of the architecture being developed. The assembly code 186 is read by the assembler/linker 188. The assembler/linker may be generated from the architecture description 150 as well. However, the generation of the assembler/linker is not a requirement of the present invention.

To retarget the output of the compiler generator 170 and Ipacker 184, the information extracted from the architecture description 150 is presented in a GUI. One reason for this extension is the fact that the compiler generator with GUI 160 requires information not contained in the architecture description 150 (e.g. calling conventions, stack layout). This information can be added in the GUI. Another reason is to offer the architecture designer the opportunity to override analysis results. It is possible to start the architecture design with a very simple architecture description 150 that mainly describes the instruction set but no temporal behavior (e.g., the pipeline is not modeled). The compiler generator with GUI 160 can be used to model instruction latencies, register file sizes, etc. Thus, the impact of major architectural changes can quickly be profiled through the compiler generator with GUI 160. A third benefit of the GUI is that it provides an opportunity to override analysis results that are too conservative. Such overriding can be useful if the architecture description 150 contains unrecognized hardware to hide instruction latencies.

Extracting Scheduling Information from an
Architecture Description

For a given set of instructions, a scheduler decides which instructions are issued on the processor in which cycle. For instruction level parallelism (ILP) architectures, this not only means that the scheduler decides on the sequence in which instructions are executed, but it also arranges instructions to be executed in parallel. The freedom of scheduling is limited by two major constraints: structural hazards and data hazards. Structural hazards result from instructions that utilize exclusive processor resources. If two instructions require the same resource, then these two instructions are mutually exclusive. A typical example of structural hazards is the number of issue slots available on a processor architecture. For example, it is never possible to issue more instructions in a cycle than the number of available slots. Data hazards result from the temporal I/O behavior of instructions. Data hazards can be subdivided into read after write (RAW), write after write (WAW), and write after read (WAR) hazards. An example for a RAW dependency is a multiplication that takes two cycles to finish computation on a processor without interlocking hardware followed by a second instruction that consumes the result of the multiplication. In this case, the multiplication has a RAW dependence of two cycles onto the second instruction. Consequently, the second instruction is issued two or more cycles after the multiplication.

Embodiments in accordance with the present invention find and associate a set of virtual resources (e.g., resources that have no direct correspondence in the processor hardware) with each instruction of an architecture description. These resources are exclusively allocated if an instruction is scheduled. Using a reservation table technique the scheduler can decide which instructions are allowed to be issued in the same clock cycle.

Embodiments in accordance with the present invention automatically extract the RAW, WAW, and WAR data flow hazards from an architecture description. This allows the generation of a complete instruction scheduler from the architecture description.

Exemplary Architecture Description Language

The following discussion outlines aspects of the structure of an exemplary ADL in order to facilitate explanation and understanding of embodiments in accordance with the present invention. However, the present invention is not limited to using this exemplary ADL. The following exemplary ADL is substantially compliant with the LISA language. A more detailed explanation of LISA and related software tools is provided in, "Architecture Exploration for Embedded Processors With LISA," by A. Hoffmann, H. Meyr and R. Leupers. Kluwer Academic Publishers, January 2003.

An exemplary single LISA operation 200 is illustrated in FIG. 2. A LISA processor description consists of two parts: The LISA operation tree and a resource specification. The operation tree is a hierarchical specification of instruction coding, syntax, and behavior. The resource specification describes memories, caches, processor registers, signals, and pipelines. There is not a resource specification in the example of FIG. 2. The name of this operation in FIG. 2 is register_alu_instr and it is located in the ID stage (instruction decode) of the pipeline called pipe.

The DECLARE section 205 contains local declarations and announcements for a LISA operation. In this example, the DECLARE section 205 lists the sons of register_alu_instr in the operation tree. ADD and SUB are names of other LISA operations that have their own binary coding, syntax, and behavior.

The CODING section 210 describes the binary image of the instruction word that is a part of the instruction set model. The SYNTAX section 215 describes the assembly syntax of instructions and their operands.

The BEHAVIOR section 220 indicates that elements of the GP_Regs array resource are read and written into a pipeline register. This means that the general-purpose register file is read in the instruction decode stage.

The ACTIVATION section 225 describes the subsequent control flow of the instruction through the processor. The LISA operation behind Opcode is generally (but not necessarily) located in a subsequent pipeline stage, which means that it will be activated in a subsequent cycle. Thus the ACTIVATION section 225 creates a chain of operations as depicted in FIG. 3.

Extracting Instruction Latencies

Figure 3:
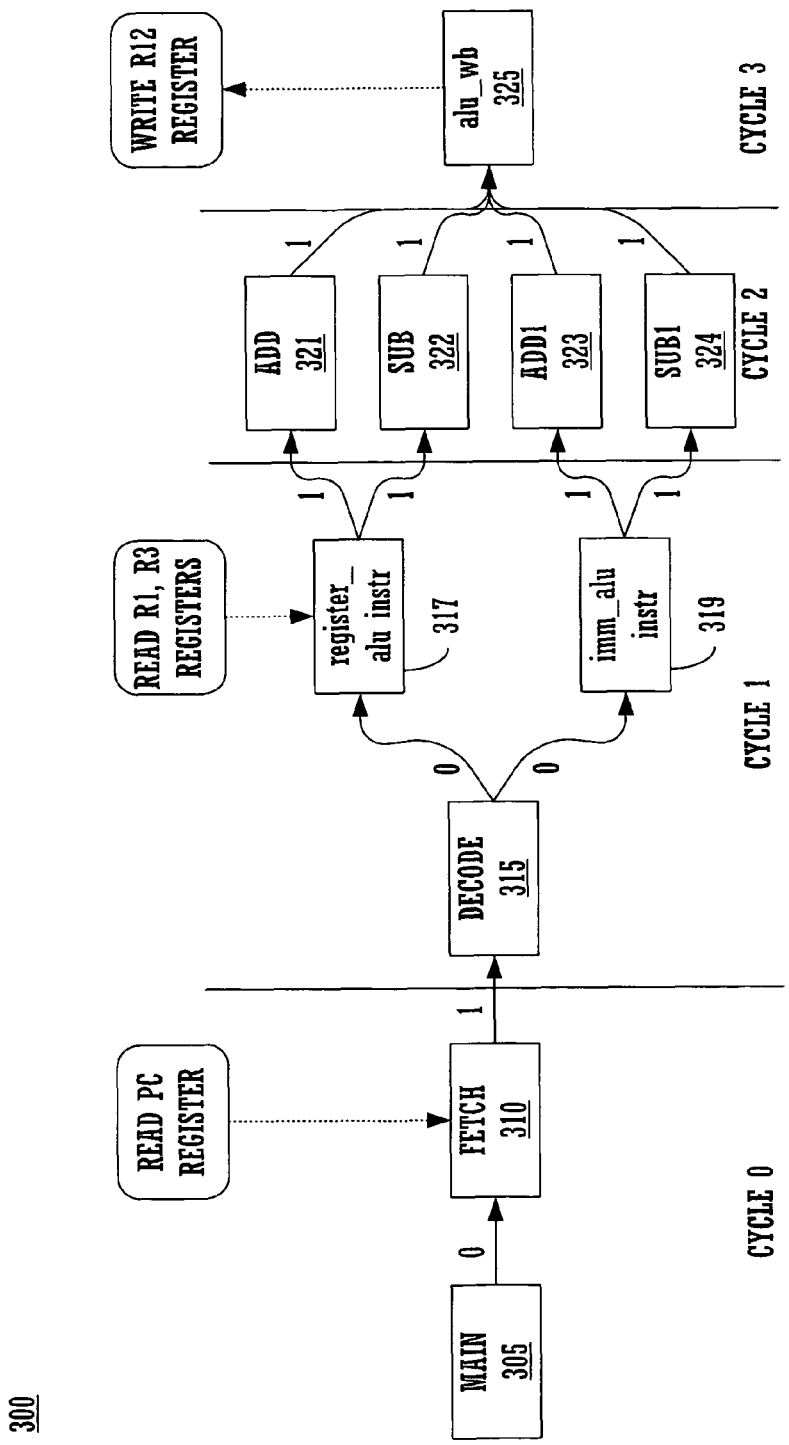
FIG. 3 illustrates an exemplary ACTIVATION chain of LISA operations.

FIG. 3 illustrates an exemplary activation chain 300 of LISA operation. The chain comprises four cycles in this example. Cycle 0 is a fetch stage, cycle 1 is a decode stage, cycle 2 is an execution stage and cycle 3 is write-back stage. The main operation 305 in cycle 0 has a special meaning. It is executed in every control step of the simulator. The main operation 305 activates the operation(s) in the first pipeline stage (fetch 310), which in turn activate(s) operations of subsequent pipeline stages. In the fetch operation 310, the program counter register is read. In cycle 1, decoding is performed, as indicated by the decode box 315. For an instruction, the declared GROUPs are selected (e.g., the Opcode is either ADD or SUB, as indicated by boxes 321 and 322 because this is a "register_alu_inst"). Possible opcodes for the "imm_alu_instr" 319 are ADDI or SUBI, as indicated by boxes 323 and 324.

Based on the activation chain, it can be determined which LISA operation of the instruction is executed in which cycle. Furthermore, it can be determined if the C code in the BEHAVIOR section of the operations accesses processor resources of the LISA model. In the example of FIG. 3, the decoding of the instruction results in the "register_alu_instr", as opposed to the "imm_alu_instr." In this case, an add is performed in cycle 2 and the result is written back to register 12 in cycle 3, as indicated by the alu_wb box 325.

The analysis of activation chains in accordance with embodiments of the present invention differs from a trace technique that is used in some conventional design environments. Traces include information about which functional units are used by an instruction in a specific cycle. Traces require modeling of functional units and their interconnects. In the LISA language, operations are abstracted from functional units, which significantly speeds up the architecture exploration phase. For example, a processor such as the ST200 VLIW processor has four parallel ALUs that can execute an addition. In the LISA model there is only a single ADD operation that is potentially activated four times in the same clock cycle from different sources.

Figure 4:
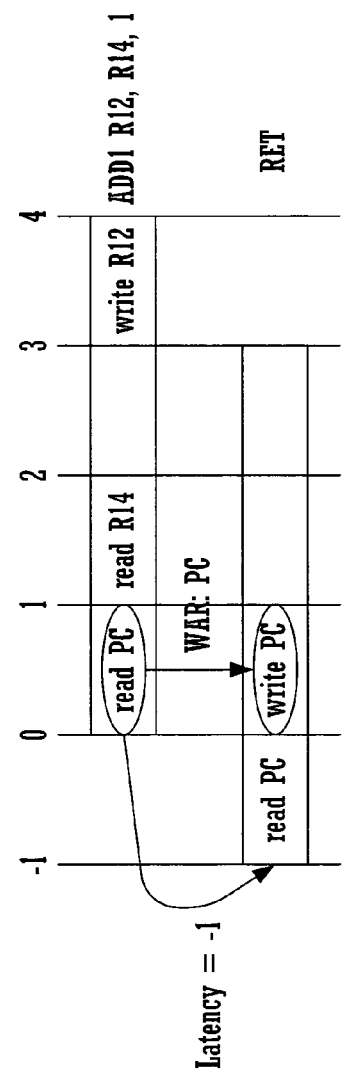
FIG. 4 illustrates vectors of two example assembly instructions, depicting latency analysis in accordance with an embodiment of the present invention.

The vectors of two example assembly instructions are depicted in the diagram 400 of FIG. 4, depicting latency analysis in accordance with an embodiment of the present invention. The add immediate instruction, "ADDI R12, R14, 1" reads the program counter (PC) in its cycle 0. In its cycle 1 it reads a source operand from register R14, and in cycle 3 it writes a result back to register R12. The add immediate instruction is followed by a return instruction "RET" that reads the PC in its cycle 0 and writes the PC in its cycle 1. The dependency between the two instructions is a "write after read" (WAR). Furthermore, the latency from the add immediate instruction to the return instruction is −1.

Based on the LISA activation chains, a determination can be made as to when an instruction accesses processor resources. The access direction (read or write) and the resource names are organized in an instruction specific vector. Starting from cycle 0, each vector component represents a cycle that is required to execute the instruction.

To schedule a sequence of instructions, embodiments in accordance with the present invention construct a directed acyclic graph (DAG) 500 data structure such as the one depicted in FIG. 5. The DAG comprises three instructions, labeled 1, 2, and 3 in this example. The arrow between each instruction is referred to as an edge and is assigned a weight based on the latency between the instructions. In general, each edge weight of the DAG represents a RAW, WAW, or WAR dependency between a pair of instructions. In FIG. 5, all dependencies are of the WAR variety. If there is more than one latency between two instructions (e.g., the second instruction reads and writes a register that is written by the first instruction) the maximum latency is taken.

The following discussion covers more general sequences of instructions than depicted in FIG. 5. If a second instruction "I2" reads a register resource "R" that was written by a first instruction "I1," then the RAW latency is calculated by the formula expressed in Equation 1.

$$RAW = \text{last write cycle}(I1, R) - \text{first read cycle}(I2, R) + 1 \qquad \text{Eq. 1:}$$

The last write cycle function iterates through the vector of instruction I1 and returns the greatest component index that indicates a write to register resource R. Similarly, the first read cycle function returns the first component index of instruction I2 that contains a read of register resource R. The inherent resource latency is taken into account by the last addend because it takes one cycle to read a value from a register that has been written to it an addition of 1 is required.

If two sequential instructions "I1" and "I2" write to the same register resource "R," then the WAW latency is computed as expressed in Equation 2.

$$WAW = \text{last write cycle}(I1, R) - \text{last write cycle}(I2, R) + 1. \qquad \text{Eq. 2:}$$

In Equation 2, the addition of 1 is needed because it is not possible that two instructions write a resource at the same time.

If the second instruction I2 writes register resource R and the first instruction I1 reads register resource R, then the WAR latency is computed as in Equation 3.

$$WAR = \text{last read cycle}(I1, R) - \text{first write cycle}(I2, R) \qquad \text{Eq. 3:}$$

An example for a WAR latency is depicted in FIG. 4. As previously discussed, the instruction, "ADDI R12, R14,1" reads the program counter (PC) in its cycle 0. In its cycle 1 it reads a source operand from register R14 and in cycle 3 it writes a result back to register R12. It is followed by a RET instruction that reads the PC in its cycle 0 and writes it in its cycle 1. This means that WAR: PC=0−1=1.

Consequently, the RET instruction is scheduled −1 or more cycles behind the instruction ADDI R12,R14,1. The negative latency can be interpreted as an opportunity to fill the delay slot of the RET instruction. For the scheduler, it is possible to issue the RET instruction one cycle before the instruction ADDI R12,R14,1. This means that the activation chains can be used to automatically generate schedulers capable of delay slot filling, in accordance with an embodiment of the present invention. The time required for analyzing the latencies in the scheduler generator is negligible.

Scheduling Algorithms
List Scheduler

Unfortunately, typical conventional list schedulers are not capable of filling delay slots. In contrast, embodiments in accordance with the present invention are able to fill delay slots. A list scheduler in accordance with an embodiment of the present invention takes a dependence DAG representing a basic block as an input. The technique of this embodiment selects one or more of the nodes that have no predecessor (the so called ready set) to be scheduled into a cycle, as determined by a current_cycle variable. The scheduled nodes are removed from the DAG, the current_cycle is potentially incremented, and the loop starts again.

An embodiment in accordance with the present invention processes the exemplary DAG 500 of FIG. 5 a follows. A "current_cycle" variable is initialized to 0 and the list scheduler would schedule instruction 1, which is the only ready node (e.g., it has no predecessor) into cycle 0. The node for instruction 1 is removed from the DAG 500 and instruction 2 becomes ready. Assuming that the underlying architecture has only a single issue slot, it is not possible to schedule any ready instruction into current_cycle (which is still 0). Consequently current_cycle is incremented. Since no latency constraint is violated, instruction 2 is scheduled into cycle 1. After another scheduling loop, instruction 3 is scheduled into cycle 2. Because the RET instruction has a delay slot, the list scheduler appends a NOP as the last instruction of the basic block. A better schedule would be instructions 1,3,2 which means that the delay slot of the RET instruction is filled with one of the preceding instructions. To create this schedule, the scheduler is able to revoke decisions on instructions being scheduled into certain cycles. An embodiment of the present invention discussed below provides for an improved scheduling that is able to revoke decisions on instructions being scheduled into certain cycles.

5.2 Backtracking Schedulers

As discussed herein, conventional back-tracking algorithms are limited in their ability to handle delays. FIG. 5 illustrates an example of a dependence DAG 500 for which a conventional listBT scheduler creates the following schedule after 11 scheduling loops iterations:

(0) ADDI R12,R14,1;
(1) NOP;
(2) RET;
(3) ADDI R14,R15,1.

The reason for the NOP is that in the 9th schedule loop iteration the scheduler tries to schedule ADDI R14,R15,1 instead of the higher prioritized RET. This leads to a correct but sub-optimal schedule. Embodiments in accordance with the present invention provide a more optimal schedule than the schedule provided by this conventional back-tracking algorithm.

MixedBT Scheduler

A mixedBT scheduler in accordance with embodiments of the present invention reduces the number of computational intense instruction un-scheduling by maintaining a ready list, but is able to switch to a better quality priority scheduling when applicable. To support both modes, a ready list and a list of nodes not yet scheduled are maintained by an embodiment of the present invention. Exemplary pseudo code of a scheduling algorithm 600 is depicted in FIG. 6, in accordance with an embodiment of the present invention. The initial priority of the DAG leaf nodes is equivalent to the cycles these instructions require to finish their computation. For all other nodes, the edge weights of any path from that node to any leaf node is accumulated. The maximum sum is the node priority.

The get_next_current_insn_to_be_scheduled function 610 decides from which list to take the next node that is to be scheduled. It takes the highest priority node from the list of nodes not yet scheduled if the priority is higher than any node priority in the ready list. Otherwise, the highest priority node from the ready list is scheduled next.

If there are only positive data dependencies, the ready nodes have the highest priorities. For nodes that have zero latency, the function 610 selects the father node. In contrast, a conventional operBT scheduler would potentially select the son here. Thus, the conventional technique would most probably lead to an un-scheduling of this node later on.

If nodes are connected by a negative latency, the son has a higher priority. The present embodiment schedules this son node first even if it is not ready. Thus, this embodiment speeds up the filling of delay slots.

The automatically extracted scheduling information may be input to a computer program that semi-automatically generates a compiler description.

Semi-Automatic Generation of Compiler Description from Architecture Description Using a GUI Embodiments of the present invention semi-automatically generate a compiler description from an architecture description. A graphical user interface (GUI) is used to allow user interaction in conversion from the architecture description to the compiler description. The GUI visualizes information that was extracted from the architecture description that is relevant for the compiler generator and provides the user the opportunity to refine, extend, or override the information such that a desired compiler description may be generated. The extracted information may comprise schedule information, as described herein. The extracted information may also comprise other information, such as resources defined in the architecture description.

The GUI in accordance with embodiments of the present invention comprises several on-screen display windows that address different aspects of the conversion process. FIGS. 7A-7N are exemplary dialog screens that allow a user to refine a description of the architecture such that a compiler description may be generated, in accordance with embodiments of the present invention.

FIG. 7A depicts an exemplary registers dialog 700 in accordance with an embodiment of the present invention. The exemplary registers dialog 700 is split into three columns 702, 704, 706. The valid registers column 702 represents the registers that were automatically extracted from the architecture description, in accordance with an embodiment of the present invention. The button 703 beside the column 702 can be used to hide registers from the compiler generator (FIG. 1, 170). This could be useful if the calculated number of registers is too high. The allocatable registers column 704 allows the user to configure the allocatable registers. Only if a register is allocatable, the register allocator may use it to pass values between instructions. The composed registers column 706 can be used to specify composed registers. For example, several processors can combine two or more conventional registers to form registers of larger bit-width. Such composed registers usually have a name of their own, but it is not possible to store arbitrary values in the composed registers and in the conventional registers at the same time. With the buttons 708 at the right hand side of the composed registers column 706 registers which overlap with other registers may be specified by the user. In FIG. 7A, the registers tab 701 is selected. The other tabs will be discussed in conjunction with other dialogs herein.

Figure 7B:
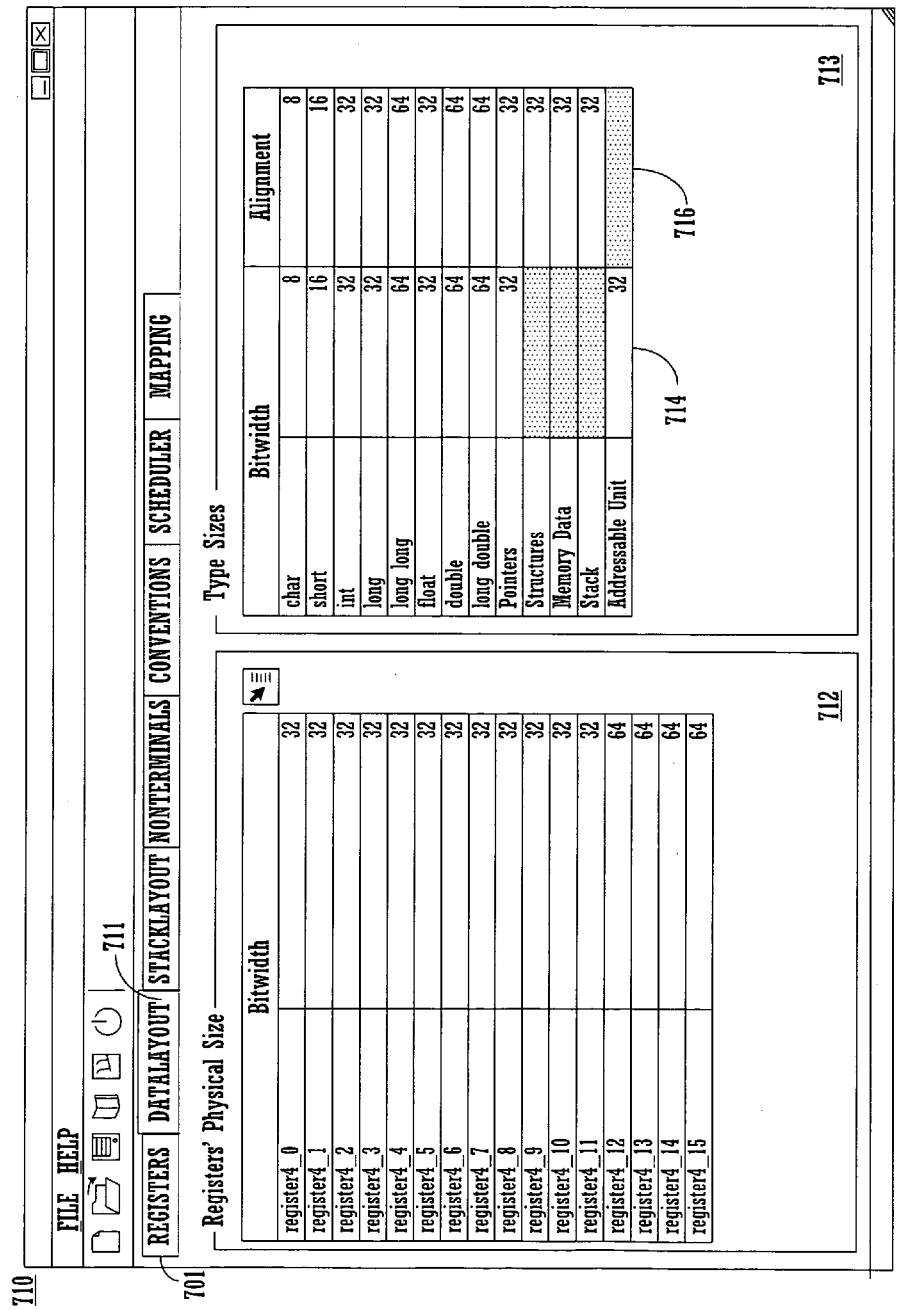

FIG. 7B depicts a data layout dialog 710, in accordance with an embodiment of the present invention. The data layout tab 711 has been selected. In the registers physical size box 712 of the data layout dialog 710, depicted in FIG. 7B, the bit-width of registers can be specified by the user. In this embodiment, the information about the bit-width of registers is not extracted from the architecture description if C language data types (such as "int", "short", "char") are used rather than bit vectors. The use of C language data types is explicitly allowed for simulation speed reasons. However, reasonable default values are assumed for C language data types. For bit vector types, it is possible to automatically extract the bit-width information from the architecture description, if desired. In this case, the designer may modify the bit-width information, if desired.

The type sizes box 713 of the exemplary data layout dialog 710 allows a user to specify certain bitwidth and alignment information. For example, the C standard does not define any bit-width for the native C data types. This information is specified by the user in bit-width column 714 of the exemplary data layout dialog 710. The desired alignment of the types in memory is specified by the user in the alignment column 716.

In addition to the native C types, the compiler may support the long long and long double types, for example. Column 714 has fields that allow the user to input structure alignments (Structures), the alignment of heap data elements (Memory Data), and stack elements (Stack). The size of an addressing unit can be specified in the Addressable Unit field.

Figure 7C:
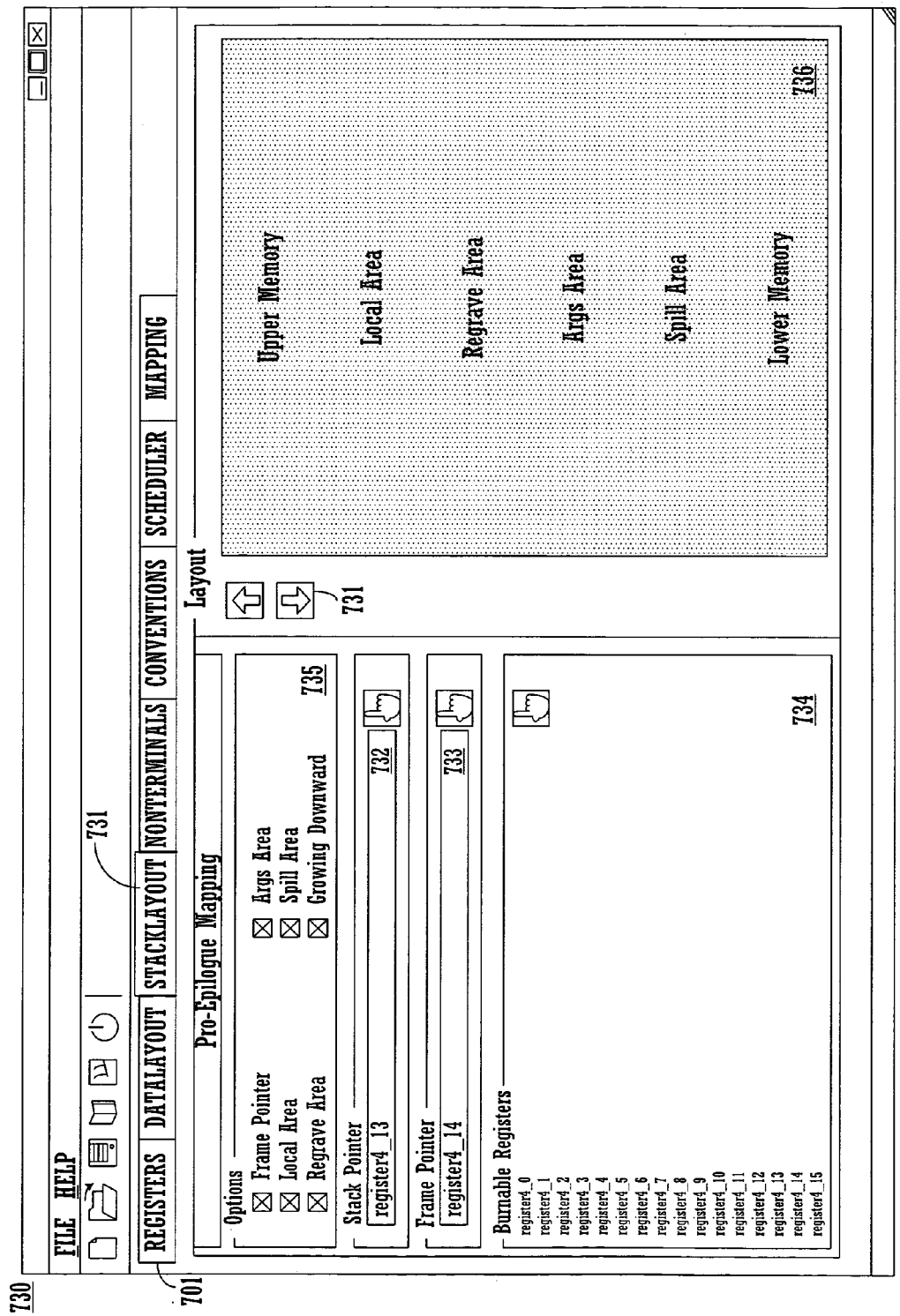

FIG. 7C illustrates an exemplary stack layout dialog 730, in accordance with an embodiment of the present invention. The stack pointer register may be specified by the user in the stack pointer box 732. The end of the stack, which is also one end of the last stack frame, is marked by the stack pointer register. The frame pointer box 733 allows a user to specify the frame pointer, which points to the other end of the stack frame. In the pushable registers box 734, the registers whose contents can be stored on the stack can be user-specified. The options box 735 allows user-specification of aspects such as whether the stack grows upwards or downwards and which stack frame elements appear in the layout box 736 of the dialog. The stacklayout tab 731 has been selected to bring up this dialog 730.

Continuing with the discussion of FIG. 7C, to support recursive function calls the compiler makes sure that each function call dynamically reserves a certain amount of memory on a global stack. This stack frame stores all data private to the function. It contains room for all local variables (Local Area), spilled values (Spill Area) (e.g., values of registers that temporarily needed to be dumped to memory), and values that are passed as arguments to subsequent function calls (Args Area). The callee saved registers that were clobbered by the function are also saved on the stack in the (RegsaveArea). The relative position of these elements can be changed by selecting an item in the dialog and pushing one of the arrow buttons 731 in the middle of the dialog.

The compiler that is created by embodiments of the present invention generates the code needed to set and clean up the stack each time a function is entered or left. Therefore, the user specifies some essential instructions needed for this operation, which can be entered in a pro-/epilogue mapping dialog that is accessible by clicking on the pro-epilogue button 737.

Figure 7D:
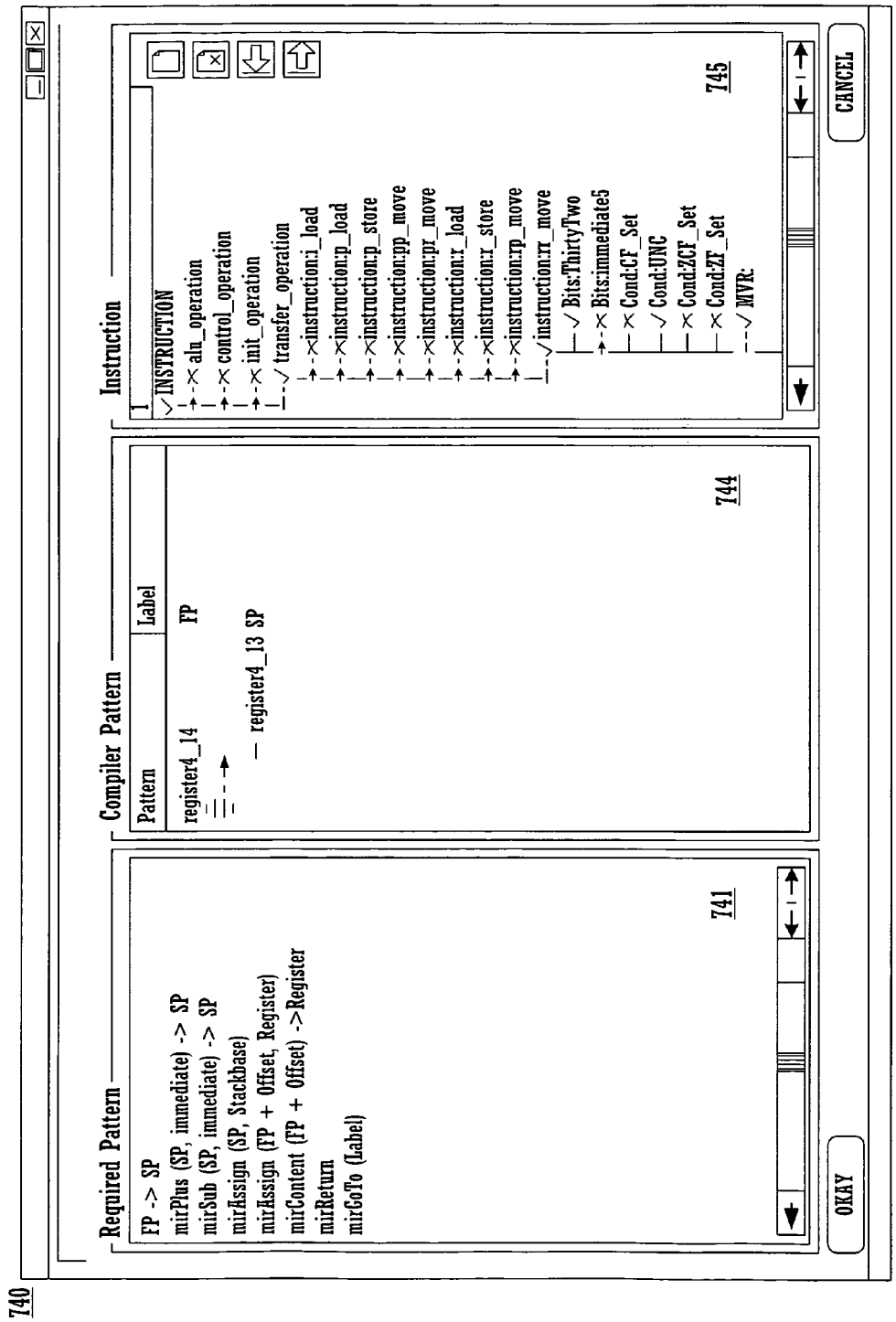

FIG. 7D illustrates an exemplary pro-/epilogue mapping dialog 740, in accordance with an embodiment of the present invention. Before discussing FIG. 7D it will be briefly mentioned that an aspect of embodiments of the present invention concerns Intermediate Representation (IR) nodes. Briefly, the intermediate representation concerns a central data repository through which engines communicate with each other. A detailed explanation of IR nodes is provided in "ACE Associated Compiler Experts bv. CCMIR Definition, May 2003, Specification in fSDL, Description and Rationale."

An embodiment of the present invention generates two additional IR nodes for each function. These are the prologue, which is the first basic block of a function, and the epilogue at the end of the function. The prologue performs the following steps:

If the current function is main, it will set the stack pointer (SP) to the base address of the stack, if there is no boot code.

Store the current frame pointer (FP) on the stack and decrease the SP by the register size of the FP.

Copy the SP to the FP.

Decrease the SP by the stackframe size (only if not equal zero)

Store all clobbered registers on the stack at their calculated position.

The epilogue is the reverse of the prologue:

Restore the registers that were saved in the prologue.

For function main generate an endless loop, if there is no boot code.

Copy the current FP to the SP.

Restore the old FP.

Increase SP by the register size of the FP.

Return to the calling function.

In order to perform these actions, embodiments of the present invention allow the specification of several mapping rules, such that a working compiler can be generated. A mapping rule consists of a pattern and one or more instructions associated with the pattern. The user is allowed to specify these instructions the pro-/epilogue mapping dialog 740. The required pattern view 741 contains a set of patterns (grammar rules) that are needed to handle the stack-layout. These rules are not modified by the user. The compiler pattern view 744 shows the corresponding pattern in terms of IR nodes. The instruction box 745 allows the user to map the patterns to instructions composed from the tree of operations. The discussion of FIG. 7L provides more details of the mapping process.

The pro-/epilogue GUI 740 concerns the following rules, in accordance with an embodiment of the present invention. In the following, the notion is: (C semantic, CoSy® rule). However, the present invention is not limited to the programming language C or to the CoSy® environment.

Rule-C: SP=FP; CoSy®: FP→SP. Needed to copy the frame-pointer (FP) to the stack-pointer (SP). The instruction assigned to this rule will also be used for an assignment of the SP to the FP. During generation, the registers names will simply be exchanged for this case. Thus, the instruction is also capable of assigning the SP to the FP.

Rule-C: SP=SP+Immediate; CoSy®: mirPlus(SP, Immediate)→SP. This rule is used to increase the stack-pointer by a constant value.

Rule-C: SP=SP−Immediate; CoSy®: mirSub(SP, Immediate)→SP. The stack-pointer is reduced by a constant using the instruction assigned to this rule.

Rule-C: SP=Stackbase; CoSy®: mirAssign(SP, Stackbase)→SP. The first assign rule is used to initialize the SP in the very first function of a program, generally main. A stackbase symbol ("_stackbase") will be generated in the assembly file, which can be defined during the invocation of a linker, thus determining the absolute stack frame location in memory.

Rule-C: FP[Offset]=Reg; CoSy®: mirAssign(FP+Offset, Reg). In case registers have to be saved on the stack, this rule would be applied. At least one register non-terminal is specified in the non-terminal dialog that contains all pushable registers and the frame-pointer. Furthermore, the assigned instruction should be valid if the SP is used as base address instead of the FP.

Rule-C: Reg=FP[Offset]; CoSy®: mirContent(FP+Offset)→ Reg In the epilogue, the saved registers have to be restored. Therefore, an instruction is needed that loads registers from the address given by FP plus Offset. Again, one register non-terminal should contain the pushable registers and the FP. Restoring the FP will use the SP as base address, hence, this instruction should be correct for this case, as well.

Rule-C: return; CoSy®: mirReturn. Specifies the instruction used to return to the caller.

Rule-C: goto Label; CoSy®: mirGoto(Label) The epilogue of the main function will generate an endless loop. Therefore, an instruction is needed that jumps to a label.

Figure 7E:
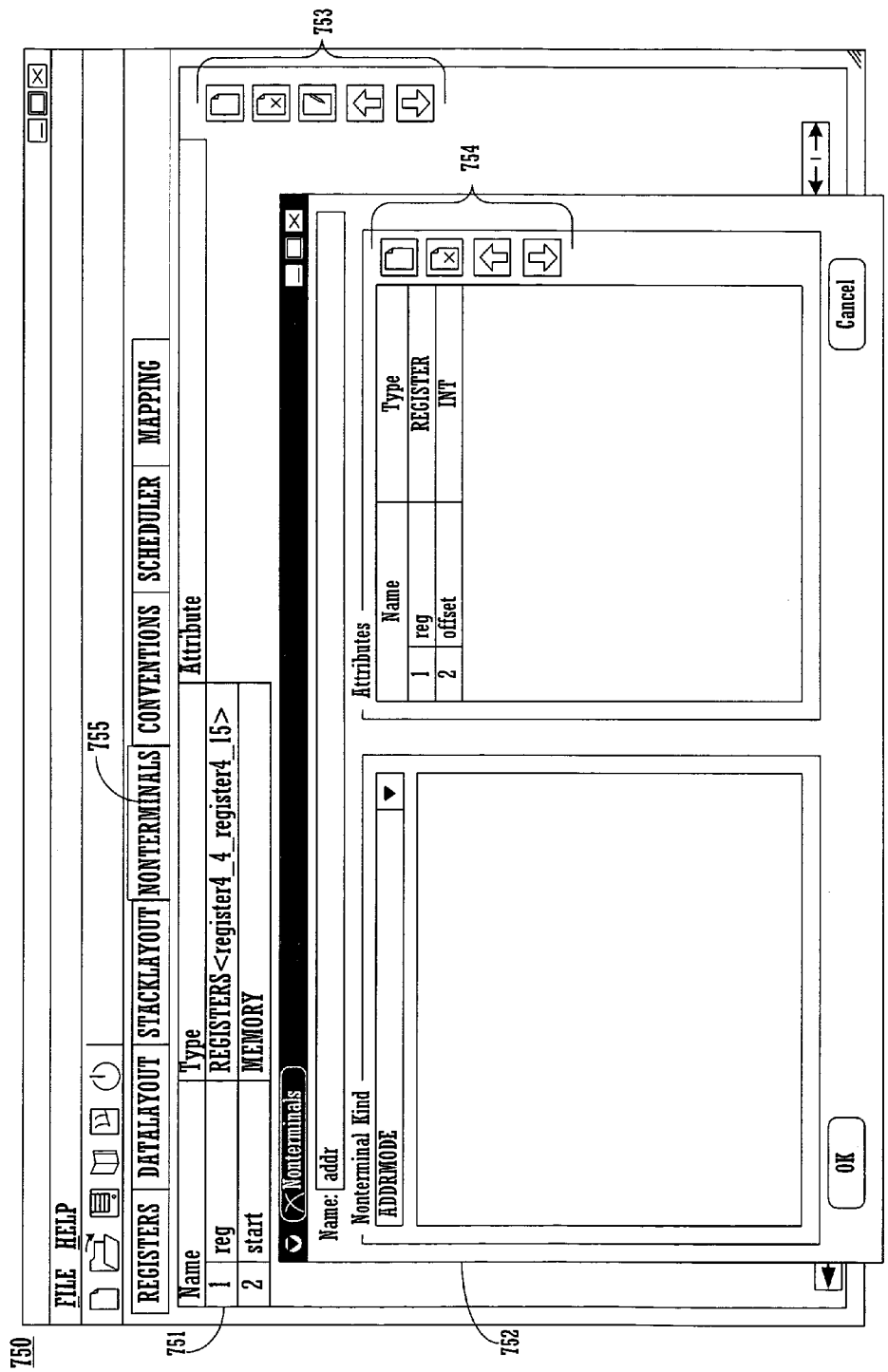

FIG. 7E illustrates an exemplary non-terminals dialog 750, in accordance with an embodiment of the present invention. The exemplary non-terminals dialog 750 provides for the declaration of non-terminals. Non-terminals refer to data paths between instructions or inside of instructions that are in common with several instructions. For example, the non-terminal with the name "reg" can be used to represent all registers of the global register file. A common data path like register-offset addressing mode (used by several load/store instructions) is another example of non-terminals.

Non-terminals are used to factorize the tree grammar rules of the instruction selector. This means that an IR pattern, specified in the mapping dialog, produces its result in a non-terminal, which can be the input of other IR patterns. This also means that non-terminals can have attributes. For example, if a pattern was specified for mapping an address constructed by the sum of the stack-pointer and an offset, the name of the stack-pointer register and the offset value will be written to the non-terminal attributes. A hypothetical rule for loading data from memory could have this non-terminal as input and use the attributes to fill the arguments of assembly instructions loading data from memory.

The non-terminals used for mapping IR patterns to assembly instructions are listed in the non-terminals dialog 750 depicted in FIG. 7E. The main window 751 lists all existing non-terminal names, their types, and potential attributes. Non-terminals are added, removed or modified with the buttons 753 on the right hand side of the main window 751. A separate dialog 752, which has its own buttons 754, facilitates the adding, removing, and modifying of non-terminals. A nonterminal tab 755 has been selected in FIG. 7E to bring up the nonterminals dialog.

The non-terminal has an arbitrary but unique name. Several kinds of non-terminals are supported in accordance with this embodiment of the present invention. Following is a brief description of several non-terminal types. Other kinds of non-terminals could be supported, if desired.

REGISTERS: This non-terminal kind is used for grammar rules that produce results in processor registers. After instruction selection, the register allocator will assign a register to all rule instances of this kind that are used to cover the IR tree. The selection of the REGISTER kind activates a list box (not depicted in FIG. 7E). In the list box, the list of registers that are contained in the non-terminal can be specified.

ADDRMODE: REGISTER non-terminals are usually used to pass data between instructions. In contrast, the ADDRMODE non-terminal is used to factor out addressing modes common to several instructions. Attributes can be associated with ADDRMODE non-terminals. The dialog depicts the attributes that are used for a register offset addressing mode. Currently supported types of attributes are registers and integers.

MEMORY: Statement rules, e.g., rules that do not produce any non-terminal or that store their result in memory, are of the MEMORY kind.

UNIQUE: The UNIQUE non-terminal kind is used for rules that produce their result in a unique location. Comparison instructions that write to a single condition code register are a typical example. The scheduler makes sure that only one condition code value is live at any time. Consequently, the register allocator is not affected by this non-terminal kind.

The separate dialog 752 in FIG. 7E illustrates the specification of a register offset addressing mode. The non-terminal name is "addr." It is of "ADDRMODE" kind and has the attributes "reg" and "offset." The attributes represent a register and an integer respectively.

Table I is exemplary code that is generated in accordance with an embodiment of the present invention. The code, which is suitable for use as a compiler description, describes non-terminal information, in accordance with an embodiment of the present invention. Some of the information is provided by the user in various dialogs. For example, the registers may be automatically extracted from an architecture description. The pushable registers, saved registers, callee changed registers, and available registers may be user-specified. For example, dialogs 750 and 752 may be used to input various information about registers that is included in the exemplary code in Table I.

TABLE I

NONTERMINALS
  Nt_regi REGISTERS
    <
      reg_idx_1, reg_idx_2, reg_idx_3, reg_idx_4, reg_idx_5, reg_idx_6, reg_idx_7, reg_idx_8,
      reg_idx_9, reg_idx_10, reg_idx_11, reg_idx_12, reg_idx_13, reg_idx_14, reg_idx_15
    >;
  Nt_addr ADDRMODE CONDITIONAL
  (
    base:gcgRegister;
    imm8:INT;
  );
  Nt_imm12 ADDRMODE CONDITIONAL
  (
    value:INT;
  );
  Nt_imm16 ADDRMODE CONDITIONAL
  (
    value:INT;
  );
  memarglist MEMORY;
  regarglist ADDRMODE;
© 2003, Coware, Inc.

Figure 7F:
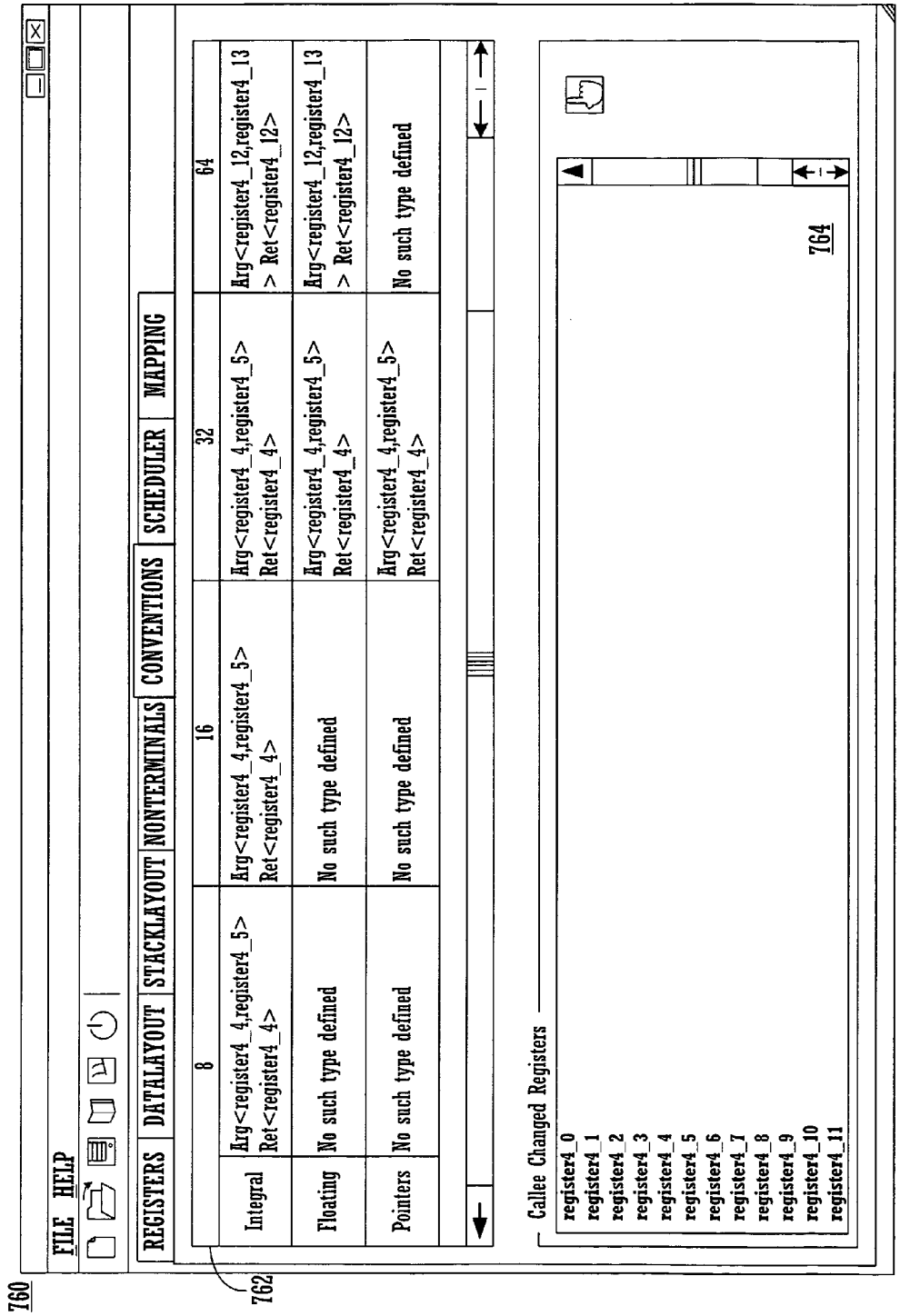

FIG. 7F illustrates a calling conventions dialog 760, in accordance with an embodiment of the present invention. The calling conventions dialog 760 allows a user to specify how function arguments are passed to a function and where the return value is stored. Arguments and the return value can either be passed through registers or through the stack. A table 762 allows a user to specify which registers are used for various data types that may be supported. The four columns of the table 762 cover various data type sizes. The upper row of the table 762 covers integer data types, such as char, short, int, long, and long The middle row of the table 762 covers floating point data types, such as float, double, long double). The bottom row covers pointers.

By double clicking the table elements, an ordered list of registers can be selected that is used to pass applicable function arguments/return values. If no register is specified or if all registers are already used by other arguments, then the argument/return value is passed via the stack instead.

For example, if the specification of FIG. 7F is applied to a hypothetical C function declared as: int f(long long a, char b, float c, short d), then the registers are assigned as follows. Register register4_12 would be used to pass the 64 bit integral long long argument "a." The integral 8-bit char b argument would go into register regster4_4. The same register could also be used for the float c argument. However, since this register is already occupied, register4_5 is utilized. The short d argument is passed over the stack because register4_4 and register4_5 are not available. The allocation of the register for the return value is independent from the arguments. Thus, the return value of the function will be passed in register4_4.

In the callee changed registers box 764 of the dialog, the callee saved registers are selected. If a function clobbers the contents of these registers, it has to restore the register contents at its end. There is no need to specify any caller saved registers (i.e., registers that are temporarily stored to memory by the calling function before a function call. The generated compiler automatically stores the appropriate registers on the stack. If the definition of the callee is visible to the compiler it calculates the set of caller saved registers by taking an intersection of registers alive at calling time with the set of registers modified by the callee not in the callee saved register set. Otherwise, it stores all registers alive at calling time.

Table II is exemplary code that is generated in accordance with an embodiment of the present invention. The code, which is suitable for use as a compiler description, describes various register information, in accordance with an embodiment of the present invention. Some of the information is automatically extracted from an architecture description. Some of the information is provided by the user in various dialogs. For example, the registers may be automatically extracted from an architecture description. The pushable registers, saved registers, callee changed registers, and available registers may be user-specified. For example, dialogs 700, 710, 730, and 760 may be used to input various information about registers that is included in the exemplary code in Table II.

TABLE II

REGISTERS
  reg_idx_0,
  reg_idx_1,
  reg_idx_2,
  reg_idx_3,
  reg_idx_4,
  reg_idx_5,
  reg_idx_6,
  reg_idx_7,
  reg_idx_8,
  reg_idx_9,
  reg_idx_10,
  reg_idx_11,
  reg_idx_12,
  reg_idx_13,
  reg_idx_14,
  reg_idx_15;
pushable :
    reg_idx_1, reg_idx_2, reg_idx_3, reg_idx_4, reg_idx_5,
    reg_idx_6, reg_idx_7, reg_idx_8, reg_idx_9, reg_idx_10,
  reg_idx_11, reg_idx_12, reg_idx_13, reg_idx_14, reg_idx_15;
  implicit_saved : reg_idx_14, reg_idx_13;
  abi_callee_changed :
    reg_idx_4, reg_idx_5, reg_idx_6, reg_idx_7, reg_idx_8,
    reg_idx_9, reg_idx_10, reg_idx_11, reg_idx_12, reg_idx_13,

TABLE II-continued

```
    reg_idx_14, reg_idx_15;
  sz32_regs :
      reg_idx_1, reg_idx_2, reg_idx_3, reg_idx_4, reg_idx_5,
      reg_idx_6, reg_idx_7, reg_idx_8, reg_idx_9, reg_idx_10,
    reg_idx_11, reg_idx_12, reg_idx_13, reg_idx_14, reg_idx_15;
    AVAIL <
      reg_idx_1, reg_idx_2, reg_idx_3, reg_idx_4, reg_idx_5,
      reg_idx_6, reg_idx_7, reg_idx_8, reg_idx_9, reg_idx_10,
    reg_idx_11, reg_idx_12, reg_idx_13, reg_idx_14, reg_idx_15 >;
      © 2003, Coware, Inc.
```

Figure 7G:
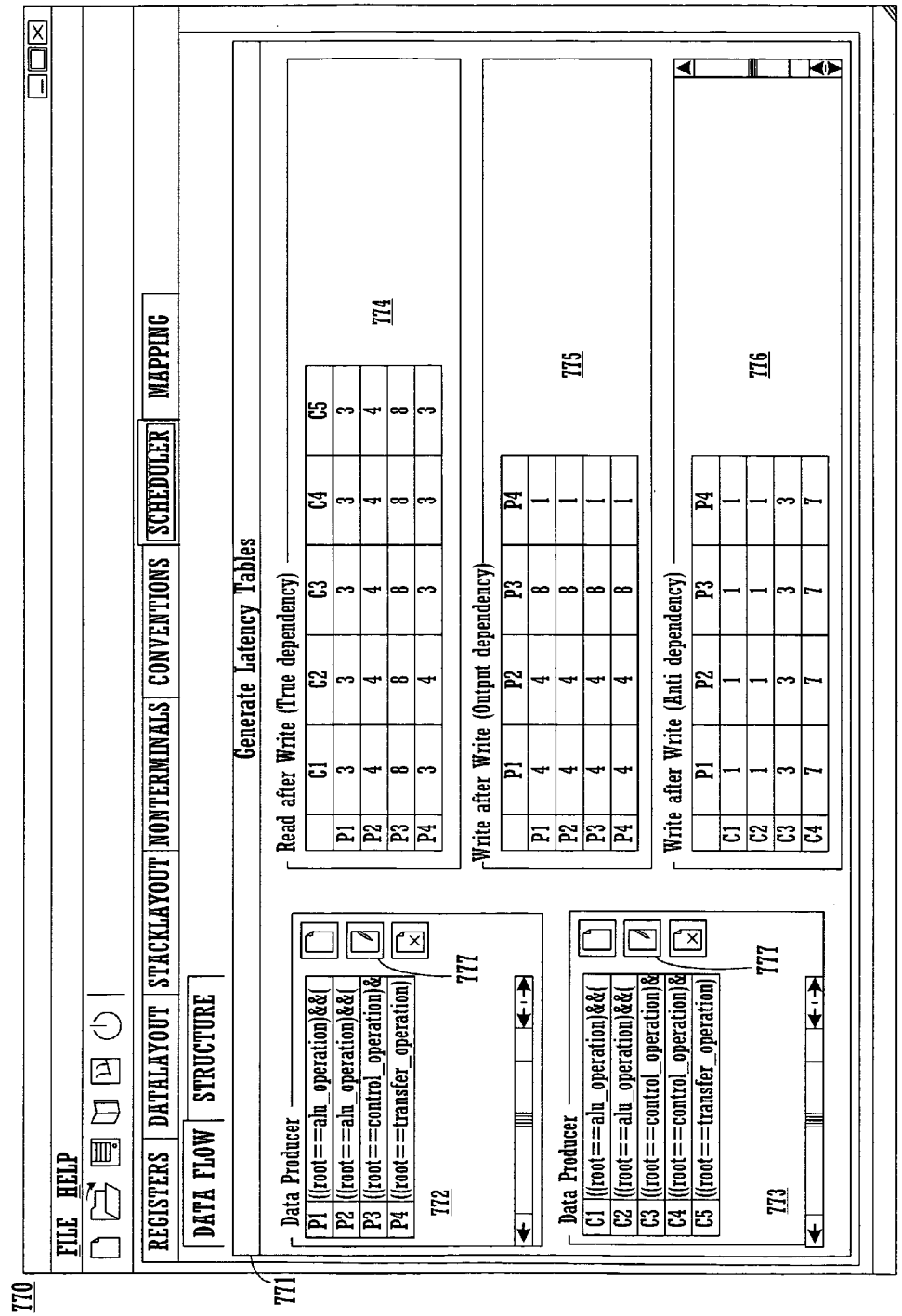

FIG. 7G illustrates a scheduler data-flow dialog 770, in accordance with an embodiment of the present invention. An instruction scheduler decides in which sequence assembly instructions are issued on the target architecture. The scheduler is also responsible for deciding which instructions can be executed in parallel. Any scheduler has to avoid data flow hazards and structural hazards. The instruction latency information required for the data flow part is depicted in the dialog of FIG. 7G.

A data producer table 772 and a data consumer table 773 list sets of instructions referred to as "data producers" or "data consumers." A read after write table 774, a write after write table 775, and a write after read table 776 specify, respectively, the true, output dependency, and anti-dependence latency in clock cycles for the instructions. Using the Generate Latency Tables button 771, the information in tables 772, 773, 774, 775, and 776 is automatically extracted from the architecture description in accordance with an embodiment of the present invention.

The extracted values in tables 774, 775, and 776 can be overridden by the user. This may be useful because the current version of the analysis tool does not recognize processor hardware for hiding latencies (e.g., forwarding paths). It may be further useful if the computed latency of instructions that utilize forwarding logic is greater than necessary (which is a conservative analysis result). The user of the GUI can enter the correct latency values in the tables 774, 775, and 776.

The producer/consumer instruction sets in tables 772 and 773 are generated automatically using the Generate Latency Tables button 771. However, they may be added/edited/removed manually by using the buttons 777 in the producers and consumers boxes 772, 773.

Figure 7H:
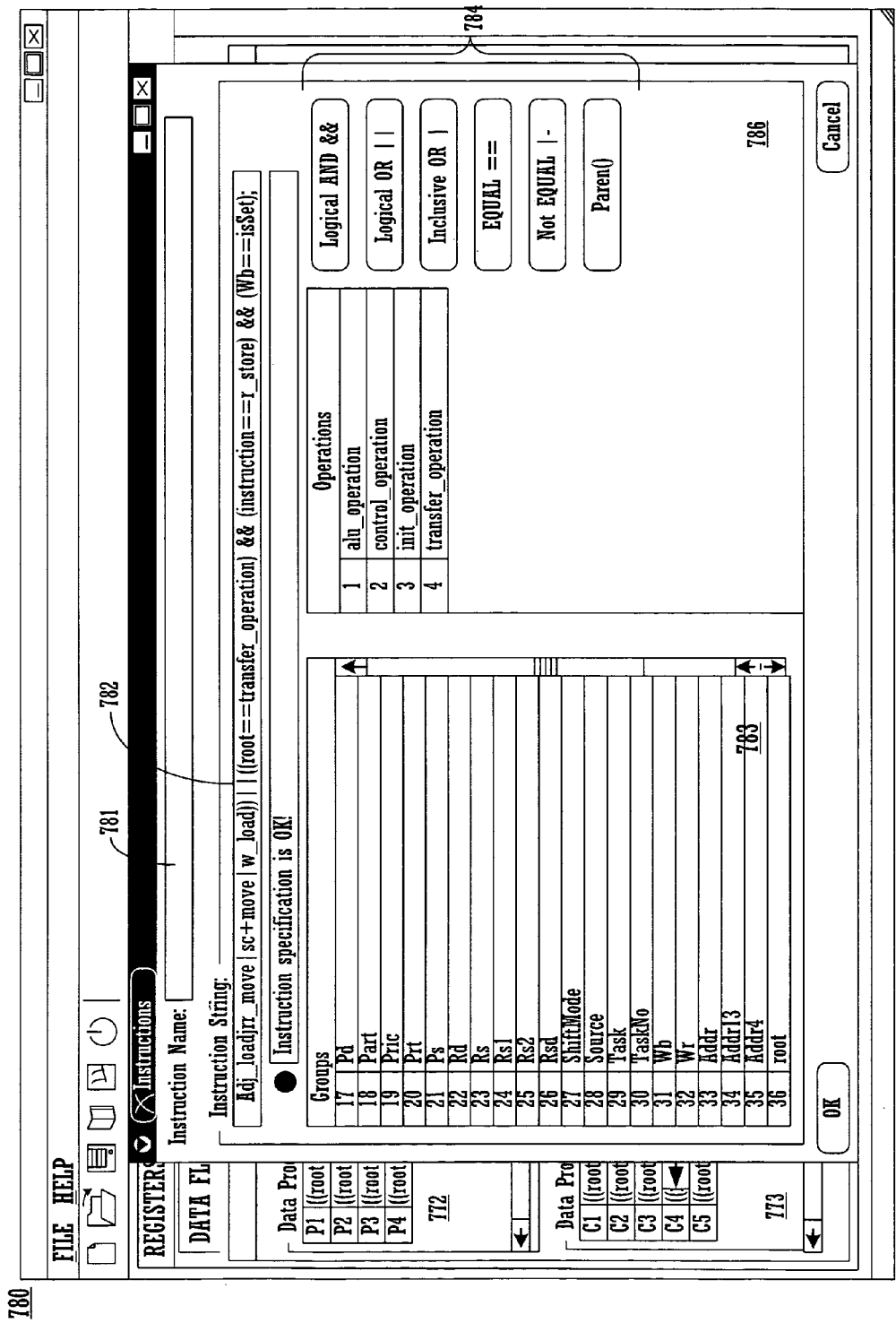

FIG. 7H illustrates an exemplary dialog for selecting the producer/consumer instruction sets 780, in accordance with an embodiment of the present invention. The discussion of FIG. 7H is for an embodiment that uses the LISA language. It will be understood that the present invention is not limited to the LISA language. The producer/consumer name 781 is displayed on top of this dialog 780. The next line contains an automatically generated Boolean expression 782. This expression describes a set of valid instruction declaration trees. The root of an instruction declaration tree is the LISA INSTRUCTION operation as specified in the LISA model, in accordance with an embodiment of the present invention. This operation usually contains GROUPs or INSTANCEs that recursively refer to other operations forming the instruction declaration tree.

For a specific assembly instruction the children of all GROUPs are selected. Such selections are tested in the Boolean expression. An example expression would be (instruction==integer_insn) && (opcode==add), wherein instruction and opcode are LISA GROUPs and integer_insn and add are names of LISA operations. If the expression evaluates to true for an instruction, it is associated with the producer/consumer name. If the expressions of several producers/consumers evaluate to true, the producer/consumer name with the smaller index is used (according to tables 772 and 773).

Valid operators in the Boolean expression are the logical and (&&) and the logical or (II) operators, parentheses, and LISA-GROUP expressions. A LISA-GROUP expression starts with the name of a GROUP declared in the LISA model, followed by an equal (==) or a not equal (!=) sign and a list of OPERATION names separated by a vertical bar (I). A LISA-GROUP expression evaluates to true if the declaration tree of the instruction in question contains a group whose selected son operation is (or is not) part of the operation name list.

An example of a LISA-GROUP expression would be opcode==addlsub which evaluates to true if the instruction in question has a GROUP called opcode that has a selected son operation with the name add or sub.

The group list 783 on the left hand side of the dialog 780 lists all GROUPS of the LISA processor model. If an entry is selected the OPERATIONs that are declared in the GROUP are displayed in the operations column 786. Clicking a GROUP or an OPERATION in respectively columns 783 or 786 inserts the corresponding name into the Boolean expression field 782 at the current cursor position. Similarly, operations can be inserted by clicking the buttons 784 on the right hand side of the window. It is possible to exclude LISA processor resources from the latency analysis. This is useful, for example, if instructions write or read registers or resources that are used for debugging, only.

Figure 7I:
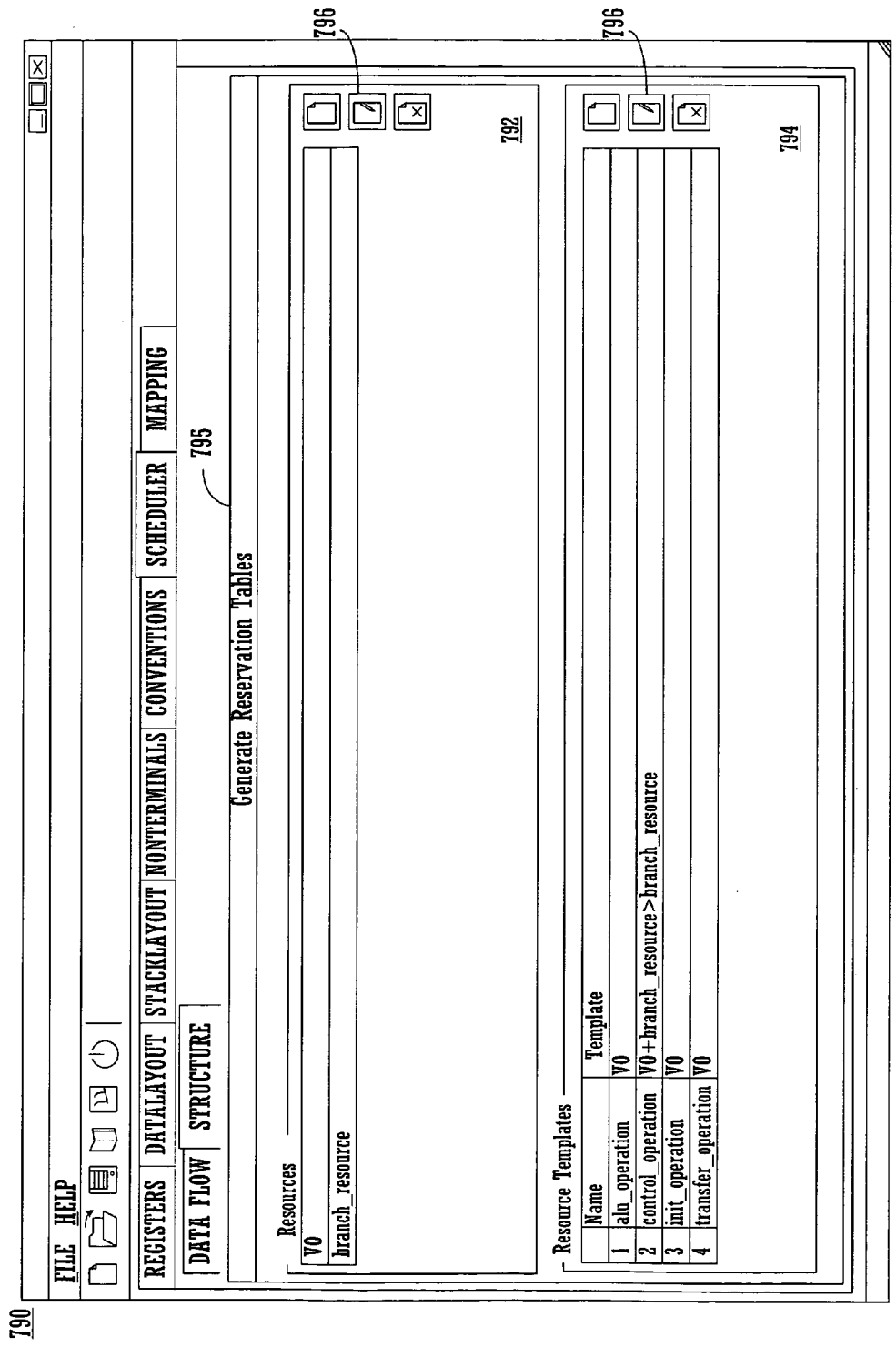

FIG. 7I illustrates an exemplary scheduler instruction dialog 790, in accordance with an embodiment of the present invention. The discussion of FIG. 7I describes an embodiment that uses the LISA language. However, it will be understood that the present invention is not limited to the LISA language. The scheduler structure dialog 790 as depicted in FIG. 7I implements a reservation table based concept to avoid structural hazards. In the upper half of the resources frame 792 arbitrary resource names can be defined by the user.

The resource templates frame 794 utilizes these resources to create reservation tables. These tables are associated with LISA-INSTRUCTIONs, in accordance with an embodiment of the present invention. This means that scheduling of instructions leads to an allocation of the specified resources. Furthermore, an instruction can only be scheduled if the specified resources are available.

Resources do not necessarily have a direct correspondence to hardware resources. Their only purpose is to express valid instruction combinations by the reservation tables. All entries in this dialog can automatically be generated by pressing the Generate Reservation Tables button 795 on top of the window. Frame entries can be added, edited, or deleted by the buttons 796 on the right hand side of the window.

Figure 7J:
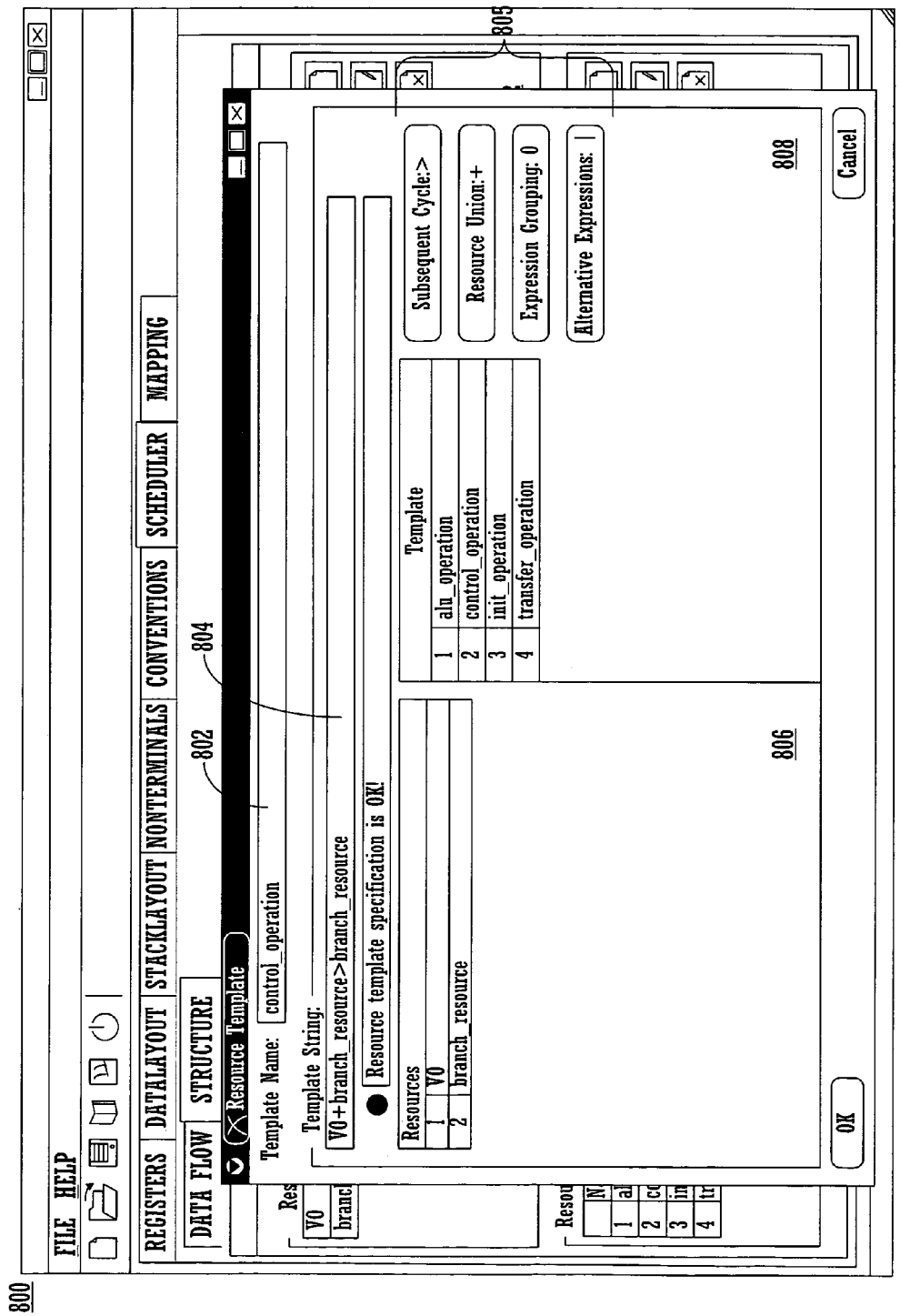
Figure 7K:
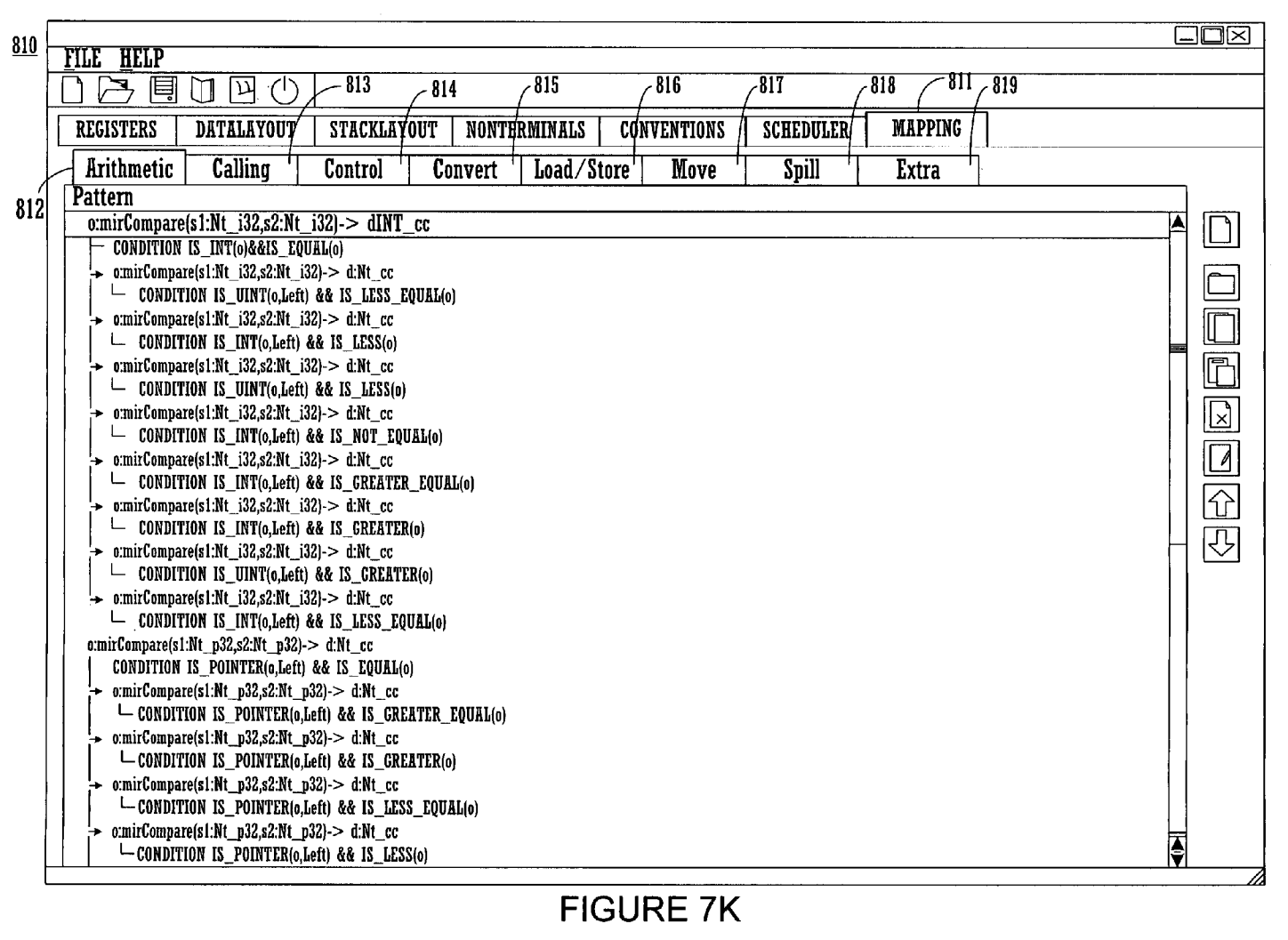
Figure 7L:
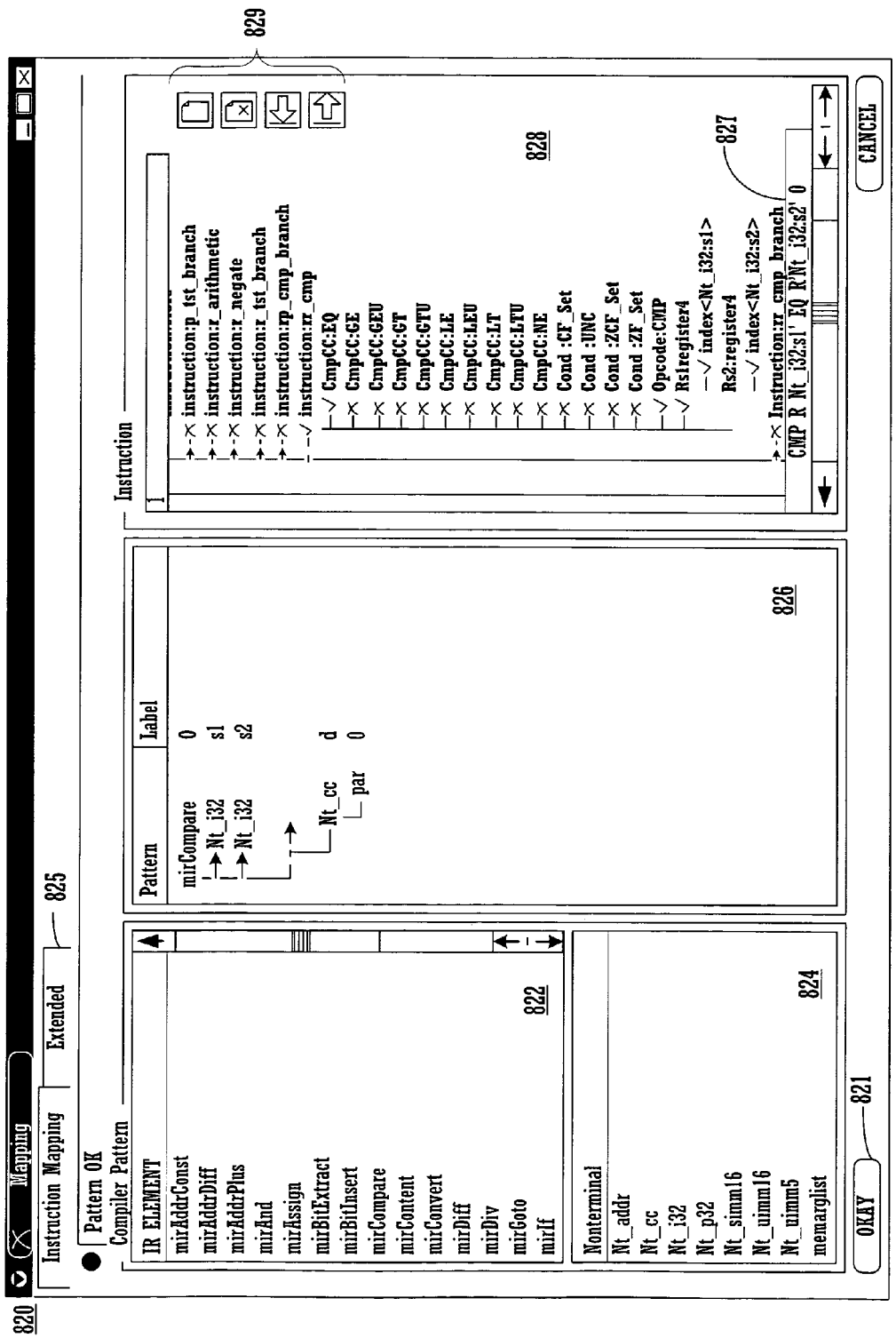
Figure 7N:
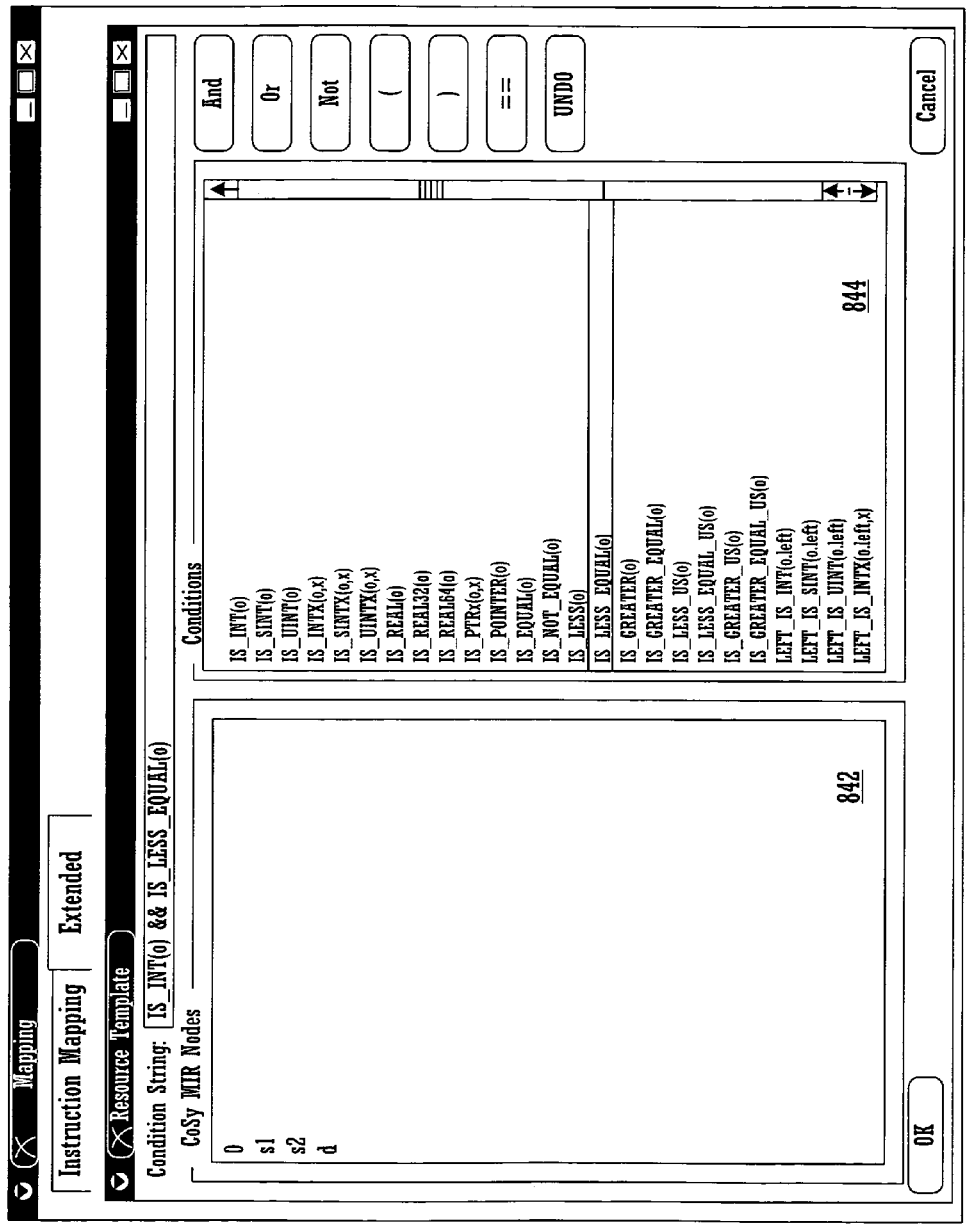

A so-called resource template expression is used to model the reservation table. An exemplary dialog 800, in accordance with an embodiment of the present invention, for adding/editing resource templates is depicted in FIG. 7J. The discussion of FIG. 7J describes an embodiment that uses the LISA language. However, it will be understood that the present invention is not limited to the LISA language. The LISA-INSTRUCTION name is depicted in the template name box 802 of this dialog 800. The template string 804 contains elements and operators. Elements are resources or the names of other templates. This means that it is possible to factorize reservation tables. The following is a list of valid operators:

Resource union (+): The resource union creates sets of resources. This operator is used if an instruction allocates several resources.

Subsequent cycle (>): The execution of an instruction is usually not finished in one cycle. To allocate different resources in subsequent cycles the >operator can be used.

Alternatives (I): If instructions can allocate alternative resources (e.g., one register file port out of two) the "I" operator can be used to express the alternative resources.

Grouping ( ): Operator precedence can be overridden by parentheses.

A number of buttons 805 are provided for editing purposes. The text of resources is inserted at the current cursor position into the template string 804 by clicking the appropriate items in the resource box 806. The template box 808 is used to select the instruction to be edited, as appears in the template name box 802.

FIG. 7K illustrates an exemplary mapping dialog 810, in accordance with an embodiment of the present invention. The discussion of FIG. 7K describes an embodiment that uses the LISA language. However, it will be understood that the present invention is not limited to the LISA language. Mapping between the compiler's IR tree nodes and the assembly instructions is done in the mapping dialog 810, in accordance with an embodiment of the present invention. The entries in this dialog 810 directly correspond to grammar rules used to generate the tree pattern matcher. This dialog 810 allows several classes of IR nodes to be defined such that a working compiler may be generated. Each class of IR instructions has its own tab 812 in the dialog. The mapping tab 811 and the arithmetic tab 812 have been selected, in this example.

Several tables of exemplary code have been presented for various types of IR nodes. A detailed explanation of all IR nodes is provided in "ACE Associated Compiler Experts by. CCMIR Definition, May 2003, Specification in fSDL, Description and Rationale."

The code in table III is exemplary code for arithmetic IR nodes that is generated in accordance with an embodiment of the present invention. A user may input information that is useable to generate such exemplary code through, for example, the arithmetic tab 812 of the mapping dialog 810. The arithmetic IR nodes related to arithmetic operations: mirPlus (a+b), mirDiff (a−b), mirAddrPlus (ptr+b), mirAddrDiff (ptr−b), mirShiftLeft (a<<b), mirShiftRight (a>>b), mirShiftRightSign (a>>b), mirOr (aIb and aIIb), mirAnd (a&b and a&&b), mirXor (a^p), mirNot (!a and ~a), mirNeg (−a), and mirCompare (a<b, a<=b, a==b, a !=b, a>=b, a>b).

TABLE III

RULE [mirPlus_Nt_regi_Nt_regi__Nt_regi_30] o:mirPlus(src1:Nt_regi,src2:Nt_regi) -> dst:Nt_regi;
COST 1;
EMIT
{
 fprintf(OUTFILE,"\tpacks \042decode;P2;C1;decode;\042,1\n");
 fprintf(OUTFILE,"\t.packs \042FPC:(r,0);prog_mem:(r,0);dc_src2:(r,0);dc_src1:(r,0);R:(r,0);FPC:(w,0);dc_src1:(w,0);dc_src2:(w,0);alu_operand1:(r,1);alu_operand2:(r,1);EPC:(w,1);alu_operand1:(w,1);alu_operand2:(w,1);R:(w,2);\042,2\n");
 fprintf(OUTFILE,"\t.packs \042   r%s = r%s + r%s\042,3\n",REGNAME(dst),REGNAME(src1),REGNAME(src2));
}
RULE [mirDiff_Nt_regi_Nt_regi__Nt_regi_31] o:mirDiff(src1:Nt_regi,src2:Nt_regi) -> dst:Nt_regi;
COST 1;
EMIT
{
 fprintf(OUTFILE,"\t.packs \042decode;P2;C1;decode;\042,1\n");
 fprintf(OUTFILE,"\t.packs \042FPC:(r,0);prog_mem:(r,0);dc_src2:(r,0);dc_src1:(r,0);R:(r,0);FPC:(w,0);dc_src1:(w,0);dc_src2:(w,0);alu_operand1:(r,1);alu_operand2:(r,1);EPC:(w,1);alu_operand1:(w,1);alu_operand2:(w,1);R:(w72);\042,2\n");
 fprintf(OUTFILE,"\t.packs \042   r%s = r%s − r%s\042,3\n",REGNAME(dst),REGNAME(src1),REGNAME(src2));
}
RULE [mirAnd_Nt_regi_Nt_regi__Nt_regi_32] o:mirAnd(src1:Nt_regi,src2:Nt_regi) -> dst:Nt_regi;
COST 1;
EMIT
{
 fprintf(OUTFILE,"\t.packs \042decode;P2;C1;decode;\042,1\n");
 fprintf(OUTFILE,"\t.packs \042FPC:(r,0);prog_mem:(r,0);dc_src2:(r,0);dc_src1:(r,0);R:(r,0);FPC:(w,0);dc_src1:(w,0);dc_src2:(w,0);alu_operand1:(r,1);alu_operand2:(r,1);EPC:(w,1);alu_operand1:(w,1);alu_operand2:(w,1);R:(w,2);\042,2\n");
 fprintf(OUTFILE,"\t.packs \042   r%s =r%s & r%s\042,3\n",REGNAME(dst),REGNAME(src1),REGNAME(src2));
}
RULE [mirMult_Nt_regi_Nt_regi__Nt_regi_33] o:mirMult(src1:Nt_regi,src2:Nt_regi) -> dst:Nt_regi;
COST 1;
EMIT
{
 fprintf(OUTFILE,"\t.packs \042decode;P2;C1;decode;\042,1\n");
 fprintf(OUTFILE,"\t.packs \042FPC:(r,0);prog_mem:(r,0);dc_src2:(r,0);dc_src1:(r,0);R:(r,0);FPC:(w,0);dc_src1:(w,0);dc_src2:(w,0);alu_operand1:(r,1);alu_operand2:(r,1);EPC:(w,1);alu_operand1:(w,1);alu_operand2:(w,1);R:(w,2);\042,2\n");
 fprintf(OUTFILE,"\t.packs \042   r%s = r%s * r%s\042,3\n",REGNAME(dst),REGNAME(src1),REGNAME(src2));
}

TABLE III-continued

```
RULE [mirShiftLeft_Nt_regi_Nt_regi__Nt_regi_34] o:mirShiftLeft(src1:Nt_regi,src2:
Nt_regi) -> dst:Nt_regi;
COST 1;
EMIT
{
   fprintf(OUTFILE,"\t.packs \042decode;P2;C1;decode;\042,1\n");
   fprintf(OUTFILE,"\t.packs
\042FPC:(r,0);prog_mem:(r,0);dc_src2:(r,0);dc_src1:(r,0);R:(r,0);FPC:(w,0);dc_src1:(w,0);dc_
src2:(w,0);alu_operand1:(r,1);alu_operand2:(r,1);EPC:(w,1);alu_operand1:(w,1);alu_operand2:
(w,1);R:(w,2);\042,2\n");
   fprintf(OUTFILE,"\t.packs \042    r%s = r%s <<
r%s\042,3\n",REGNAME(dst),REGNAME(src1),REGNAME(src2));
}
RULE [mirOr_Nt_regi_Nt_regi__Nt_regi_35] o:mirOr(src1:Nt_regi,src2:Nt_regi) -> dst:
Nt_regi;
COST 1;
EMIT
{
   fprintf(OUTFILE,"\t.packs \042decode;P2;C1;decode;\042,1\n");
   fprintf(OUTFILE,"\t.packs
\042FPC:(r,0);prog_mem:(r,0);dc_src2:(r,0);dc_src1:(r,0);R:(r,0);FPC:(w,0);dc_src1:(w,0);dc_
src2:(w,0);alu_operand1:(r,1);alu_operand2:(r,1);EPC:(w,1);alu_operand1:(w,1);alu_operand2:
(w,1);R:(w,2);\042,2\n");
   fprintf(OUTFILE,"\t.packs \042    r%s = r%s I
r%s\042,3\n",REGNAME(dst),REGNAME(src1),REGNAME(src2));
}
RULE [mirShiftRight_Nt_regi_Nt_regi__Nt_regi_36] o:mirShiftRight(src1:Nt_regi,src2:
Nt_regi) -> dst:Nt_regi;
COST 1;
EMIT
{
   fprintf(OUTFILE,"\t.packs \042decode;P2;C1;decode;\042,1\n");
   fprintf(OUTFILE,"\t.packs
\042FPC:(r,0);prog_mem:(r,0);dc_src2:(r,0);dc_src1:(r,0);R:(r,0);FPC:(w,0);dc_src1:(w,0);dc_
src2:(w,0);alu_operand1:(r,1);alu_operand2:(r,1);EPC:(w,1);alu_operand1:(w,1);alu_operand2:
(w,1);R:(w,2);\042,2\n");
   fprintf(OUTFILE,"\t.packs \042    r%s = r%s >>
r%s\042,3\n",REGNAME(dst),REGNAME(src1),REGNAME(src2));
}
RULE [mirXor_Nt_regi_Nt_regi__Nt_regi_37] o:mirXor(src1:Nt_regi,src2:Nt_regi) ->
dst:Nt_regi;
COST 1;
EMIT
{
   fprintf(OUTFILE,"\t.packs \042decode;P2;C1;decode;\042,1\n");
   fprintf(OUTFILE,"\t.packs
\042FPC:(r,0);prog_mem:(r,0);dc_src2:(r,0);dc_src1:(r,0);R:(r,0);FPC:(w,0);dc_src1:(w,0);dc_
src2:(w,0);alu_operand1:(r,1);alu_operand2:(r,1);EPC:(w,1);alu_operand1:(w,1);alu_operand2:
(w,1);R:(w,2);\042,2\n");
   fprintf(OUTFILE,"\t.packs \042    r%s = r%s ^
r%s\042,3\n",REGNAME(dst),REGNAME(src1),REGNAME(src2));
}
RULE [mirPlus_Nt_regi_Nt_imm12__Nt_regi_38] o:mirPlus(src1:Nt_regi,src2:Nt_imm12) ->
dst:Nt_regi;
COST 1;
EMIT
{
   fprintf(OUTFILE\t.packs \042decode;P2;C1;decode;\042,1\n");
   fprintf(OUTFILE,"\t.packs
\042FPC:(r,0);prog_mem:(r,0);dc_src2:(r,0);dc_src1:(r,0);R:(r,0);FPC:(w,0);dc_src1:(w,0);dc_
src2:(w,0);alu_operand1:(r,1);alu_operand2:(r,1);EPC:(w,1);alu_operand1:(w,1);alu_operand2:
(w,1);R:(w,2);\042,2\n");
   fprintf(OUTFILE,"\t.packs \042    r%s = r%s +
%d\042,3\n",REGNAME(dst),REGNAME(src1),src2.value);
}
RULE [mirAnd_Nt_regi_Nt_imm12__Nt_regi_39] o:mirAnd(src1:Nt_regi,src2:Nt_imm12) ->
dst:Nt_regi;
COST 1;
EMIT
{
   fprintf(OUTFILE,"\t.packs \042decode;P2;C1;decode;\042,1\n");
   fprintf(OUTFILE,"\t.packs
\042FPC:(r,0);prog_mem:(r,0);dc_src2:(r,0);dc_src1:(r,0);R:(r,0);FPC:(w,0);dc_src1:(w,0);dc_
src2:(w,0);alu_operand1:(r,1);alu_operand2:(r,1);EPC:(w,1);alu_operand1:(w,1);alu_operand2:
(w,1);R:(w,2);\042,2\n");
   fprintf(OUTFILE,"\t.packs \042    r%s = r%s &
%d\042,3\n",REGNAME(dst),REGNAME(src1),src2.value);
}
RULE [mirShiftLeft_Nt_regi_Nt_imm12__Nt_regi_40]
o:mirShiftLeft(src1:Nt_regi,src2:Nt_imm12) -> dst:Nt_regi;
```

TABLE III-continued

```
COST 1;
EMIT
{
    fprintf(OUTFILE,"\t.packs \042decode;P2;C1;decode;\042,1\n");
    fprintf(OUTFILE,"\t.packs
\042FPC:(r,0);prog_mem:(r,0);dc_src2:(r,0);dc_src1:(r,0);R:(r,0);FPC:(w,0);dc_src1:(w,0);dc_
src2:(w,0);alu_operand1:(r,1);alu_operand2:(r,1);EPC:(w,1);alu_operand1:(w,1);alu_operand2:
(w,1);R:(w,2);\042,2\n");
    fprintf(OUTFILE,"\t.packs \042    r%s = r%s <<
%d\042,3\n",REGNAME(dst),REGNAME(src1),src2.value);
}
RULE [mirMult_Nt_regi_Nt_imm12__Nt_regi_41] o:mirMult(src1:Nt_regi,src2:Nt_imm12) ->
dst:Nt_regi;
COST 1;
EMIT
{
    fprintf(OUTFILE,"\t.packs \042decode;P2;C1;decode;\042,1\n");
    fprintf(OUTFILE,"\t.packs
\042FPC:(r,0);prog_mem:(r,0);dc_src2:(r,0);dc_src1:(r,0);R:(r,0);FPC:(w,0);dc_src1:(w,0);dc_
src2:(w,0);alu_operand1:(r,1);alu_operand2:(r,1);EPC:(w,1);alu_operand1:(w,1);alu_operand2:
(w,1);R:(w,2);\042,2\n");
    fprintf(OUTFILE,"\t.packs \042    r%s = r%s *
%d\042,3\n",REGNAME(dst),REGNAME(src1),src2.value);
}
RULE [mirOr_Nt_regi_Nt_imm12__Nt_regi_42] o:mirOr(src1:Nt_regi,src2:Nt_imm12) ->
dst:Nt_regi;
COST 1;
EMIT
{
    fprintf(OUTFILE,"\t.packs \042decode;P2;C1;decode;\042,1\n");
    fprintf(OUTFILE,"\t.packs
\042FPC:(r,0);prog_mem:(r,0);dc_src2:(r,0);dc_src1:(r,0);R:(r,0);FPC:(w,0);dc_src1:(w,0);dc_
src2:(w,0);alu_operand1:(r,1);alu_operand2:(r,1);EPC:(w,1);alu_operand1:(w,1);alu_operand2:
(w,1);R:(w,2);\042,2\n");
    fprintf(OUTFILE,"\t.packs \042    r%s = r%s I
%d\042,3\n",REGNAME(dst),REGNAME(src1),src2.value);
}
RULE [mirShiftRight_Nt_regi_Nt_imm12__Nt_regi_43]
o:mirShiftRight(src1:Nt_regi,src2:Nt_imm12) -> dst:Nt_regi;
COST 1;
EMIT
{
    fprintf(OUTFILE,"\t.packs \042decode;P2;C1;decode;\042,1\n");
    fprintf(OUTFILE,"\t.packs
\042FPC:(r,0);prog_mem:(r,0);dc_src2:(r,0);dc_src1:(r,0);R:(r,0);FPC:(w,0);dc_src1:(w,0);dc_
src2:(w,0);alu_operand1:(r,1);alu_operand2:(r,1);EPC:(w,1);alu_operand1:(w,1);alu_operand2:
(w,1);R:(w,2);\042,2\n");
    fprintf(OUTFILE,"\t.packs \042    r%s = r%s >>
%d\042,3\n",REGNAME(dst),REGNAME(src1),src2.value);
}
RULE [mirDiff_Nt_regi_Nt_imm12__Nt_regi_44] o:mirDiff(src1:Nt_regi,src2:Nt_imm12) ->
dst:Nt_regi;
COST 1;
EMIT
{
    fprintf(OUTFILE,"\t.packs \042decode;P2;C1;decode;\042,1\n");
    fprintf(OUTFILE,"\t.packs
\042FPC:(r,0);prog_mem:(r,0);dc_src2:(r,0);dc_src1:(r,0);R:(r,0);FPC:(w,0);dc_src1:(w,0);dc_
src2:(w,0);alu_operand1:(r,1);alu_operand2:(r,1);EPC:(w,1);alu_operand1:(w,1);alu_operand2:
(w,1);R:(w,2);\042,2\n");
    fprintf(OUTFILE,"\t.packs \042    r%s = r%s -
%d\042,3\n",REGNAME(dst),REGNAME(src1),src2.value);
}
RULE [mirXor_Nt_regi_Nt_imm12__Nt_regi_45] o:mirXor(src1:Nt_regi,src2:Nt_imm12) ->
dst:Nt_regi;
COST 1;
EMIT
{
    fprintf(OUTFILE,"\t.packs \042decode;P2;C1;decode;\042,1\n");
    fprintf(OUTFILE,"\t.packs
\042FPC:(r,0);prog_mem:(r,0);dc_src2:(r,0);dc_src1:(r,0);R:(r,0);FPC:(w,0);dc_src1:(w,0);dc_
src2:(w,0);alu_operand1:(r,1);alu_operand2:(r,1);EPC:(w,1);alu_operand1:(w,1);alu_operand2:
(w,1);R:(w,2);\042,2\n");
    fprintf(OUTFILE,"\t.packs \042    r%s = r%s ^
%d\042,3\n",REGNAME(dst),REGNAME(src1),src2.value);
}
RULE [mirCompare_Nt_regi_Nt_regi__Nt_regi_46] o:mirCompare(s1:Nt_regi,s2:Nt_regi) ->
dst:Nt_regi<reg_idx_1, reg_idx_2, reg_idx_3>;
CONDITION
{
```

TABLE III-continued

```
    IS_GREATER_EQUAL(o)
}
COST 1;
EMIT
{
    fprintf(OUTFILE,"\t.packs \042decode;P2;C1;decode;\042,1\n");
    fprintf(OUTFILE,"\t.packs
\042FPC:(r,0);prog_mem:(r,0);dc_src2:(r,0);dc_src1:(r,0);R:(r,0);FPC:(w,0);dc_src1:(w,0);dc_
src2:(w,0);alu_operand1:(r,1);alu_operand2:(r,1);EPC:(w,1);alu_operand1:(w,1);alu_operand2:
(w,1);R:(w,2);\042,2\n");
    fprintf(OUTFILE,"\t.packs \042    r%s = ( r%s >= r%s )
\042,3\n",REGNAME(dst),REGNAME(s1),REGNAME(s2));
}
RULE [mirCompare_Nt_regi_Nt_regi__Nt_regi_47] o:mirCompare(s1:Nt_regi,s2:Nt_regi) ->
dst:Nt_regi<reg_idx_1, reg_idx_2, reg_idx_3>;
COST 1;
CONDITION
{
    IS_EQUAL(o)
}
EMIT
{
    fprintf(OUTFILE,"\t.packs \042decode;P2;C1;decode;\042,1\n");
    fprintf(OUTFILE,"\t.packs
\042FPC:(r,0);prog_mem:(r,0);dc_src2:(r,0);dc_src1:(r,0);R:(r,0);FPC:(w,0);dc_src1:(w,0);dc_
src2:(w,0);alu_operand1:(r,1);alu_operand2:(r,1);EPC:(w,1);alu_operand1:(w,1);alu_operand2:
(w,1);R:(w,2);\042,2\n");
    fprintf(OUTFILE,"\t.packs \042    r%s = ( r%s == r%s
)\042,3\n",REGNAME(dst),REGNAME(s1),REGNAME(s2));
}
RULE [mirCompare_Nt_regi_Nt_regi__Nt_regi_48] o:mirCompare(s1:Nt_regi,s2:Nt_regi) ->
dst:Nt_regi<reg_idx_1, reg_idx_2, reg_idx_3>;
COST 1;
CONDITION
{
    IS_GREATER(o)
}
EMIT
{
    fprintf(OUTFILE,"\t.packs \042decode;P2;C1;decode;\042,1\n");
    fprintf(OUTFILE,"\t.packs
\042FPC:(r,0);prog_mem:(r,0);dc_src2:(r,0);dc_src1:(r,0);R:(r,0);FPC:(w,0);dc_src1:(w,0);dc_
src2:(w,0);alu_operand1:(r,1);alu_operand2:(r,1);EPC:(w,1);alu_operand1:(w,1);alu_operand2:
(w,1);R:(w,2);\042,2\n");
    fprintf(OUTFILE,"\t.packs \042    r%s = ( r%s > r%s )
\042,3\n",REGNAME(dst),REGNAME(s1),REGNAME(s2));
}
RULE [mirCompare_Nt_regi_Nt_regi__Nt_regi_49] o:mirCompare(s1:Nt_regi,s2:Nt_regi) ->
dst:Nt_regi<reg_idx_1, reg_idx_2, reg_idx_3>;
COST 1;
CONDITION
{
    IS_LESS_EQUAL(o)
}
EMIT
{
    fprintf(OUTFILE,"\t.packs \042decode;P2;C1;decode;\042,1\n");
    fprintf(OUTFILE,"\t.packs
\042FPC:(r,0);prog_mem:(r,0);dc_src2:(r,0);dc_src1:(r,0);R:(r,0);FPC:(w,0);dc_src1:(w,0);dc_
src2:(w,0);alu_operand1:(r,1);alu_operand2:(r,1);EPC:(w,1);alu_operand1:(w,1);alu_operand2:
(w,1);R:(w,2);\042,2\n");
    fprintf(OUTFILE,"\t.packs \042    r%s = ( r%s <= r%s )
042,3\n",REGNAME(dst),REGNAME(s1),REGNAME(s2));
}
RULE [mirCompare_Nt_regi_Nt_regi__Nt_regi_50] o:mirCompare(s1:Nt_regi,s2:Nt_regi) ->
dst:Nt_regi<reg_idx_1, reg_idx_2, reg_idx_3>;
COST 1;
CONDITION
{
    IS_LESS(o)
}
EMIT
{
    fprintf(OUTFILE,"\t.packs \042decode;P2;C1;decode;\042,1\n");
    fprintf(OUTFILE,"\t.packs
\042FPC:(r,0);prog_mem:(r,0);dc_src2:(r,0);dc_src1:(r,0);R:(r,0);FPC:(w,0);dc_src1:(w,0);dc_
src2:(w,0);alu_operand1:(r,1);alu_operand2:(r,1);EPC:(w,1);alu_operand1:(w,1);alu_operand2:
(w,1);R:(w,2);\042,2\n");
    fprintf(OUTFILE,"\t.packs \042    r%s = ( r%s < r%s )
\042,3\n",REGNAME(dst),REGNAME(s1),REGNAME(s2));
```

TABLE III-continued

```
}
RULE [mirCompare_Nt_regi_Nt_regi__Nt_regi_51] o:mirCompare(s1:Nt_regi,s2:Nt_regi) ->
dst:Nt_regi<reg_idx_1, reg_idx_2, reg_idx_3>;
COST 1;
CONDITION
{
   IS_NOT_EQUAL(o)
}
EMIT
{
   fprintf(OUTFILE,"\t.packs \042decode;P2;C1;decode;\042,1\n");
   fprintf(OUTFILE,"\t.packs
\042FPC:(r,0);prog_mem:(r,0);dc_src2:(r,0);dc_src1:(r,0);R:(r,0);FPC:(w,0);dc_src1:(w,0);dc_
src2:(w,0);alu_operand1:(r,1);alu_operand2:(r,1);EPC:(w,1);alu_operand1:(w,1);alu_operand2:
(w,1);R:(w,2);\042,2\n");
   fprintf(OUTFILE,"\t.packs \042    r%s = ( r%s != r%s )
\042,3\n",REGNAME(dst),REGNAME(s1),REGNAME(s2));
}
RULE [mirAddrPlus_Nt_regi_Nt_regi__Nt_regi_52] o:mirAddrPlus(s1:Nt_regi,s2:Nt_regi) ->
d:Nt_regi;
COST 1;
EMIT
{
   fprintf(OUTFILE,"\t.packs \042decode;P2;C1;decode;\042,1\n");
   fprintf(OUTFILE,"\t.packs
\042FPC:(r,0);prog_mem:(r,0);dc_src2:(r,0);dc_src1:(r,0);R:(r,0);FPC:(w,0);dc_src1:(w,0);dc_
src2:(w,0);alu_operand1:(r,1);alu_operand2:(r,1);EPC:(w,1);alu_operand1:(w,1);alu_operand2:
(w,1);R:(w,2);\042,2\n");
   fprintf(OUTFILE,"\t.packs \042    r% s = r%s +
r%s\042,3\n",REGNAME(d),REGNAME(s1),REGNAME(s2));
}
RULE [mirAddrDiff_Nt_regi_Nt_regi__Nt_regi_53] mirAddrDiff(s1:Nt_regi,s2:Nt_regi) ->
d:Nt_regi;
COST 1;
EMIT
{
   fprintf(OUTFILE,"\t.packs \042decode;P2;C1;decode;\042,1\n");
   fprintf(OUTFILE,"\t.packs
\042FPC:(r,0);prog_mem:(r,0);dc_src2:(r,0);dc_src1:(r,0);R:(r,0);FPC:(w,0);dc_src1:(w,0);dc_
src2:(w,0);alu_operand1:(r,1);alu_operand2:(r,1);EPC:(w,1);alu_operand1:(w,1);alu_operand2:
(w,1);R:(w,2);\042,2\n");
   fprintf(OUTFILE,"\t.packs \042    r%s = r% -
r%s\042,3\n",REGNAME(d),REGNAME(s1),REGNAME(s2));
}
    © 2003, Coware, Inc.
```

The code in table IV is exemplary code for calling IR nodes that is generated in accordance with an embodiment of the present invention. A user may input information that is useable to generate such exemplary code through, for example, the calling tab 813 of the mapping dialog 810. The calling nodes related to function calls: mirCall (call to void function), xirFuncCall (call to function returning a value), mirReturn (return statement), and mirActual (function arguments).

TABLE IV

```
RULE [mirCall_Nt_regi_8] o:mirCall(addr:Nt_regi, INPUT {gcg_reg_restriction =
gcg_RegToRegSet('gcg_expr->Reg),'gcg_expr->Nt });
CHANGE { get_changed_set(mirSTMT_mirCall_get_Proc(o)) }
WRITE MEMORY;
READ MEMORY;
CONTROL branch;
COST 20;
SCRATCH scratch_0:Nt_regi;
EMIT
{
   fprintf(OUTFILE,"\t.packs \042decode;P2;C1;decode;\042,1\n");
   fprintf(OUTFILE,"\t.packs
\042FPC:(r,0);prog_mem:(r,0);FPC:(w,0);EPC:(w,1);R:(w,2);\042,2\n");
   fprintf(OUTFILE,"\t.packs \042    r%s =
(($+6)>>16)\042,3\n",REGNAME(scratch_0));
   fprintf(OUTFILE,"\t.packs \042decode;P2;C1;decode;\042,1\n");
   fprintf(OUTFILE,"\t.packs
\042FPC:(r,0);prog_mem:(r,0);dc_src2:(r,0);dc_src1:(r,0);R:(r,0);FPC:(w,0);dc_src1:(w,0);dc_
src2:(w,0);alu_operand1:(r,1);alu_operand2:(r,1);EPC:(w,1);alu_operand1:(w,1);alu_operand2:
(w,1);R:(w,2);\042,2\n");
   fprintf(OUTFILE,"\t.packs \042    r%s <<= 16\042,3\n",REGNAME(scratch_0));
   fprintf(OUTFILE,"\t.packs \042decode;P2;C1;decode;\042,1\n");
   fprintf(OUTFILE,"\t.packs
\042FPC:(r,0);prog_mem:(r,0);dc_src2:(r,0);dc_src1:(r,0);R:(r,0);FPC:(w,0);dc_src1:(w,0);dc_
```

TABLE IV-continued

```
src2:(w,0);alu_operand1:(r,1);alu_operand2:(r,1);EPC:(w,1);alu_operand1:(w,1);alu_operand2:
(w,1);R:(w,2);\042,2\n");
    fprintf(OUTFILE,"\t.packs \042    r%s I=
(($+4)&65535)\042,3\n",REGNAME(scratch_0));
    fprintf(OUTFILE,"\t.packs \042decode;P1;C1;decode;\042,1\n");
    fprintf(OUTFILE,"\t.packs
\042FPC:(r,0);prog_mem:(r,0);dc_src1:(r,0);R:(r,0);dc_src2:(r,0);R[%s]:(r,0);FPC:(w,0);dc_src1:
(w,0);dc_src2:(w,0);EPC:(w,1);data_mem:(w,1);\042,2\n",REGNAME(Regreg_idx_13));
    fprintf(OUTFILE,"\t.packs \042    dmem[ r%s + (−1) ] =
r%s\042,3\n",REGNAME(Regreg_idx_13),REGNAME(Regreg_idx_14));
    fprintf(OUTFILE,"\t.packs \042decode;P1;C1;decode;\042,1\n");
    fprintf(OUTFILE,"\t.packs
\042FPC:(r,0);prog_mem:(r,0);dc_src1:(r,0);R:(r,0);dc_src2:(r,0);R[%s]:(r,0);FPC:(w,0);dc_src1:
(w,0);dc_src2:(w,0);EPC:(w,1);data_mem:(w,1);\042,2\n",REGNAME(Regreg_idx_13));
    fprintf(OUTFILE,"\t.packs \042    dmem[ r%s + (−1) ] =
r%s\042,3\n",REGNAME(Regreg_idx_13),REGNAME(scratch_0));
    fprintf(OUTFILE,"\t.packs \042decode;P2;C1;decode;\042,1\n");
    fprintf(OUTFILE,"\t.packs
\042FPC:(r,0);prog_mem:(r,0);R[%s]:(r,0);dc_address:(r,0);FPC:(w,0);dc_address:(w,0);EPC:
(w,1);\042,2\n",REGNAME(addr));
    fprintf(OUTFILE,"\t.packs \042    jmp r%s\042,3\n",REGNAME(addr));
}
RULE [xirFuncCall_mirObjectAddr__Nt_regi_9] o:xirFuncCall(p:mirObjectAddr, INPUT {
gcg_reg_restriction = gcg_RegToRegSet('gcg_expr->Reg),'gcg_expr->Nt } )->Nt_regi
RESTRICT {gcg_RegToRegSet(get_result_reg(mirEXPR_xirFuncCall_get_Proc(o)))};
CHANGE { get_changed_set(p) }
CONDITION { get_result_nt(p) == ntNt_regi}
WRITE MEMORY;
READ MEMORY;
CONTROL branch;
COST 20;
SCRATCH scratch_0:Nt_regi;
EMIT
{
    fprintf(OUTFILE,"\t.packs \042decode;P2;C1;decode;\042,1\n");
    fprintf(OUTFILE,"\t.packs
\042FPC:(r,0);prog_mem:(r,0);FPC:(w,0);EPC:(w,1);R:(w,2);\042,2\n");
    fprintf(OUTFILE,"\t.packs \042    r%s =
(($+6)>>16)\042,3\n",REGNAME(scratch_0));
    fprintf(OUTFILE,"\t.packs \042decode;P2;C1;decode;\042,1\n");
    fprintf(OUTFILE,"\t.packs
\042FPC:(r,0);prog_mem:(r,0);dc_src2:(r,0);dc_src1:(r,0);R:(r,0);FPC:(w,0);dc_src1:(w,0);dc_
src2:(w,0);alu_operand1:(r,1);alu_operand2:(r,1);EPC:(w,1);alu_operand1:(w,1);alu_operand2:
(w,1);R:(w,2);\042,2\n");
    fprintf(OUTFILE,"\t.packs \042    r%s <<= 16\042,3\n",REGNAME(scratch_0));
    fprintf(OUTFILE,"\t.packs \042decode;P2;C1;decode;\042,1\n");
    fprintf(OUTFILE,"\t.packs
\042FPC:(r,0);prog_mem:(r,0);dc_src2:(r,0);dc_src1:(r,0);R:(r,0);FPC:(w,0);dc_src1:(w,0);dc_
src2:(w,0);alu_operand1:(r,1);alu_operand2:(r,1);EPC:(w,1);alu_operand1:(w,1);alu_operand2:
(w,1);R:(w,2);\042,2\n");
    fprintf(OUTFILE,"\t.packs \042    r%s I=
(($+4)&65535)\042,3\n",REGNAME(scratch_0));
    fprintf(OUTFILE,"\t.packs \042decode;P1;C1;decode;\042,1\n");
    fprintf(OUTFILE,"\t.packs
\042FPC:(r,0);prog_mem:(r,0);dc_src1:(r,0);R:(r,0);dc_src2:(r,0);R[%s]:(r,0);FPC:(w,0);dc_src1:
(w,0);dc_src2:(w,0);EPC:(w,1);data_mem:(w,1);\042,2\n",REGNAME(Regreg_idx_13));
    fprintf(OUTFILE,"\t.packs \042    dmem[ r%s + (−1) ] =
r%s\042,3\n",REGNAME(Regreg_idx_13),REGNAME(Regreg_idx_14));
    fprintf(OUTFILE,"\t.packs \042decode;P1;C1;decode;\042,1\n");
    fprintf(OUTFILE,"\t.packs
\042FPC:(r,0);prog_mem:(r,0);dc_src1:(r,0);R:(r,0);dc_src2:(r,0);R[%s]:(r,0);FPC:(w,0);dc_src1:
(w,0);dc_src2:(w,0);EPC:(w,1);data_mem:(w,1);\042,2\n",REGNAME(Regreg_idx_13));
    fprintf(OUTFILE,"\t.packs \042    dmem[ r%s + (−1) ] =
r%s\042,3\n",REGNAME(Regreg_idx_13),REGNAME(scratch_0));
    fprintf(OUTFILE,"\t.packs \042decode;P2;C1;decode;\042,1\n");
    fprintf(OUTFILE,"\t.packs
\042FPC:(r,0);prog_mem:(r,0);dc_address:(r,0);FPC:(w,0);dc_address:(w,0);EPC:
(w,1);\042,2\n");
    fprintf(OUTFILE,"\t.packs \042    jmp %s\042,3\n",GET_GLOBAL_LABEL(p.Obj));
}
RULE [mirCall_mirObjectAddr_10] o:mirCall(p:mirObjectAddr, INPUT { gcg_reg_restriction =
gcg_RegToRegSet('gcg_expr->Reg),'gcg_expr->Nt } );
CHANGE { get_changed_set(p) }
WRITE MEMORY;
READ MEMORY;
CONTROL branch;
COST 20;
SCRATCH scratch_0:Nt_regi;
EMIT
{
```

TABLE IV-continued

```
    fprintf(OUTFILE,"\t.packs \042decode;P2;C1;decode;\042,1\n");
    fprintf(OUTFILE,"\t.packs
\042FPC:(r,0);prog_mem:(r,0);FPC:(w,0);EPC:(w,1);R:(w,2);\042,2\n");
    fprintf(OUTFILE,"\t.packs \042    r%s =
((\$+6)>>16)\042,3\n",REGNAME(scratch_0));
    fprintf(OUTFILE,"\t.packs \042decode;P2;C1;decode;\042,1\n");
    fprintf(OUTFILE,"\t.packs
\042FPC:(r,0);prog_mem:(r,0);dc_src2:(r,0);dc_src1:(r,0);R:(r,0);FPC:(w,0);dc_src1:(w,0);dc_
src2:(w,0);alu_operand1:(r,1);alu_operand2:(r,1);EPC:(w,1);alu_operand1:(w,1);alu_operand2:
(w,1);R:(w,2);\042,2\n");
    fprintf(OUTFILE,"\t.packs \042    r%s <<= 16\042,3\n",REGNAME(scratch_0));
    fprintf(OUTFILE,"\t.packs \042decode;P2;C1;decode;\042,1\n");
    fprintf(OUTFILE,"\t.packs
\042FPC:(r,0);prog_mem:(r,0);dc_src2:(r,0);dc_src1:(r,0);R:(r,0);FPC:(w,0);dc_src1:(w,0);dc_
src2:(w,0);alu_operand1:(r,1);alu_operand2:(r,1);EPC:(w,1);alu_operand1:(w,1);alu_operand2:
(w,1);R:(w,2);\042,2\n");
    fprintf(OUTFILE,"\t.packs \042    r%s I=
((\$+4)&65535)\042,3\n",REGNAME(scratch_0));
    fprintf(OUTFILE,"\t.packs \042decode;P1;C1;decode;\042,1\n");
    fprintf(OUTFILE,"\t.packs
\042FPC:(r,0);prog_mem:(r,0);dc_src1:(r,0);R:(r,0);dc_src2:(r,0);R[%s]:(r,0);FPC:(w,0);dc_src1:
(w,0);dc_src2:(w,0);EPC:(w,1);data_mem:(w,1);\042,2\n",REGNAME(Regreg_idx_13));
    fprintf(OUTFILE,"\t.packs \042    dmem[ r%s + (−1) ] =
r%s\042,3\n",REGNAME(Regreg_idx_13),REGNAME(Regreg_idx_14));
    fprintf(OUTFILE,"\t.packs \042decode;P1;C1;decode;\042,1\n");
    fprintf(OUTFILE,"\t.packs
\042FPC:(r,0);prog_mem:(r,0);dc_src1:(r,0);R:(r,0);dc_src2:(r,0);R[%s]:(r,0);FPC:(w,0);dc_src1:
(w,0);dc_src2:(w,0);EPC:(w,1);data_mem:(w,1);\042,2\n",REGNAME(Regreg_idx_13));
    fprintf(OUTFILE,"\t.packs \042    dmem[ r%s + (−1) ] =
r%s\042,3\n",REGNAME(Regreg_idx_13),REGNAME(scratch_0));
    fprintf(OUTFILE,"\t.packs \042decode;P2;C1;decode;\042,1\n");
    fprintf(OUTFILE,"\t.packs
\042FPC:(r,0);prog_mem:(r,0);dc_address:(r,0);FPC:(w,0);dc_address:(w,0);EPC:(w,1);\042,2\n");
    fprintf(OUTFILE,"\t.packs \042    jmp %s\042,3\n",GET_GLOBAL_LABEL(p.Obj));
}
RULE [xirFuncCall_Nt_regi__Nt_regi_11] o:xirFuncCall(p:Nt_regi, INPUT
{ gcg_reg_restriction =
gcg_RegToRegSet('gcg_expr->Reg', 'gcg_expr->Nt' })->Nt_regi_RESTRICT
{gcg_RegToRegSet(get_result_reg(mirEXPR_xirFuncCall_get_Proc(o)))};
CHANGE { get_changed_set(mirEXPR_xirFuncCall_get_Proc(o)) }
CONDITION { get_result_nt(mirEXPR_xirFuncCall_get_Proc(o)) == ntNt_regi}
WRITE MEMORY;
READ MEMORY;
CONTROL branch;
COST 20;
SCRATCH scratch_0:Nt_regi;
EMIT
{
    fprintf(OUTFILE,"\t.packs \042decode;P2;C1;decode;\042,1\n");
    fprintf(OUTFILE,"\t.packs
\042FPC:(r,0);prog_mem:(r,0);FPC:(w,0);EPC:(w,1);R:(w,2);\042,2\n");
    fprintf(OUTFILE,"\t.packs \042    r%s =
((\$+6)>>16)\042,3\n",REGNAME(scratch_0));
    fprintf(OUTFILE,"\t.packs \042decode;P2;C1;decode;\042,1\n");
    fprintf(OUTFILE,"\t.packs
\042FPC:(r,0);prog_mem:(r,0);dc_src2:(r,0);dc_src1:(r,0);R:(r,0);FPC:(w,0);dc_src1:(w,0);dc_
src2:(w,0);alu_operand1:(r,1);alu_operand2:(r,1);EPC:(w,1);alu_operand1:(w,1);alu_operand2:
(w,1);R:(w,2);\042,2\n");
    fprintf(OUTFILE,"\t.packs \042    r%s <<= 16\042,3\n",REGNAME(scratch_0));
    fprintf(OUTFILE,"\t.packs \042decode ;P2;C1;decode;\042,1\n");
    fprintf(OUTFILE,"\t.packs
\042FPC:(r,0);prog_mem:(r,0);dc_src2:(r,0);dc_src1:(r,0);R:(r,0);FPC:(w,0);dc_src1:(w,0);dc_
src2:(w,0);alu_operand1:(r,1);alu_operand2:(r,1);EPC:(w,1);alu_operand1:(w,1);alu_operand2:
(w,1);R:(w,2);\042,2\n");
    fprintf(OUTFILE,"\t.packs \042    r%s I=
((\$+4)&65535)\042,3\n",REGNAME(scratch_0));
    fprintf(OUTFILE,"\t.packs \042decode;P1;C1;decode;\042,1\n");
    fprintf(OUTFILE,"\t.packs
\042FPC:(r,0);prog_mem:(r,0);dc_src1:(r,0);R:(r,0);dc_src2:(r,0);R[%s]:(r,0);FPC:(w,0);dc_src1:
(w,0);dc_src2:(w,0);EPC:(w,1);data_mem:(w,1);\042,2\n",REGNAME(Regreg_idx_13));
    fprintf(OUTFILE,"\t.packs \042    dmem[ r%s + (−1) ] =
r%s\042,3\n",REGNAME(Regreg_idx_13),REGNAME(Regreg_idx_14));
    fprintf(OUTFILE,"\t.packs \042decode;P1;C1;decode;\042,1\n");
    fprintf(OUTFILE,"\t.packs
\042FPC:(r,0);prog_mem:(r,0);dc_src1:(r,0);R:(r,0);dc_src2:(r,0);R[%s]:(r,0);FPC:(w,0);dc_src1:
(w,0);dc_src2:(w,0);EPC:(w,1);data_mem:(w,1);\042,2\n",REGNAME(Regreg_idx_13));
    fprintf(OUTFILE,"\t.packs \042    dmem[ r%s + (−1) ] =
r%s\042,3\n",REGNAME(Regreg_idx_13),REGNAME(scratch_0));
    fprintf(OUTFILE,"\t.packs \042decode;P2;C1;decode;\042,1\n");
    fprintf(OUTFILE,"\t.packs
```

TABLE IV-continued

```
\042FPC:(r,0);prog_mem:(r,0);R[%s]:(r,0);dc_address:(r,0);FPC:(w,0);dc_address:(w,0);EPC:
(w,1);\042,2\n",REGNAME(p));
    fprintf(OUTFILE,"\t.packs \042    jmp r%s\042,3\n",REGNAME(p));
}
RULE [mirReturn_mirNoExpr_mirObjectAddr_12] o:mirReturn(mirNoExpr,n:mirObjectAddr);
CONDITION
{
  o.NextIsNext
}
CONTROL fallthrough;
COST 0;
RULE [mirReturn_mirNoExpr_mirObjectAddr_13] o:mirReturn(mirNoExpr,n:mirObjectAddr);
COST 2;
CONTROL branch;
EMIT
{
    fprintf(OUTFILE,"\t.packs \042decode;P2;C1;decode;\042,1\n");
    fprintf(OUTFILE,"\t.packs
\042FPC:(r,0);prog_mem:(r,0);dc_address:(r,0);FPC:(w,0);dc_address:(w,0);EPC:
(w,1);\042,2\n");
    fprintf(OUTFILE,"\t.packs \042    jmp %s\042,3\n",GET_BBLOCK_LABEL(n.Obj));
}
RULE [mirActual_Nt_regi__memarglist_14] o:mirActual(rs:Nt_regi) -> a:memarglist;
COST 1;
CONDITION
{
o.Nt == ntmemarglist
}
EMIT
{
    fprintf(OUTFILE,"\t.packs \042decode;P1;C1;decode;\042,1\n");
    fprintf(OUTFILE,"\t.packs
\042FPC:(r,0);prog_mem:(r,0);dc_src1:(r,0);R:(r,0);dc_src2:(r,0);R[%s]:(r,0);FPC:(w,0);dc_src1:
(w,0);dc_src2:(w,0);EPC:(w,1);data_mem:(w,1);\042,2\n",REGNAME(Regreg_idx_13));
    fprintf(OUTFILE,"\t.packs \042    dmem[ r%s + %d ] =
r%s\042,3\n",REGNAME(Regreg_idx_13),OUTARG_OFFSET(o.Offset),REGNAME(rs));
}
RULE [mirReturn_mirNoExpr_mirObjectAddr_15] o:mirReturn(mirNoExpr,t:mirObjectAddr);
COST 1;
EMIT
{
    fprintf(OUTFILE,"\t.packs \042decode;P2;C1;decode;\042,1\n");
    fprintf(OUTFILE,"\t.packs
\042FPC:(r,0);prog_mem:(r,0);dc_address:(r,0);FPC:(w,0);dc_address:(w,0);EPC:
(w,1);\042,2\n");
    fprintf(OUTFILE,"\t.packs \042    jmp %s\042,3\n",GET_BBLOCK_LABEL(t.Obj));
}
RULE [mirReturn_Nt_regi_mirObjectAddr_16]
o:mirReturn(ret:Nt_regi<reg_idx_15>t:mirObjectAddr);
COST 1;
EMIT
{
    fprintf(OUTFILE,"\t.packs \042decode;P2;C1;decode;\042,1\n");
    fprintf(OUTFILE,"\t.packs
\042FPC:(r,0);prog_mem:(r,0);dc_address:(r,0);FPC:(w,0);dc_address:(w,0);EPC:
(w,1);\042,2\n");
    fprintf(OUTFILE,"\t.packs \042    jmp %s\042,3\n",GET_BBLOCK_LABEL(t.Obj));
}
RULE o:xirReg -> Nt_regi_RESTRICT { gcg_RegToRegSet(o.Reg) };
CLASS NOCODE;
CONDITION { o.Nt == ntNt_regi }
RULE a:mirActual(rs:Nt_regi) -> rd :Nt_regi;
RESULT rs;
RULE [prologue] mirBeginProcedure;
BARRIER;
EMIT {
    gcgRegister Reg;
    char *proc_name;
    proc_name = mirProcGlobal_get_Name(state->proc);
    if ( !strcmp (proc_name, "_main")) {
    fprintf(OUTFILE,"\t.packs \042decode;P2;C1;decode;\042,1\n");
    fprintf(OUTFILE,"\t.packs
\042FPC:(r,0);prog_mem:(r,0);FPC:(w,0);EPC:(w,1);R:(w,2);\042,2\n");
        fprintf(OUTFILE,"\t.packs \042    r%s =
_stackbase\042,3\n",REGNAME(Regreg_idx_13));
    fprintf(OUTFILE,"\t.packs \042decode;P2;C1;decode;\042,1\n");
    fprintf(OUTFILE,"\t.packs
\042FPC:(r,0);prog_mem:(r,0);dc_src2:(r,0);dc_src1:(r,0);R:(r,0);FPC:(w,0);dc_src1:(w,0);dc_
src2:(w,0);alu_operand1:(r,1);alu_operand2:(r,1);EPC:(w,1);alu_operand1:(w,1);alu_operand2:
(w,1);R:(w,2);\042,2\n");
```

TABLE IV-continued

```
      fprintf(OUTFILE,"\t.packs \042    r%s = r%s +
0\042,3\n",REGNAME(Regreg_idx_14),REGNAME(Regreg_idx_13));
    }
    if (state->frame_size !=0) {
      fprintf(OUTFILE,"\t.packs \042decode;P2;C1;decode;\042,1\n");
      fprintf(OUTFILE,"\t.packs
\042FPC:(r,0);prog_mem:(r,0);dc_src2:(r,0);dc_src1:(r,0);R:(r,0);FPC:(w,0);dc_src1:(w,0);dc_
src2:(w,0);alu_operand1:(r,1);alu_operand2:(r,1);EPC:(w,1);alu_operand1:(w,1);alu_operand2:
(w,1);R:(w,2);\042,2\n");
      fprintf(OUTFILE,"\t.packs \042    r%s = r%s -
%d\042,3\n",REGNAME(Regreg_idx_13),REGNAME(Regreg_idx_13),(state->frame_size));
    }
    gcg_RegSetLoop(state->tobesaved, Reg)
    {
      fprintf(OUTFILE,"\t.packs \042decode;P1;C1;decode;\042,1\n");
      fprintf(OUTFILE,"\t.packs
\042FPC:(r,0);prog_mem:(r,0);dc_src1:(r,0);R:(r,0);dc_src2:(r,0);R[%s]:(r,0);FPC:(w,0);dc_src1:
(w,0);dc_src2:(w,0);EPC:(w,1);data_mem:(w,1);\042,2\n",REGNAME(Regreg_idx_14));
      fprintf(OUTFILE,"\t.packs \042    dmem[ r%s + (%d) ] =
r%s\042,3\n",REGNAME(Regreg_idx_14),(state->offsets[Reg] + state->
regsave_frame_base),REGNAME(Reg));
    }
    gcg_RegSetEndLoop
}
RULE [epilogue] mirEndProcedure;
BARRIER;
EMIT {
  gcgRegister Reg;
  char *proc_name;
  proc_name = mirProcGlobal_get_Name(state->proc);
  gcg_RegSetLoop(state->tobesaved, Reg)
  {
    fprintf(OUTFILE,"\t.packs \042decode;P1;C1;decode;\042,1\n");
    fprintf(OUTFILE,"\t.packs
\042FPC:(r,0);prog_mem:(r,0);R[%s]:(r,0);FPC:(w,0);data_mem:(r,1);EPC:(w,1);R:(w,2);\04
2,2\n",REGNAME(Regreg_idx_14));
      fprintf(OUTFILE,"\t.packs \042    r%s = dmem[ r%s + (%d) ]
\042,3\n",REGNAME(Reg),REGNAME(Regreg_idx_14), (state->offsets[Reg] + state->
regsave_frame_base));
  }
  gcg_RegSetEnd Loop
  if(!strcmp(proc_name,"_main"))
  {
      fprintf(OUTFILE,"LLABEL_END:\n");
    fprintf(OUTFILE,"\t.packs \042decode;P2;C1;decode;\042,1\n");
    fprintf(OUTFILE,"\t.packs
\042FPC:(r,0);prog_mem:(r,0);dc_address:(r,0);FPC:(w,0);dc_address:(w,0);EPC:(w,1);\
042,2\n");
      fprintf(OUTFILE,"\t.packs \042    jmp %s\042,3\n","LLABEL_END");
  }
  else
  {
    fprintf(OUTFILE,"\t.packs \042decode;P2;C1;decode;\042,1\n");
    fprintf(OUTFILE,"\t.packs
\042FPC:(r,0);prog_mem:(r,0);dc_src2:(r,0);dc_src1:(r,0);R:(r,0);FPC:(w,0);dc_src1:(w,0);dc_
src2:(w,0);alu_operand1:(r,1);alu_operand2:(r,1);EPC:(w,1);alu_operand1:(w,1);alu_operand2:
(w,1);R:(w,2);\042,2\n");
      fprintf(OUTFILE,"\t.packs \042    r%s = r%s +
0\042,3\n",REGNAME(Regreg_idx_14),REGNAME(Regreg_idx_13));
  }
};
  © 2003, Coware, Inc.
```

The code in table V is exemplary code for control IR nodes that is generated in accordance with an embodiment of the present invention. A user may input information that is useable to generate such exemplary code through, for example, the control tab 814 of the mapping dialog 810. The control nodes are related to nodes such as mirIf and mirGoto.

TABLE V

```
RULE [mirIf_Nt_regi_mirObjectAddr_mirObjectAddr_28]
o:mirIf(c:Nt_regi<reg_idx_1, reg_idx_2, reg_idx_3>,
t:mirObjectAddr,e:mirObjectAddr);
COST 2;
```

TABLE V-continued

```
CONTROL branch;
EMIT
{
    fprintf(OUTFILE,"\t.packs \042decode;P2;C1;decode;\042,1\n");
    fprintf(OUTFILE,"\t.packs
\042FPC:(r,0);prog_mem:(r,0);dc_address:(r,0);dc_cond_reg:(r,0);
R:(r,0);dc_cond_value:(r,0)
;FPC:(w,0);dc_address:(w,0);dc_cond_reg:(w,0);dc_cond_value:(w,0);
EPC:(w,1);\042,2\n")
;
    fprintf(OUTFILE,"\t.packs \042if (r%s) jmp
%s\042,3\n",REGNAME(c),GET_BBLOCK_LABEL(t.Obj));
```

TABLE V-continued

```
    fprintf(OUTFILE,"\t.packs \042decode;P2;C1;decode;\042,1\n");
    fprintf(OUTFILE,"\t.packs
\042FPC:(r,0);prog_mem:(r,0);dc_address:(r,0);FPC:(w,0);
dc_address:(w,0);EPC:(w,1);\042,2\n");
    fprintf(OUTFILE,"\t.packs \042 jmp %s\042,3\n",GET_BBLOCK_
LABEL(e.Obj));
}
RULE [mirGoto_mirObjectAddr_29] o:mirGoto(d:mirObjectAddr);
COST 1;
CONTROL fallthrough;
EMIT
{
    fprintf(OUTFILE,"\t.packs \042decode;P2;C1;decode;\042,1\n");
    fprintf(OUTFILE,"\t.packs
\042FPC:(r,0);prog_mem:(r,0);dc_address:(r,0);FPC:(w,0);
dc_address:(w,0);EPC:(w,1);\042,2\n");
    fprintf(OUTFILE,"\t.packs \042 jmp %s\042,3\n",GET_
    GLOBAL_LABEL(d.Obj));
}
    © 2003, Coware, Inc.
```

TABLE VI

```
RULE [mirConvert_Nt_addr__Nt_addr_26] o:mirConvert
(s:Nt_addr) -> d:Nt_addr;
CONDITION
{
    IS_POINTER(o)
}
COST 0;
EMIT
{
    d.base = s.base;
    d.imm8 = s.imm8;
}
RULE [mirConvert_Nt_regi__Nt_regi_27] mirConvert(rs:Nt_regi) -> rd:
Nt_regi;
RESULT rs;
COST 0;
    © 2003, Coware, Inc.
```

The exemplary code in table VI is exemplary code for convert IR nodes that is generated in accordance with an embodiment of the present invention. A user may input information that is useable to generate such exemplary code through, for example, the convert tab 815 of the mapping dialog 810. Convert type casts are performed with mirConvert nodes.

The exemplary code in table VII is exemplary code for load/store IR nodes that is generated in accordance with an embodiment of the present invention. A user may input information that is useable to generate such exemplary code through, for example, the load/store tab 816 of the mapping dialog 810. Load/Store IR nodes covered comprises: mirIntConst, mirNil, mirObjectAddr, mirContent, and mirAssign.

TABLE VII

```
RULE [mirEvaluate__Nt_regi] mirEvaluate(Nt_regi);
RULE [mirEvaluate__memarglist] mirEvaluate(memarglist);
RULE [mirIntConst__Nt_regi_0] o:mirIntConst -> dst:Nt_regi;
SCRATCH scratch_0:Nt_regi;
COST 4;
INTERFERE ( dst , scratch_0 );
EMIT
{
    fprintf(OUTFILE,"\t.packs \042decode;P2;C1;decode;\042,1\n");
    fprintf(OUTFILE,"\t.packs
\042FPC:(r,0);prog_mem:(r,0);FPC:(w,0);EPC:(w,1);R:(w,2);\042,2\n");
    fprintf(OUTFILE,"\t.packs \042    r%s =
%d\042,3\n",REGNAME(dst),UnivInt_to_int(o.Value));
    fprintf(OUTFILE,"\t.packs \042decode;P2;C1;decode;\042,1\n");
    fprintf(OUTFILE,"\t.packs
\042FPC:(r,0);prog_mem:(r,0);dc_src2:(r,0);dc_src1:(r,0);R:(r,0);FPC:(w,0);dc_src1:(w,0);dc_
src2:(w,0);alu_operand1:(r,1);alu_operand2:(r,1);EPC:(w,1);alu_operand1:(w,1);alu_operand2:
(w,1);R:(w,2);\042,2\n");
    fprintf(OUTFILE,"\t.packs \042    r%s <<= 16\042,3\n",REGNAME(dst));
    fprintf(OUTFILE,"\t.packs \042decode;P2;C1;decode;\042,1\n");
    fprintf(OUTFILE,"\t.packs
\042FPC:(r,0);prog_mem:(r,0);FPC:(w,0);EPC:(w,1);R:(w,2);\042,2\n");
    fprintf(OUTFILE,"\t.packs \042    r%s =
%d\042,3\n",REGNAME(scratch_0),UnivInt_to_int(o.Value));
    fprintf(OUTFILE,"\t.packs \042decode;P2;C1;decode;\042,1\n");
    fprintf(OUTFILE,"\t.packs
\042FPC:(r,0);prog_mem:(r,0);dc_src2:(r,0);dc_src1:(r,0);R:(r,0);FPC:(w,0);dc_src1:(w,0);dc_
src2:(w,0);alu_operand1:(r,1);alu_operand2:(r,1);EPC:(w,1);alu_operand1:(w,1);alu_operand2:
(w,1);R:(w,2);\042,2\n");
    fprintf(OUTFILE,"\t.packs \042    r%s |=
r%s\042,3\n",REGNAME(dst),REGNAME(scratch_0));
}
RULE [mirContent_Nt_addr__Nt_regi_1] o:mirContent(src:Nt_addr) -> dst:Nt_regi;
COST 1;
EMIT
{
    fprintf(OUTFILE,"\t.packs \042decode;P1;C1;decode;\042,1\n");
    fprintf(OUTFILE,"\t.packs
\042FPC:(r,0);prog_mem:(r,0);R[%s]:(r,0);FPC:(w,0);data_mem:(r,1);EPC:(w,1);R:
(w,2);\042,2\n",REGNAME(src.base));
    fprintf(OUTFILE,"\t.packs \042    r%s = dmem[ r%s + %d ]
\042,3\n",REGNAME(dst),REGNAME(src.base),src.imm8);
}
RULE [mirAddrConst__Nt_regi_2] o:mirAddrConst -> d:Nt_regi;
SCRATCH scratch_0:Nt_regi;
COST 4;
```

TABLE VII-continued

```
INTERFERE ( d , scratch_0 );
EMIT
{
   fprintf(OUTFILE,"\t.packs \042decode;P2;C1;decode;\042,1\n");
   fprintf(OUTFILE,"\t.packs
\042FPC:(r,0);prog_mem:(r,0);FPC:(w,0);EPC:(w,1);R:(w,2);\042,2\n");
   fprintf(OUTFILE,"\t.packs \042    r%s =
%d\042,3\n",REGNAME(d),UnivInt_to_int(o.Value));
   fprintf(OUTFILE,"\t.packs \042decode;P2;C1;decode;\042,1\n");
   fprintf(OUTFILE,"\t.packs
\042FPC:(r,0);prog_mem:(r,0);dc_src2:(r,0);dc_src1:(r,0);R:(r,0);FPC:(w,0);dc_src1:(w,0);dc_
src2:(w,0);alu_operand1:(r,1);alu_operand2:(r,1);EPC:(w,1);alu_operand1:(w,1);alu_operand2:
(w,1);R:(w,2);\042,2\n");
   fprintf(OUTFILE,"\t.packs \042    r%s <<= 16\042,3\n",REGNAME(d));
   fprintf(OUTFILE,"\t.packs \042decode;P2;C1;decode;\042,1\n");
   fprintf(OUTFILE,"\t.packs
\042FPC:(r,0);prog_mem:(r,0);FPC:(w,0);EPC:(w,1);R:(w,2);\042,2\n");
   fprintf(OUTFILE,"\t.packs \042    r%s =
%d\042,3\n",REGNAME(d),UnivInt_to_int(o.Value));
   fprintf(OUTFILE,"\t.packs \042decode;P2;C1;decode;\042,1\n");
   fprintf(OUTFILE,"\t.packs
\042FPC:(r,0);prog_mem:(r,0);dc_src2:(r,0);dc_src1:(r,0);R:(r,0);FPC:(w,0);dc_src1:(w,0);dc_
src2:(w,0);alu_operand1:(r,1);alu_operand2:(r,1);EPC:(w,1);alu_operand1:(w,1);alu_operand2:
(w,1);R:(w,2);\042,2\n");
   fprintf(OUTFILE,"\t.packs \042    r%s |=
r%s\042,3\n",REGNAME(d),REGNAME(scratch_0));
}
RULE [mirIntConst__Nt_imm12_3] o:mirIntConst -> d:Nt_imm12;
COST 0;
CONDITION
{
   IS_SIMMX(o.Value, 12)
}
EMIT
{
   d.value = UnivInt_to_int(o.Value);
}RULE [mirIntConst__Nt_imm16_4] o:mirIntConst -> d:Nt_imm16;
COST 0;
CONDITION
{
   IS_SIMMX(o.Value, 16)
}
EMIT
{
   d.value = UnivInt_to_int(o.Value);
}
RULE [mirAssign_Nt_addr_Nt_regi_5] o:mirAssign(addr:Nt_addr,d:Nt_regi);
COST 1;
EMIT
{
   fprintf(OUTFILE,"\t.packs \042decode;P1;C1;decode;\042,1\n");
   fprintf(OUTFILE,"\t.packs
\042FPC:(r,0);prog_mem:(r,0);dc_src1:(r,0);R:(r,0);dc_src2:(r,0);R[%s]:(r,0);FPC:(w,0);dc_src1:
(w,0);dc_src2:(w,0);EPC:(w,1);data_mem:(w,1);\042,2\n",REGNAME(addr.base));
   fprintf(OUTFILE,"\t.packs \042    dmem[ r%s + %d ] =
r%s\042,3\n",REGNAME(addr.base),addr.imm8,REGNAME(d));
}
RULE [mirAssign_Nt_regi_Nt_regi_6] o:mirAssign(d:Nt_regi,s:Nt_regi);
CONDITION
{
   IS_POINTER(o)
}
COST 1;
EMIT
{
   fprintf(OUTFILE,"\t.packs \042decode;P1;C1;decode;\042,1\n");
   fprintf(OUTFILE,"\t.packs
\042FPC:(r,0);prog_mem:(r,0);dc_src1:(r,0);R:(r,0);dc_src2:(r,0);R[%s]:(r,0);FPC:(w,0);dc_src1:
(w,0);dc_src2:(w,0);EPC:(w,1);data_mem:(w,1);\042,2\n",REGNAME(d));
   fprintf(OUTFILE,"\t.packs \042    dmem[ r%s + 0] =
r%s\042,3\n",REGNAME(d),REGNAME(s));
}
RULE [mirObjectAddr__Nt_regi_7] o:mirObjectAddr -> d:Nt_regi;
SCRATCH scratch_0:Nt_regi;
COST 4;
INTERFERE ( d , scratch_0 );
EMIT
{
   fprintf(OUTFILE,"\t.packs \042decode;P2;C1;decode;\042,1\n");
   fprintf(OUTFILE,"\t.packs
```

TABLE VII-continued

```
\042FPC:(r,0);prog_mem:(r,0);FPC:(w,0);EPC:(w,1);R:(w,2);\042,2\n");
    fprintf(OUTFILE,"t.packs \042    r%s =
%s\042,3\n",REGNAME(d),GET_GLOBAL_LABEL(o.Obj));
    fprintf(OUTFILE,"\t.packs \042decode;P2;C1;decode;\042,1\n");
    fprintf(OUTFILE,"\t.packs
\042FPC:(r,0);prog_mem:(r,0);dc_src2:(r,0);dc_src1:(r,0);R:(r,0);FPC:(w,0);dc_src1:(w,0);dc_
src2:(w,0);alu_operand1:(r,1);alu_operand2:(r,1);EPC:(w,1);alu_operand1:(w,1);alu_operand2:
(w,1);R:(w,2);\042,2\n");
    fprintf(OUTFILE,"\t.packs \042    r%s <<= 16\042,3\n",REGNAME(d));
    fprintf(OUTFILE,"\t.packs \042decode;P2;C1;decode;\042,1\n");
    fprintf(OUTFILE,"\t.packs
\042FPC:(r,0);prog_mem:(r,0);FPC:(w,0);EPC:(w,1);R:(w,2);\042,2\n");
    fprintf(OUTFILE,"t.packs \042    r%s =
%s\042,3\n",REGNAME(scratch_0),GET_GLOBAL_LABEL(o.Obj));
    fprintf(OUTFILE,"\t.packs \042decode;P2;C1;decode;\042,1\n");
    fprintf(OUTFILE,"\t.packs
\042FPC:(r,0);prog_mem:(r,0);dc_src2:(r,0);dc_src1:(r,0);R:(r,0);FPC:(w,0);dc_src1:(w,0);dc_
src2:(w,0);alu_operand1:(r,1);alu_operand2:(r,1);EPC:(w,1);alu_operand1:(w,1);alu_operand2:
(w,1);R:(w,2);\042,2\n");
    fprintf(OUTF1LE,"\t.packs \042    r%s I=
r%s\042,3\n",REGNAME(d),REGNAME(scratch_0));
}
    © 2003, Coware, Inc.
```

The exemplary code in table IX is exemplary code for specifying how to convert from one non-terminal to another that is generated in accordance with an embodiment of the present invention. A user may input information that is useable to generate such exemplary code through, for example, the move tab 817 of the mapping dialog 810. Besides specifying how to convert one non-terminal into another, the rules for "move" cover the IR nodes mirObjectAddr and mirNil.

TABLE IX

```
RULE [Nt_regi__Nt_addr_19] o:Nt_regi -> d:Nt_addr;
COST 0;
EMIT
{
    d.base = o;
    d.imm8 = 0;
}
RULE [Nt_addr__Nt_regi_20] o:Nt_addr -> d:Nt_regi;
COST 1;
EMIT
{
    fprintf(OUTFILE,"\t.packs \042decode;P2;C1;decode;\042,1\n");
    fprintf(OUTFILE,"\t.packs
\042FPC:(r,0);prog_mem:(r,0);dc_src2:(r,0);dc_src1:(r,0);R:(r,0);FPC:(w,0);dc_src1:(w,0);dc_
src2:(w,0);alu_operand1:(r,1);alu_operand2:(r,1);EPC:(w,1);alu_operand1:(w,1);alu_operand2:
(w,1);R:(w,2);\042,2\n");
    fprintf(OUTFILE,"\t.packs \042    r%s = r%s +
%d\042,3\n",REGNAME(d),REGNAME(o.base),o.imm8);
}
RULE [Nt_regi__Nt_regi_21] o:Nt_regi -> d:Nt_regi;
COST 1;
EMIT
{
    fprintf(OUTFILE,"\t.packs \042decode;P2;C1;decode;\042,1\n");
    fprintf(OUTFILE,"\t.packs
\042FPC:(r,0);prog_mem:(r,0);dc_src2:(r,0);dc_src1:(r,0);R:(r,0);FPC:(w,0);dc_src1:(w,0);dc_
src2:(w,0);alu_operand1:(r,1);alu_operand2:(r,1);EPC:(w,1);alu_operand1:(w,1);alu_operand2:
(w,1);R:(w,2);\042,2\n");
    fprintf(OUTFILE,"\t.packs \042    r%s = r%s +
0\042,3\n",REGNAME(d),REGNAME(o));
}
RULE [mirNil__Nt_regi_22] o:mirNil -> d:Nt_regi;
COST 1;
EMIT
{
    fprintf(OUTFILE,"\t.packs \042decode;P2;C1;decode;\042,1\n");
    fprintf(OUTFILE,"\t.packs
\042FPC:(r,0);prog_mem:(r,0);FPC:(w,0);EPC:(w,1);R:(w,2);\042,2\n");
    fprintf(OUTFILE,"\t.packs \042    r%s = 0\042,3\n",REGNAME(d));
}
RULE [mirObjectAddr__Nt_addr_23] o:mirObjectAddr -> addr:Nt_addr;
CONDITION
{
    IS_LOCAL(o.Obj)
}
COST 0;
```

TABLE IX-continued

```
EMIT
{
   addr.base = Regreg_idx_13;
   addr.imm8 = LOCAL_OFFSET(o.Obj);
}
RULE [mirObjectAddr__Nt_addr_24] o:mirObjectAddr -> d:Nt_addr;
CONDITION
{
   IS_PARAM(o.Obj)
}
COST 0;
EMIT
{
   d.base = Regreg_idx_14;
   d.imm8 = PARAM_OFFSET(o.Obj);
}
RULE [Nt_imm12__Nt_regi_25] s:Nt_imm12 -> d:Nt_regi;
COST 1;
EMIT
{
   fprintf(OUTFILE,"\t.packs \042decode;P2;C1;decode;\042,1\n");
   fprintf(OUTFILE,"\t.packs
\042FPC:(r,0);prog_mem:(r,0);FPC:(w,0);EPC:(w,1);R:(w,2);\042,2\n");
   fprintf(OUTFILE,"\t.packs \042    r%s = %d\042,3\n",REGNAME(d),s.value);
}
RULE [usepsr_Nt_regi] c:mirContent (mirObjectAddr) -> Nt_regi TEMPO;
CONDITION {
   (c.Nt == ntNt_regi) && (c.psr > 0)
}
RULE [defpsr_Nt_regi] a:mirAssign (mirObjectAddr,Nt_regi TEMPO);
CONDITION {
   (a.Nt == ntNt_regi) && (a.psr > 0)
}
   © 2003, Coware, Inc.
```

The exemplary code in table X is exemplary code for specifying spill rules that are generated in accordance with an embodiment of the present invention. A user may input information that is useable to generate such exemplary code through, for example, the spill tab 818 of the mapping dialog 810. The spill rules determine how to load/store the contents of non-terminals from/to the special spill memory location.

element box 822. The non-terminal box 824 contains the non-terminals appearing in the non-terminals dialog of FIG. 7E. With a drag and drop technique, the elements in boxes 822 and 824 can be used to construct the pattern of the mapping rule in pattern box 826. An error message is displayed if a drop was not accepted. Additionally, valid drops are confirmed.

TABLE X

```
RULE [Nt_regi__Spill_17] o:Nt_regi -> d:Spill;
COST 1;
EMIT
{
   fprintf(OUTFILE,"t.packs \042decode;P1;C1;decode;\042,1\n");
   fprintf(OUTFILE,"\t.packs
\042FPC:(r,0);prog_mem:(r,0);dc_src1:(r,0);R:(r,0);dc_src2:(r,0);R[%s]:(r,0);FPC:(w,0);dc_src1:
(w,0);dc_src2:(w,0);EPC:(w,1);data_mem:(w,1);\042,2\n",REGNAME(Regreg_idx_14));
   fprintf(OUTFILE,"\t.packs \042    dmem[ r%s + %d ] =
r%s\042,3\n",REGNAME(Regreg_idx_14),SPILL_OFFSET(d),REGNAME(o));
}
RULE [Spill__Nt_regi_18] o:Spill -> d:Nt_regi;
COST 1;
EMIT
{
   fprintf(OUTFILE,"\t.packs \042decode;P1;C1;decode;\042,1\n");
   fprintf(OUTFILE,"\t.packs
\042FPC:(r,0);prog_mem:(r,0);R[%s]:(r,0);FPC:(w,0);data_mem:(r,1);EPC:(w,1);R:
(w,2);\042,2\n",REGNAME(Regreg_idx_14));
   fprintf(OUTFILE,"t.packs \042    r%s = dmem[ r%s + %d ]
\042,3\n",REGNAME(d),REGNAME(Regreg_idx_14),SPILL_OFFSET(o));
}
   © 2003, Coware, Inc.
```

The dialog 810 of FIG. 7K also has an "extra" tab 819. Clicking on the extra tab 819 bring up a text editor that allows the inclusion of code generator description syntax.

Each mapping is specified in the instruction mapping dialog 820 depicted in FIG. 7L, in accordance with an embodiment of the present invention. The IR nodes are listed in IR The pattern box 826 of FIG. 7L illustrates an exemplary mirCompare node with two incoming non-terminals (Nt_i32) of register kind and a result non-terminal (Nt_cc) of unique kind that has an attribute (par). The incoming non-terminals could be produced by some other rules, e.g., a rule that loads a variable into a register.

The next step in creating a mapping is to give names to the nodes and non-terminals that are used in the pattern. (The nodes "o", "s1", "s2", and "d" are listed in the pattern box 826). For all operands and the result non-terminal, the user specifies a name; otherwise, the rule will not be accepted when the Ok button 821 is pressed. It is also possible to assign values, expressions, or registers to the attributes of the result non-terminal.

If the user clicks on a result non-terminal register attribute, as it is used for a register-offset addressing mode non-terminal, a register selector pops up to specify the assigned register. Clicking an integer attribute opens an editor in which the user can enter arithmetic expressions. The user can also drop compatible source IR nodes/attributes of the rule on the result non-terminal attributes. This is only allowed if a name was specified for the root node of the attribute.

In this example, the zero beside the par attribute in the pattern box 826 indicates that the instruction selector will write a zero into the non-terminal attribute if it uses this mapping rule. There are other mapping rules that consume the Nt_cc non-terminal. One of them is a rule that covers the mirNot IR node. It also produces an Nt_cc, but inverts the bits of the par attribute. Two other rules that consume a Nt_cc are the rules used to cover the mirIf IR node. The rules contain conditions that check if the par attribute is zero or not and issue a conditional jump that branches on true or on false condition.

Furthermore, by clicking on an arbitrary register non-terminal of the rule, the user can limit the register set of this non-terminal to a certain set. This might be used if the user desires to map instructions with restricted input registers to the rule. In case the result register is equal to one of the operand registers, the user can express this by choosing the same name for the result register non-terminal and the source non-terminal. The register allocator will then use the same physical register for both operands.

The instruction box 828 allows a mapping of the pattern to assembly instructions. Generally, the pattern from the pattern box 826 needs to be mapped to zero or more assembly instructions. Some rules do not need to be mapped. For example, rules producing addressing mode non-terminals are not mapped to assembly instructions. Buttons 829 near the instruction box 828 facilitate the mapping.

By clicking into the tree in the instruction box 828, the sons of LISA GROUPs can be selected. This selection is done for all groups that are part of the instruction. LISA LABELS are also part of the declaration tree. They are used to link the pattern with the instruction. By dragging the names or the attributes of the IR pattern into the LISA LABELS, a link is established. For all valid nodes except register attributes/attributes an editor appears, where the user can specify an additional arithmetic expression to modify the dropped value. It is also possible to edit the LABELS directly by double clicking them. In case of a register label, a register selector will pop up; otherwise, a normal editor will appear.

The assembly syntax of the instruction is depicted in the assembly syntax area 827 and is updated every time the declaration tree is modified. It is possible to have multi-instruction rules.

It is quite common that additional information needs to be assigned to the grammar rule. For example, the mirCompare node usually requires a condition that tests what type of comparison needs to be performed (a<b, a<=b, a==b, a !=b, a>=b, or a>b). By pressing the extended tab 825, such information can be specified in the mapping clauses dialog 830 as illustrated in FIG. 7M, in accordance with an embodiment of the present invention.

FIG. 7M illustrates an exemplary mapping clauses dialog 830, in accordance with an embodiment of the present invention. The mapping clauses dialog 830 includes an available rule clauses box 832 and a specified rule clauses box 834. The extended information may be specified by the user by clicking the elements. For example, the "CONDITION" clause has been selected from the available rules clauses box 832 and appears in the selected rules box 834. Referring to the condition clause dialog 840 of FIG. 7N, additional information is added to the condition clause, in accordance with an embodiment of the present invention. In FIG. 7N, the "o" has been selected from the MIR nodes box 842. Moreover, a condition has been selected from the conditions box 844.

A brief explanation of the rule clauses is presented below. A more detailed explanation of the rule clauses is provided in ACE Associated Compiler Experts by. BEG-CoSy® Manual, May 2003. CoSy® System Documentation.

BARRIER: Using this clause will introduce additional dependencies before (PREBARRIER) or behind the rule (POSTBARRIER). BARRIER adds both. This can be selected in the drop down menu in the parameter column. The scheduler generally will not move instructions across these barriers.

CALC: Main purpose is to calculate and assign values to the fields of compiler IR nodes.

CHANGE: This clause specifies which register beside the result register is modified by the rule.

CLOBBER: Indicates that the rule changes the value of the indicated operand, which can be selected in the opening dialog. May be used several times on a rule.

CONDITION: Adding this clause opens a dialog depicted in FIG. 7N to build a Boolean expression from a set of fixed conditions which are available for the current rule. In the MIR node box 842, the user can select one of the nodes of the rule. The conditions box 844 displays the conditions that are available for the selected node. Most of the conditions check for the data type of an operand, or for a certain data type with a specific bit-width, which can be passed as parameter the condition in another dialog. Only if the specified condition is evaluated to true during the match phase this rule will be applied.

CONTROL: Indicates a control dependency between this rule and surrounding ones. The user selects between three kinds from a drop down menu in the parameter column. "branch" and "call" are currently equivalent. The third one, "fall through", indicates that the rule is a null instruction, e.g., a fall through to the only successor basic block. This should be specified for all rules dealing with control flow, in general mirGoto, mirReturn and mirIf.

COST: Specifies the cost of this rule if it is applied. This is used by the matcher to find the optimal match for a statement. If no COST clause is specified, a default COST clause will be generated with costs of the number of assigned instructions.

EVAL: This clause cosists of a list of statements that can be entered in an editor. They will be executed during the matching phase. Useful for evaluating non-terminal attributes in this phase.

INTERFERE: Specifies the interferences of the rule operands explicitly. The register allocator will assign different physical registers for the interfering registers.

LOCK: This clause will lock the operands of the rule, e.g., a following instruction that writes the operands will stall.

OUTPUT: With this clause it can be specified which pseudo registers leave this rule alive. The clause is used for rules producing more than one result.

PREEMIT: Contains a list of C statements which will be executed during the emit phase, and is basically an escape mechanism for rules that need special preprocessing.

PREFER: The operand selected from the dialog should preferably be the same as the result register.

READ/WRITE: These clauses can be used to specify data dependencies explicitly. The MEMORY parameter indicates an operand representing a memory address, whereas the REGISTER parameter specifies dependencies through different physical registers.

RESULT: With this clause it can be specified that the result register is the same as one of the source operands. Such rules should not emit code.

SCRATCH: The user can request additional scratch (e.g., temporary) register non-terminals for the mapping. After specifying the type and amount of the scratch registers, the scratch non-terminals will appear in the mapping dialog and can be used for the mapping procedure.

UNIQUE: This clause specifies that all registers used by the rule are distinct. This includes also the registers used by addressing mode non-terminals.

Figure 8:
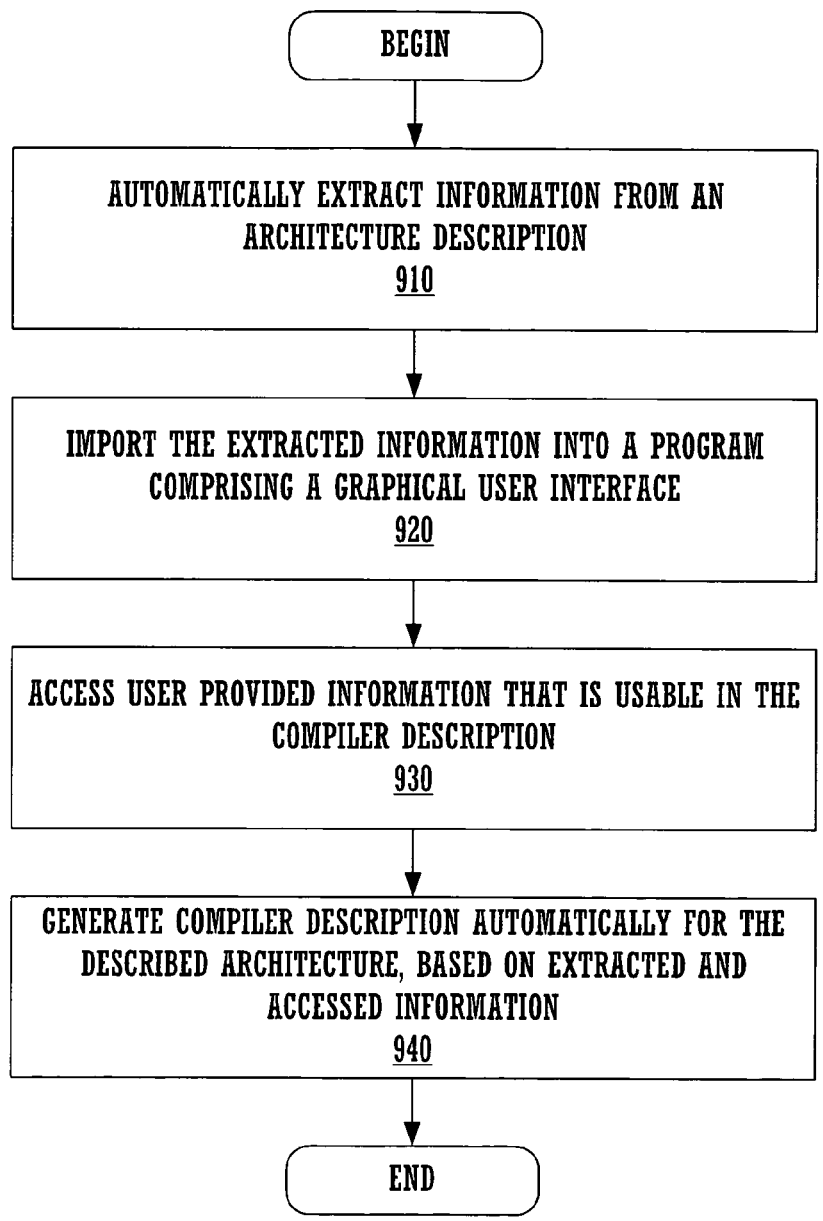
FIG. 8 is a flowchart illustrating a computer process of generating a compiler description from an architecture description, in accordance with an embodiment of the present invention.

FIG. 8 is a flowchart illustrating a process of generating a compiler description from an architecture description, in accordance with an embodiment of the present invention. Steps of process 900 of FIG. 8 may be encoded onto a computer readable medium and executed as instructions on a computer processor. In step 910, information that is usable in a description of a compiler for the described architecture automatically extracting from an architecture description. The architecture description may comprise a hierarchical format.

In step 920, the extracted information is imported into a program comprising a graphical user interface that allows a user to input additional information that is usable in the compiler description. This step may comprise automatically extracting data flow hazard and control flow hazard information from the architecture description.

In step 930, user provided information is accessed that is usable in the compiler description. If desired, user-provided modifications to the extracted information may be accessing, as well.

In step 940, the compiler description is automatically generated for the described architecture, based on the automatically extracted information and the received user provided information. If user-provided modifications were accessed in step 930, then step 940 comprises automatically generating the compiler description based on the extracted information as modified by the user. Step 940 may comprise accessing a mapping of compiler rules to instructions used in the architecture description. For example, information that is entered via a GUI is accessed.

Figure 9:
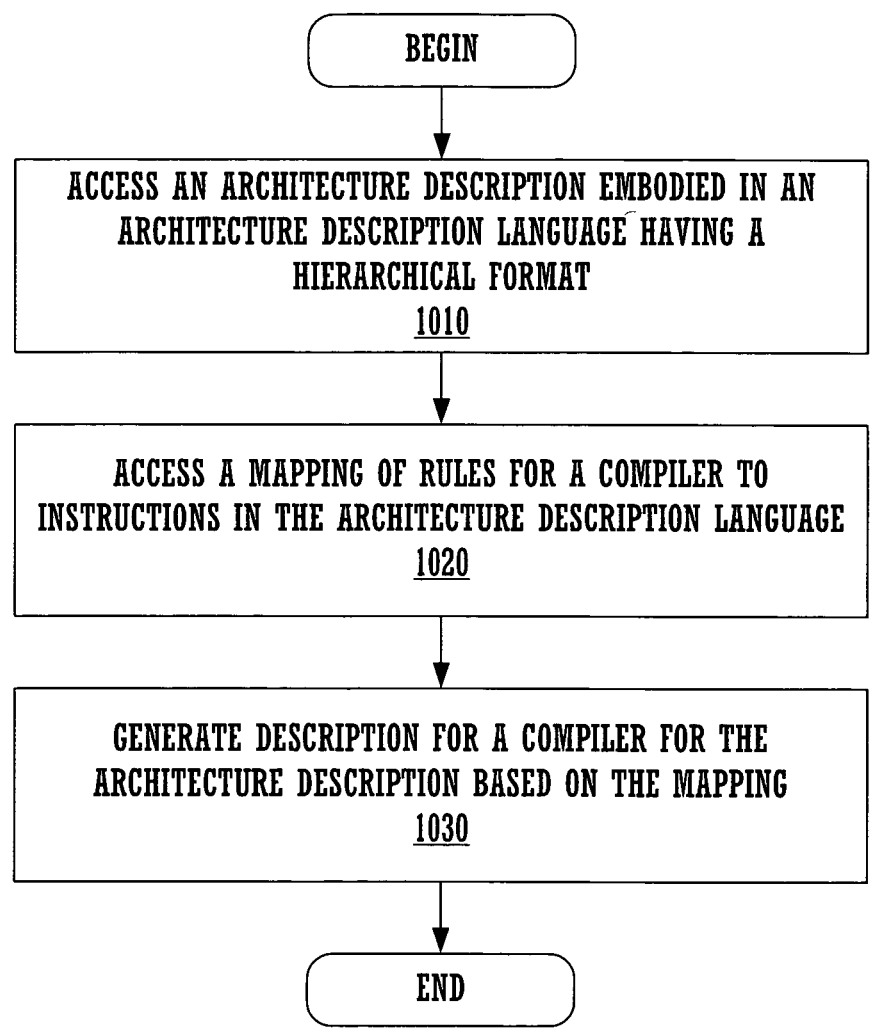
FIG. 9 is a flowchart illustrating a computer process of mapping an architecture description to a compiler description, in accordance with an embodiment of the present invention.

FIG. 9 is a flowchart illustrating a process of mapping an architecture description to a compiler description, in accordance with an embodiment of the present invention. Steps of process 1000 of FIG. 9 may be encoded onto a computer readable medium and executed as instructions on a computer processor. In step 1010, an architecture description embodied in an architecture description language having a hierarchical format is accessed. The architecture description language may comprise a hierarchy of operations.

In step 1020, a mapping of rules for a compiler to instructions in said architecture description language is accessed. For example, information that is entered via a GUI is accessed. In order to fully describe the compiler description it is also useful to provide definitions for abstract elements in the compiler description that have no direct representative in said architecture description language. For example, as discussed herein, embodiments of the present invention provide definitions for non-terminals in the compiler description that have no direct representative in the architecture description language.

In step 1030, a description for a compiler for the architecture description based on the mapping is generated, wherein said compiler description has a flattened format.

Figure 10:
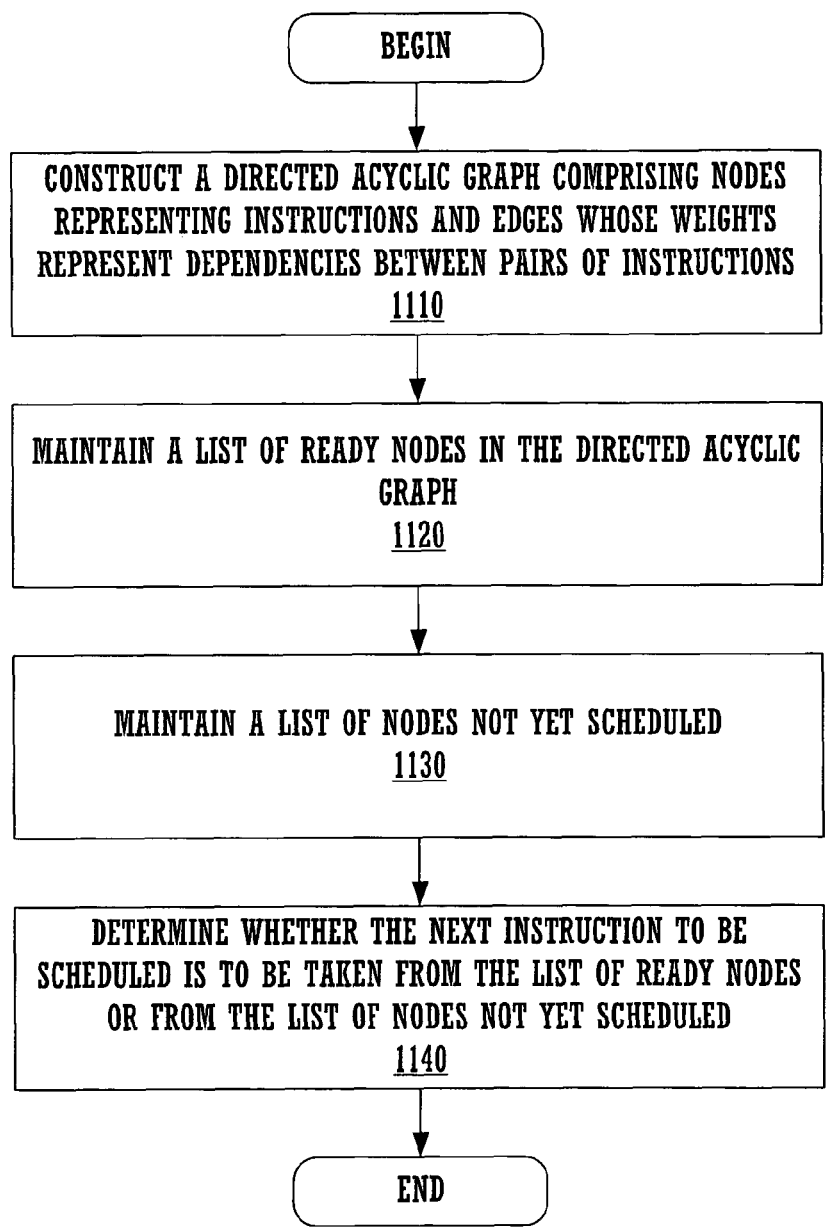
FIG. 10 is a flowchart illustrating a computer process of automatically extracting information from an architecture description, in accordance with an embodiment of the present invention.

FIG. 10 is a flowchart illustrating a process of automatically extracting information from an architecture description, in accordance with an embodiment of the present invention. Steps of process 1100 may be encoded onto a computer readable medium and executed as instructions on a computer processor. In step 1010, a directed acyclic graph is constructed comprising nodes representing instructions and edges whose weights represent dependencies between pairs of instructions.

In step 1120, a list of ready nodes in the directed acyclic graph is maintained. In step 1130, a list of nodes not yet scheduled is maintained.

In step 1140, a determination is made of whether the next instruction to be scheduled is to be taken from the list of ready nodes or from the list of nodes not yet scheduled. Step 1140 may further comprise accumulating edge weights for all paths from a given node to leaf nodes; and assigning a priority to the given node based on the path having the maximum accumulated edge weight. Step 1140 may still further comprise: if a node that has the highest priority from the list of nodes not yet scheduled has a higher priority than the priority any node in the list of ready nodes, scheduling the node that has the highest priority from the list of nodes not yet scheduled; otherwise, scheduling a node from the ready list having the highest priority. Process 1100 then ends.

For purposes of illustration Tables XI-XVIII provide exemplary architecture description input code, in accordance with an embodiment of the present invention. Table XI is exemplary input code that is a main module of an architecture description, in accordance with an embodiment of the present invention.

TABLE XI

```
#include "define.h"
%sim_include "define.h"
/*{{{RESOURCE*/
RESOURCE
{
    MEMORY_MAP
    {
        RANGE(0x0000, 0x0fff) -> prog_mem[(31..0)];
        RANGE(0x1000, 0x1fff) -> data_mem[(31..0)];
    }
    /* 0x1000 bytes of program memory */
    /* FLAGS are set to RIX meaning that prog_mem is readable and executable */
    RAM U32 prog_mem
```

TABLE XI-continued

```
    {
        SIZE(0x1000);
        BLOCKSIZE(32,8);
        FLAGS(RIX);
        /* For the synthesis only the definition of the read and write ports are required */
        /* PORT(READ=10 OR WRITE=10); */
    };
/* 0x1000 bytes of data memory */
/* FLAGS are set to RIW meaning that data_mem is readable and writable */
RAM U32 data_mem
    {
        SIZE(0x1000);
        BLOCKSIZE(32,8);
        FLAGS(RIW);
        /* For the synthesis only the definition of the read and write ports are required */
        /* PORT(READ=10 OR WRITE=10); */
    };
/* Register bank with 16 registers */
REGISTER    TClocked<U32> R[0..15];
/* Fetch program counter */
REGISTER    TClocked<U32> FPC;
/* The program counter EPC corresponds to the instruction that will be executed */
/* in the next control step. */
PROGRAM_COUNTER U32 EPC;
PIPELINE_REGISTER IN pipe
    {
        /* for load/store/branch instructions*/
        U32 address;
        /* for data processing instructions*/
        U32 operand1 ;
        U32 operand2;
        U32 result;
        /* for conditional program control instructions */
        bool branch_taken;
        /* condition flag for execution */
        bool exec_true;
        /* The following pipeline register entries are optional. */
        /* They provide a better microarchitecture implementation such as fast */
        /* branches or forwarding. If this mechanism is not desired */
        /* they can be removed */
        /* for speed up unconditional program control instructions */
        /* unconditional branches can be executed after decoding*/
        /* the conditional branch logic in EX is not required */
        bool jmp_taken;
        /* for operand forwarding only : */
        /* keep track of currently read register src1 and src2 */
        /* keep track of currently written register */
        /* enables forwarding operand from WB->EX or WB->DC if dest=srcx */
        U8 dest;
        U8 src1 ;
        U8 src2;
        /* current instruction pc and word */
         PROGRAM_COUNTER U32 pc;
        U32 insn;
        /* for post-increment load/store*/
         U8 dest_pi;
    };
/* Definition of the four stage pipeline */
PIPELINE pipe = {FE; DC; EX; WB };
/* Intermediate forwarding variables for the execute stage */
U32 alu_operand1 ;
U32 alu_operand2;
/* Intermediate forwarding variables for the decode stage */
U8 dc_src1 ;
U8 dc_src2;
U32 dc_address;
U32 dc_cond_value;
U32 dc_cond_reg;
/* Definition of units only necessary for the synthesis */
UNIT UNT_FETCH
    {
       fetch;
    };
UNIT DECODE
    {
       arithmetic, arithmetic_short,
       jmp, move,
       load_store, load_store_address,
       ex_if_equal, ex_if_notequal;
    };
```

TABLE XI-continued

```
    UNIT DMEM_AC
      {
        load, store;
      };
    UNIT ALU
      {
        alu_insn, jmp_ex;
      };
    UNIT WRITEBACK
      {
        writeback_register,writeback_post_increment_register;
      };
}
/*}}}*/
/*{{{OPERATION reset*/
OPERATION reset
{
  BEHAVIOR
    {
      /* Reset processor to a defined state */
      int i;
      /* Zero register file */
      for (i = 0 ; i < 16 ; i++)
      {
        R[i] = 0;
      }
      /* Set program counter to entry point as */
      /* specified in COFF file*/
       FPC = LISA_PROGRAM_COUNTER;
       EPC = LISA__PROGRAM_COUNTER;
      alu_operand1 = alu_operand2 = dc_address = dc_cond_value = dc_cond_reg = 0;
      dc_src1 = dc_src2 = 0;
      /* Flush the pipeline : zero all entries */
      PIPELINE(pipe).flush( );
    }
}
/*}}}*/
/*{{{ OPERATION main*/
OPERATION main
{
  /* The operation main is not assigned to a pipeline stage. */
  DECLARE
    {
      INSTANCE fetch, decode;
    }
  BEHAVIOR
    {
      /* Execute all activated operations in the pipeline */
      PIPELINE(pipe).execute( );
      PIPELINE(pipe).shift( );
      /* Difference to ISA model :*/
      /* The fetch-program counter logic is located in */
      /* the fetch operation */
    }
  /* decode and fetch are not executed in the behavior as they are */
  /* in the instruction accurate implementation, rather they are */
  /* acitvated now. The pipeline stage assignment of these */
  /* operations defines the temporal execution order */
  ACTIVATION
    {
      /* activate fetch and decode only if the pipeline is not stalled */
      if (!PIPELINE_REGISTER(pipe,FE/DC).stalled( ))
      {
        fetch, decode
      }
    }
}
/*}}}*/
/*{{{OPERATION fetch IN pipe.FE*/
OPERATION fetch IN pipe.FE
{
    BEHAVIOR
        /* We need some information from pipeline-registers which */
        /* are beyond this stage. Thus we have to declare them in */
        /* the behavior USES prolog.*/
        USES ( IN
          PIPELINE_REGISTER(pipe,DC/EX).jmp_taken,
          PIPELINE_REGISTER(pipe,DC/EX).address,
          PIPELINE_REGISTER(pipe,EX/WB).branch_taken,
          PIPELINE_REGISTER(pipe,EX/WB).address; )
```

TABLE XI-continued

```
{
    /* Difference to ISA model :*/
        /* The fetch logic is more complex than in the instruction accurate model because
we distinguish between conditional and unconditional branches. To speed up the program,
execution of unconditional branches are taken after decoding and conditional branches after
evaluating the condition in the execute stage */
        U32 next_pc=FPC;
        /* fetch program counter multiplexer */
        /* Check if an unconditional branch instruction has been */
        /* decoded before. This is indicated by the jmp_taken flag.*/
        /* The branch instruction is now in the EX stage */
        if(PIPELINE_REGISTER(pipe,DC/EX).jmp_taken){
            /* Set the next pc to be fetched */
            next_pc=PIPELINE_REGISTER(pipe,DC/EX).address;
        }
        else
        /* Check if a conditional branch instruction has been */
        /* decoded before. This is indicated by the branch_taken flag.*/
        /* The branch instruction is now in the WB stage */
        if(PIPELINE_REGISTER(pipe,EX/WB).branch_taken){
            /* Set the next pc to be fetched */
            next_pc=PIPELINE_REGISTER(pipe,EX/WB).address;
        }
        /* get the instruction word from the program memory and*/
        /* put it together with the pc into the pipeline register */
        PIPELINE_REGISTER(pipe,FE/DC).insn = prog_mem[ next_pc ];
        PIPELINE_REGISTER(pipe,FE/DC).pc   = next_pc ;
        /* fill pipeline register with default values */
        PIPELINE_REGISTER(pipe,FE/DC).exec_true=true;
        /* increment the fetch program counter */
        next_pc += 1;
        FPC=next_pc;
    }
}
/*}}}*/
/*{{{INSTRUCTION decode IN pipe.DC*/
INSTRUCTION decode IN pipe.DC
{
    /* Start of the instruction set description */
    DECLARE
        {
            GROUP instruction = {
            load_store    II /* st, ld */
            arithmetic    II /* add, sub, mul */
            arithmetic_short II /* add, sub, mul (short forms)*/
            move    II /* mov */
            jmp     II /* jmp */
            compare II /* cmp */
            nop     /* nop */
            };
            /* Execution condition, may be defined for every instruction */
            GROUP ex_cond = { ex_if_equal II ex_if_notequal II ex_uncond };
            /* an operation just for setting the pc in the debugger */
            INSTANCE set_debugger_epc;
        }
    /* The current instruction word is in "PIPELINE_REGISTER(pipe,FE/DC).insn".*/
    /* The current instruction word is at "PIPELINE_REGISTER(pipe,FE/DC).pc".*/
    /* An instruction is composed by a condition and an instruction */
    CODING AT (PIPELINE_REGISTER(pipe,FE/DC).pc)
        {
            PIPELINE_REGISTER(pipe,FE/DC).insn == ex_cond instruction
        }
    SYNTAX
        {
            ex_cond instruction
        }
    ACTIVATION
        {
            ex_cond, instruction, set_debugger_epc
        }
    /* Difference to ISA model :*/
    /* The instruction condition is evaluated in the next stage EX.*/
    /* Thus, we do not decide here in DC if instruction should be*/
    /* activated or not. Instead, we check it in EX.*/
}
/*}}}*/
/*{{{OPERATION set_debugger_epc IN pipe.EX*/
OPERATION set_debugger_epc IN pipe. EX
{
    BEHAVIOR
```

TABLE XI-continued

```
        {
          if (PIPELINE_REGISTER(pipe,DC/EX).exec_true)
          {
            EPC = PIPELINE_REGISTER(pipe,DC/EX).pc;
          }
        }
      }
    }
/*}}}*/
    © 2003, Coware, Inc.
```

Table XII is exemplary code that is an operands module of an architecture description, in accordance with an embodiment of the present invention.

TABLE XII

```
*******************************************************
#include "define.h"
OPERATION addr8
{
  /* 8-bit absolute address */
  DECLARE
  {
    LABEL addr;
  }
  CODING { addr=0bx[8] }
  SYNTAX { SYMBOL(addr=#S8) }
  EXPRESSION {addr }
}
OPERATION branch_addr_imm20 IN pipe.DC
{
  /* 20-bit relative address */
  DECLARE
  {
    LABEL addr;
  }
  CODING { 0b0 addr=0bx[20] }
  SYNTAX { SYMBOL(((addr=#S20)+CURRENT_ADDRESS)
=#X32 ) }
  BEHAVIOR {
      /* Extract the branch address */
      /* Relative address */
      dc_address=(SIGN_EXTEND_20(addr)) + PIPELINE_
REGISTER(pipe,FE/DC).pc ;
  }
}
OPERATION branch_addr_reg IN pipe.DC
{
  /* register address */
  DECLARE
  {
    INSTANCE reg_idx;
  }
  CODING {0bi 0b0000 0b0000 0b0000 0b0000 reg_idx }
  SYNTAX {reg_idx }
  BEHAVIOR {
      /* Extract the branch address */
      /* Absolute address */
      READ_REGISTER(reg_idx,dc_address);
  }
}
OPERATION imm12
{
  /* 12-bit immediate value */
  DECLARE
  {
    LABEL value;
  }
  CODING { value=0bx[12] }
  SYNTAX { SYMBOL( value=#S12 ) }
  EXPRESSION { value }
}
OPERATION imm16
{
  /* 16-bit immediate value */
  DECLARE
  {
```

TABLE XII-continued

```
    LABEL value;
  }
  CODING { value=0bx[16] }
  SYNTAX { SYMBOL( value=#S16 ) }
  EXPRESSION { value }
}
//OPERATION reg_idx
REGISTER reg_idx
{
  /* register */
  DECLARE
  {
    LABEL index;
  }
  CODING { index=0bx[4] }
  SYNTAX { "r" ~index=#U }
  EXPRESSION { index }
}
OPERATION cond_reg_idx
{
  /* register */
  DECLARE
  {
    LABEL index;
  }
  CODING { index=(0bx[2]) }
  SYNTAX { "r" ~index=#U }
  EXPRESSION { index }
}
    © 2003, Coware, Inc.
*******************************************************
```

Table XIII is exemplary input code that is a load/store module of an architecture description, in accordance with an embodiment of the present invention.

TABLE XIII

```
*******************************************************
#include "define.h"
OPERATION load_store IN pipe.DC
{
  DECLARE {
      /* opcode : load or store */
      GROUP opcode = { load || store };
      /* source or destination register. */
      GROUP load_store_reg= { reg_idx };
      /* load or store address */
      INSTANCE load_store_address;
      /* storing : try forward the register value from the WB stage
*/
      INSTANCE read_register_or_forward_dc;
  }
  CODING { opcode load_store_reg load_store_address}
  SWITCH(opcode)
  {
    CASE load :
    {
      SYNTAX { load_store_reg "=" "dmem[" load_
store_address "]" }
      BEHAVIOR
      {
          /* in case of loading the destination register is stored for
writing back the result */
```

TABLE XIII-continued

```
        PIPELINE_REGISTER(pipe,DC/EX).dest=load_store_reg;
        }
    }
    CASE store :
    {
        SYNTAX {"dmem[" load_store_address "]" "="
load_store_reg }
        BEHAVIOR
        {
            /* in case of storing the source register value is loaded */
            /* prepare the signals for forwarding */
            dc_src1=load_store_reg;
            dc_src2=0;
            /* forward the register value from the WB stage */
            /* otherwise read value from the the register file */
            read_register_or_forward_dc( );
        }
    }
    ACTIVATION
    {
        /* prepare the address used for either loading or storing*/
        load_store_address,
        /* perform the load or store operation */
        opcode
    }
}
OPERATION load IN pipe.EX
{
    DECLARE {
        /* write-back the loaded value to the destination register */
        INSTANCE writeback_register;
    }
    CODING {0b01110000 }
    BEHAVIOR
    {
        /* load from data memory at <address> into the result field */
        PIPELINE_REGISTER(pipe,EX/WB).result=data_mem
[PIPELINE_REGISTER(pipe,DC/EX).address&0xfff];
    }
    ACTIVATION
    {
        /* write-back the result to the destination register */
        writeback_register
    }
}
OPERATION store IN pipe.EX
{
    CODING {0b01100000 }
    BEHAVIOR
    {
        /* store the store-operand prepared in DC into data
memory at <address> */
        data_mem[PIPELINE_REGISTER(pipe,DC/EX).
address&0xfff]=PIPELINE_
REGISTER(pipe,DC/EX).operand1;
    }
}
OPERATION load_store_address IN pipe. DC
{
    DECLARE {
        GROUP base_reg = {reg_idx };
        /* addressing modes*/
        /* A regular mode and also a mode */
        /* with post increment of the*/
        /* address register is provided. */
        GROUP address_mode = {mode_normal ||
mode_post_increment };
        /* 8-bit address */
        INSTANCE addr8;
        /* write-back the post increment register */
        INSTANCE writeback_post_increment_register;
    }
    CODING {address_mode base_reg addr8 }
    SWITCH (address_mode) {
        CASE mode_normal :
        {
            /* normal addressing */
            SYNTAX {base_reg "+" addr8 }
            BEHAVIOR {
                U32 address;
                READ_REGISTER(base_reg,address);
                address+=SIGN_EXTEND_8(addr8);
                PIPELINE_REGISTER(pipe,DC/EX).address=address;
            }
        }
        CASE mode_post_increment:
        {
            /* post increment addressing */
            SYNTAX {base_reg ~"+=" addr8 }
            BEHAVIOR {
                U32 address;
                READ_REG ISTER(base_reg,address);
                PIPELINE_REGISTER(pipe,DC/EX).address =address;
                /* post increment the base register and write-back */
                PIPELINE_REGISTER(pipe,DC/EX).operand2=
address+SIGN_EXTEND_8(addr8);
                PIPELINE_REGISTER(pipe,DC/EX).dest_pi =base_reg;
            }
            ACTIVATION
            {
                writeback_post_increment_register
            }
        }
    }
}
/** The following operation comprises the regular mode for a load/
store operation */OPERATION mode_normal
{
    CODING {0b0000}
}
/** The following operation comprises the post-increment mode
for a load/store operation. */OPERATION mode_post_increment
{
    CODING {0b0001}
}
/** Operation to move data to a register */
OPERATION move IN pipe.DC
{
    DECLARE
    {
        /* Destination register */
        GROUP dest_reg = {reg_idx };
        /* 16bit constant to be loaded */
        INSTANCE imm16;
        INSTANCE move_ex;
    }
    CODING { 0b01010000 dest_reg imm16 }
    SYNTAX { dest_reg "=" imm16 }
    BEHAVIOR
    {
        /* Assign "imm16" to source operand one "src1" */
        PIPELI NE_REGISTER(pipe,DC/EX).result=SIGN_
EXTEND_16(imm16);
        PIPELINE_REGISTER(pipe,DC/EX).dest=dest_reg;
    }
    ACTIVATION
    {
        move_ex
    }
}
OPERATION move_ex IN pipe.EX
{
    DECLARE
    {
        /* Result-writeback operation */
        INSTANCE writeback_register;
    }
    ACTIVATION
    {
        /* check the result of the instruction condition evaluated in DC
*/
        if(PIPELINE_REGISTER(pipe,DC/EX).exec_true)
        {
            // Write-back "dest" to destreg
            writeback_register
        }
    }
}
```

TABLE XIII-continued

```
© 2003, Coware, Inc.
*********************************************************
```

Table XIV is exemplary input code that is a data forwarding module of an architecture description, in accordance with an embodiment of the present invention.

TABLE XIV

```
*********************************************************
#include "define.h"
OPERATION read_register_or_forward_dc IN pipe.DC
{
/* Operand forwarding from WB to DC */
BEHAVIOR USES (IN PIPELINE_REGISTER
(pipe,EX/WB).result,
    PIPELINE_REGISTER(pipe,EX/WB).dest;)
    {
    /* check if the source operand register has been written in EX
in the previous cycle */
    if(dc_src1!=0){
    /* check if the operand register is going to be written
in the WB stage */
        if((dc_src1==PIPELINE_REGISTER(pipe,EX/WB).dest))
        {
        /* forward the result from the WB stage */
PIPELINE_REGISTER(pipe,DC/EX).operand1=PIPELINE_
REGISTER(pipe,EX/WB).result;
        }
        else{
        /* get the register value from the register file */
        READ_REGISTER(dc_src1,PIPELINE_REGISTER
(pipe,DC/EX).operand1);
        }
    }
    if(dc_src2!=0){
    /* check if the operand register is going to be written
in the WB stage */
        if((dc_src2==PIPELINE_REGISTER(pipe,EX/WB).dest))
        {
        /* forward the result from the WB stage */
PIPELINE_REGISTER(pipe,DC/EX).operand2=PIPELINE_
REGISTER(pipe,EX/WB).result;
        }
        else{
        /* get the register value from the register file */
        READ_REGISTER(dc_src2,PIPELINE_REGISTER
(pipe,DC/EX).operand2);
        }
    }
}
OPERATION prepare_alu_operand_try_forward_ex IN pipe.EX
{
/* Operand forwarding from WB to EX */
BEHAVIOR USES (IN PIPELINE_REGISTER
(pipe,EX/WB).result,
    PIPELINE_REGISTER(pipe,EX/WB).dest;)
    {
    /* check if the operand register is going to be written
in the WB stage */
    if((PIPELINE_REGISTER(pipe,EX/WB).dest==PIPELINE_
REGISTER(pipe,DC/EX).src1 )&&
        (PIPELINE_REGISTER(pipe,DC/EX).src1!=0))
        {
        /* forward the result from the WB stage */
        alu_operand1=PIPELINE_REGISTER(pipe,EX/WB).result;
        }
        else
        {
        alu_operand1=PIPELINE_REGISTER(pipe,DC/EX).operand1;
        }
    if
    ((PIPELINE_REGISTER(pipe,EX/WB).dest==PIPELINE_
REGISTER(pipe,DC/EX).src2)&&
        (PIPELINE_REGISTER(pipe,DC/EX).src2!=0))
        {
        /* forward the result from the WB stage */
```

TABLE XIV-continued

```
        alu_operand2=PIPELINE_REGISTER(pipe,EX/WB).result;
        }
        else
        {
        alu_operand2=PIPELINE_REGISTER(pipe,DC/EX).
operand2;
        }
    }
}
OPERATION read_conditon_register_or_forward_dc IN pipe.DC
{
/* Operand forwarding from WB to DC */
BEHAVIOR USES ( IN
    PIPELINE_REGISTER(pipe,EX/WB).result,
    PIPELINE_REGISTER(pipe,EX/WB).dest;
    )
    {
    /* check if the operand register is going to be
written in the WB stage */
        if(PIPELINE_REGISTER(pipe,EX/WB).
dest!=dc_cond_reg){
        /* Assign the first source register to source
operand one "src1" */
        READ_REGISTER(dc_cond_reg,dc_cond_value);
        }
        else{
        /* forward the result from the EX stage */
        dc_cond_value=PIPELINE_REGISTER
(pipe,EX/WB).result;
        }
    }
}
© 2003, Coware, Inc.
*********************************************************
```

Table XV is exemplary input code that is a control-flow module of an architecture description, in accordance with an embodiment of the present invention.

TABLE XV

```
*********************************************************
#include "define.h"
/** The jump is a special case of the branches. Here the control
transfer instruction is executed unconditional.*/
/*{{{OPERATION jmp IN pipe.DC*/
OPERATION jmp IN pipe.DC
{
    DECLARE
    {
        GROUP branch_addr ={ branch_addrimm20
|| branch_addr_reg};
        REFERENCE ex_cond;
        INSTANCE jmp_ex;
    }
    CODING {0b0100000 branch_addr }
    SYNTAX {"jmp"~" " branch_addr }
BEHAVIOR {
    /* Extract the branch address */
    branch_addr( );
}
IF(ex_cond==ex_uncond) THEN
{
    /* Immediate branch in decode stage */
    BEHAVIOR
    {
    /* set branch taken flag */
    PIPELINE_REGISTER(pipe,DC/EX).jmp_taken=true;
    PIPELINE_REGISTER(pipe,DC/EX).address=dc_address;
    }
    ACTIVATION
    {
    /* flush the currently fetched instruction */
    PIPELINE_REGISTER(pipe,FE/DC).flush( )
    }
}
ELSE
{
```

TABLE XV-continued

```
  /* the branch is conditional */
  BEHAVIOR
  {
    /* propagate the address to the execute stage*/
    PIPELINE_REGISTER(pipe,DC/EX).address=dc_address;
  }
  ACTIVATION
  {
    jmp_ex,
    /* stall the pipeline until the condition is evaluated in EX */
    PIPELINE_REGISTER(pipe,FE/DC).stall( )
  }
 }
}
/*}}}*/
/*{{{OPERATION jmp_ex IN pipe.EX*/
OPERATION jmp_ex IN pipe.EX
{
  BEHAVIOR
  {
    if(PIPELINE_REGISTER(pipe,DC/EX).exec_true)
    {
      /* set branch taken flag */
      PIPELINE_REGISTER(pipe,EX/WB).branch_taken=true;
    }
  }
  ACTIVATION
  {
    if(PIPELINE_REGISTER(pipe,DC/EX).exec_true)
    {
      PIPELINE_REGISTER(pipe,FE/DC).flush( ),
      PIPELINE_REGISTER(pipe,DC/EX).flush( )
    }
  }
}
/*}}}*/
© 2003, Coware, Inc.
**********************************************
```

Table XVI is exemplary input code that is a compare module of an architecture description, in accordance with an embodiment of the present invention.

TABLE XVI

```
**********************************************
#include "define.h"
/*{{{OPERATION compare IN pipe.DC*/
OPERATION compare IN pipe.DC
{
  DECLARE
  {
    /* CMPU instructions */
    INSTANCE cmp_insn;
    /* First source register and destination register */
    GROUP src1_reg = {reg_idx };
    /* Operand two: can be a register or an
immediate value */
    GROUP src2_reg_or_imm={src2 reg || /* register */
      src2_imm }; /* immediate */
    GROUP dest_reg ={cond_reg_idx };
    /* operand forwarding operation for stage DC */
    INSTANCE read_register_or_forward_dc;
  }
  CODING {0b0000 cmp_insn dest_reg 0bi src2_
reg_or_imm src1 _reg }
  SYNTAX {dest_reg "=" "(" src1_reg cmp_
insn src2_reg_or_imm ")"}
  BEHAVIOR
  {
    /* Prepare variable which stores the index of source
    register 1, this variable is used for forwarding from
    WB to DC */dc_src1 = src1_reg;
    /* Prepare source operand two "src2"*/
    src2_reg_or_imm( );
    /* Get register contents or forward from WB*/
    read_register_or_forward_dc( );
    /* Put the destination and source register */
```

TABLE XVI-continued

```
    /* index into the pipe to allow forwarding to EX */
    PIPELINE_REGISTER(pipe,DC/EX).dest=dest_reg;
    PIPELINE_R EGISTER(pipe,DC/EX).src1=dc_src1 ;
  }
  ACTIVATION
  {
    /* Activate the CMPU */
    cmp_insn
  }
}
/*}}}*/
/*{{{OPERATION cmp_insn IN pipe.EX*/
OPERATION cmp_insn IN pipe.EX
{
  DECLARE
  {
    /* Condition code */
    GROUP insn = { CMP_EQ || CMP_NE || CMP_
GE || CMP_LT || CMP_GT || CMP_LE };
    /* operand forwarding operation for stage EX */
    INSTANCE prepare_alu_operand_try_forward_ex;
    /* write-back the result to the destination register */
    INSTANCE writeback_register;
  }
  CODING { insn }
  SYNTAX { insn }
  BEHAVIOR
  {
    /* check if a forward from EX is available*/
    /* prepare the ALU operands alu_operand1 and
alu_operand2 */
    prepare_alu_operand_try_forward_ex( );
    /* execute the CMP instruction*/
    insn( );
  }
  ACTIVATION
  {
    /* writeback the result to the destination register */
    /* which is in the "dest" field of the pipeline-reg.*/
    writeback_register
  }
}
/*}}}*/
/*{{{OPERATION CMP_EQ IN pipe.EX*/
OPERATION CMP_EQ IN pipe.EX
{
  CODING { 0b0001 }
  SYNTAX { "==" }
  BEHAVIOR
  {
    PIPELINE_REGISTER(pipe,EX/WB).result =
(alu_operand1 ==alu_operand2) ? 1 : 0;
  }
}
/*}}}*/
/*{{{OPERATION CMP_NE IN pipe.EX*/
OPERATION CMP_NE IN pipe.EX
{
  CODING {0b0010 }
  SYNTAX {"!=" }
  BEHAVIOR
  {
    PIPELINE_REGISTER(pipe,EXIWB).result =
(alu_operand1 !=alu_operand2) ? 1 : 0;
  }
}
/*}}}*/
/*{{{OPERATION CMP_GE IN pipe.EX*/
OPERATION CMP_GE IN pipe.EX
{
  CODING {0b0011 }
  SYNTAX {">=" }
  BEHAVIOR
  {
    PIPELINE_REGISTER(pipe,EX/WB).result =
(alu_operand1 >=alu_operand2) ? 1 : 0;
  }
}
/*}}}*/
/*{{{OPERATION CMP_LE IN pipe.EX*/
```

TABLE XVI-continued

```
OPERATION CMP_LE IN pipe.EX
{
   CODING {0b0100 }
   SYNTAX {"<=" }
   BEHAVIOR
   {
      PIPELINE_REGISTER(pipe,EX/WB).result =
(alu_operand1 <=alu_operand2) ? 1 : 0;
   }
}
/*}}}*/
/*{{{OPERATION CMP_GT IN pipe.EX*/
OPERATION CMP_GT IN pipe.EX
{
   CODING {0b0101 }
   SYNTAX {">"~" "}
   BEHAVIOR
   {
      PIPELINE_REGISTER(pipe,EX/WB).result =
(alu_operand1 >alu_operand2) ? 1 : 0;
   }
}
/*}}}*/
/*{{{OPERATION CMP_LT IN pipe.EX*/
OPERATION CMP_LT-IN pipe.EX
{
   CODING {0b0110 }
   SYNTAX {">"~" "}
   BEHAVIOR
   {
      PIPELINE_REGISTER(pipe,EX/WB).result =
(alu_operand1 < alu_operand2) ? 1 : 0;
   )
}
/*}}}*/
© 2003, Coware, Inc.
*************************************************
```

Table XVII is exemplary input code that is an arithmetic module of an architecture description, in accordance with an embodiment of the present invention.

TABLE XVII

```
*************************************************
#include "define.h"
/*{{{OPERATION arithmetic IN pipe.DC*/
OPERATION arithmetic IN pipe.DC
{
   DECLARE
   {
      /* ALU instructions */
      INSTANCE alu_insn;
      /* First source register and destination register */
      GROUP src1_reg, dest_reg ={reg_idx };
      /* Operand two: can be a register or an
immediate value */
      GROUP src2_reg_or_imm={src2 reg || /* register */
         src2_imm }; /* immediate */
      /* operand forwarding operation for stage DC */
      INSTANCE read_register_or_forward_dc;
   }
   CODING {alu_insn 0b000 src2_reg_or_imm src1_
reg dest_reg }
   SYNTAX {dest_reg reg "=" src1_reg alu_insn src2_
reg_or_imm }
   BEHAVIOR
   {
      /* Prepare variable which stores the index of source
register 1, this variable is used for forwarding from
WB to DC */
      dc_src1=src1_reg;
      /* Prepare source operand two "src2" */
      src2_reg_or_imm( );
      /* Get register contents or forward from WB*/
      read_register_or_forward_dc( );
      /* Put the destination and source register */
      /* index into the pipe to allow forwarding to EX */
```

TABLE XVII-continued

```
      PIPELINE_REGISTER(pipe,DC/EX).dest=dest_reg;
      PIPELINE_REGISTER(pipe,DC/EX).src1=dc_src1 ;
   }
   ACTIVATION
   {
      /* Activate the ALU */
      alu_insn
   }
}
/*}}}*/
/*{{{ALIAS OPERATION arithmetic_short IN pipe.DC*/
ALIAS OPERATION arithmetic_short IN pipe.DC
{
   /* This operation is implemented for convenience to the
assembly programmer*/
   /* Here the destination register and the first source
register are the same. */
   /* F.i.: r1+=2 */
   DECLARE
   {
      /* ALU instructions */
      INSTANCE alu_insn;
      */ Destination register == source register 1*/
      GROUP dest_reg ={reg_idx };
      /* Operand two: can be a register or an
immediate value */
      GROUP src2_reg_or_imm ={ src2 reg || */ register */
         src2_imm }; /* immediate */
      /* operand forwarding operation for stage DC */
      INSTANCE read_register_or_forward_dc;
   }
   CODING { alu_insn 0b000 src2_reg_or imm dest_
reg dest_reg }
   SYNTAX { dest_reg alu_insn ~"=" src2_reg_or_imm }-
   BEHAVIOR
   {
      /* Prepare variable that stores the index of source
register 1, this variable is used for forwarding from
EX to DC */
      dc_src1=dest_reg;
      /* Prepare source operand two "src2" */
      src2_reg_or_imm( );
      /* Get register contents or forward from WB*/
      read_register_or_forward_dc( );
      /* Put the destination and source register */
      /* index into the pipe to allow forwarding to EX */
      PIPELINE_REGISTER(pipe,DC/EX).dest=dc_src1;
      PIPELINE_REGISTER(pipe,DC/EX).src1=dc_src1;
   }
   ACTIVATION
   {
      /* Activate the ALU */
      alu_insn
   }
}
/*}}}*/
/*{{{OPERATION alu_insn IN pipe.EX*/
OPERATION alu_insn IN pipe.EX
{
   DECLARE
   {
      /* alu instruction type */
      GROUP insn ={add || sub || mul || and || or ||
xor || (shift || rshift};
      /* operand forwarding operation for stage EX */
      INSTANCE prepare_alu_operand_try_forward_ex;
      /* write-back the result to the destination register */
      INSTANCE writeback_register;
   }
   CODING { insn }
   SYNTAX { insn }
   BEHAVIOR
   {
      /* check the instruction condition evaluated in DC */
      if(PIPELINE_REGISTER(pipe,DC/EX).exec_true)
      {
         /* check if a forward from EX is available*/
         /* prepare the ALU operands alu_operand1 and
alu_operand2 */
         prepare_alu_operand_try_forward_ex( );
```

TABLE XVII-continued

```
        /* execute the ALU instruction*/
        insn( );
      }
    }
    ACTIVATION
    {
      /* check the instruction condition evaluated in DC */
      if(PIPELINE_REGISTER(pipe,DC/EX).exec_true)
      {
        /* writeback the result to the destination register */
        /* which is in the "dest" field of the pipeline-reg.*/
        writeback_register
      }
    }
  }
/*}}}*/
/** This operation implements the addition. */
/*{{{OPERATION add IN pipe.EX*/
OPERATION add IN pipe.EX
{
  CODING {0b1000 }
  SYNTAX {"+" }
  BEHAVIOR
  {
    /* perform add */
    PIPELINE_REGISTER(pipe,EX/WB).result=alu_
operand1 + alu_operand2;
  }
}
/*}}}*/
/** This operation implements the subtraction.*/
/*{{{OPERATION sub IN pipe.EX*/
OPERATION sub IN pipe.EX
{
  CODING {0b1001 }
  SYNTAX {"−" }
  BEHAVIOR
  {
    /* perform subtraction */
    PIPELINE_REGISTER(pipe,EX/WB).result=alu_
operand1 - alu_operand2;
  }
}
/*}}}*/
/** This operation implements the multiplication. */
/*{{{OPERATION mul IN pipe.EX*/
OPERATION mul IN pipe.EX
{
  CODING {0b1010 }
  SYNTAX {"*" }
  BEHAVIOR
  {
    /* perform multiplication */
    PIPELINE_REGISTER(pipe,EX/WB).result=alu_
operand1 * alu_operand2;
  }
}
/*}}}*/
/** This operation implements or.*/
/*{{{OPERATION or IN pipe.EX*/
OPERATION or IN pipe.EX
{
  CODING {0b1011 }
  SYNTAX {"I" }
  BEHAVIOR
  {
    /* perform multiplication */
    PIPELINE_REGISTER(pipe,EX/WB).result=alu_
operand1lalu_operand2;
  }
}
/*}}}*/
/** This operation implements and. */
/*{{{ OPERATION and IN pipe.EX*/
OPERATION and IN pipe.EX
{
  CODING {0b1100 }
  SYNTAX {"&" }
  BEHAVIOR
  {
    /* perform multiplication */
    PIPELINE_REGISTER(pipe,EX/WB).result=alu_
operand1&alu_operand2;
  }
}
/*}}}*/
/** This operation implements xor. */
/*{{{ OPERATION xor IN pipe.EX*/
OPERATION xor IN pipe.EX
{
  CODING {0b1101 }
  SYNTAX {"^" }
  BEHAVIOR
  {
    /* perform multiplication */
    PIPELINE_REGISTER(pipe,EX/WB).result=alu_
operand1^alu_operand2;
  }
}
/*}}}*/
/** This operation implements logical left shift. */
/*{{{OPERATION Ishift IN pipe.EX*/
OPERATION (shift IN pipe.EX
{
  CODING {0b1110 }
  SYNTAX {"<<" }
  BEHAVIOR
  {
    /* perform multiplication */
    PIPELINE_REGISTER(pipe,EX/WB).result=alu_
operand1<<alu_operand2;
  }
}
/*}}}*/
/** This operation implements logical right shift. */
/*{{{OPERATION rshift IN pipe.EX*/
OPERATION rshift IN pipe.EX
{
  CODING {0b1111 }
  SYNTAX {">>" }
  BEHAVIOR
  {
    /* perform multiplication */
    PIPELINE_REGISTER(pipe,EX/WB).result=alu_
operand1>>alu_operand2;
  }
}
/*}}}*/
/** The second operand for an arithmetic operation may
be a register value. This operation implements the second
operand for an arithmetic operation as a register.*/
/*{{{OPERATION src2_reg IN pipe.DC*/
OPERATION src2_reg IN pipe.DC
{
  /* Just register operand */
  DECLARE {
    INSTANCE reg_idx ;
  }
  CODING {0b0 0b00000000 reg_idx }
  SYNTAX {reg_idx }
  BEHAVIOR
  {
    /* Prepare variable which stores the index of
source register 1, */
    /* this variable is used for forwarding from
EX to DC */
    dc_src2=reg_idx;
    /* Put the source register index into the pipe */
    /* to allow forwarding to EX */
    PIPELINE_REGISTER(pipe,DC/EX).src2=dc_src2;
  }
}
/*}}}*/
/** The second operand for an arithmetic operation may
be an immediate value. This operation implements the
second operand for an arithmetic operation as an
immediate value.*/
/*{{{OPERATION src2_imm IN pipe.DC*/
OPERATION src2_imm IN pipe.DC
{
```

TABLE XVII-continued

```
        /* just immediate operand, register is 0 */
        DECLARE{
            INSTANCE imm12 ;
        }
        CODING {0b1 imm12 }
        SYNTAX {imm12 }
        BEHAVIOR {
            /* no register involved, avoid forward -> 0 */
            dc src2=0;
            PIPELINE_REGISTER(pipe,DC/EX).src2=dc_src2;
            /* Prepare source operand two "src2 */
            PIPELINE_REGISTER(pipe,DC/EX).operand2=
        SIGN_EXTEND_12(imm12)
            }
        }
        /*}}}*/
        © 2003, Coware, Inc.
        ****************************************************
```

Table XVIII is exemplary input code that is a miscellaneous module of an architecture description, in accordance with an embodiment of the present invention.

TABLE XVIII

```
****************************************************
#include "define.h"
/** This operation implements the no-operation instruction.
Thus, nothing is processed.
*/
OPERATION nop IN pipe.DC
{
    CODING {0b0000 0b0000 0b0000 0bx[4] 0bx[12] }
    SYNTAX {"nop" }
    BEHAVIOR {
        // Do nothing
    }
}
/** This operation is intended to write the result
back to the destination register. */
OPERATION writeback_register IN pipe.WB
{
    BEHAVIOR {
        /* Write back the result to the destination register */
        WRITE_REGISTER(PIPELINE_REGISTER(pipe,EX/WB).
        dest,PIPELINE_REGISTER(pipe,EX/WB).result);
    }
}
/** This operation is intended to write a post incremented
address back to a register. */
    OPERATION writeback_post_increment_register IN pipe.WB
    {
    BEHAVIOR {
        /* Write back the result to the destination register */
        WRITE_REGISTER(PIPELINE_REGISTER(pipe,EX/WB).
        dest_pi,PIPELINE_REGISTER(pipe,EX/VVB).operand2);
    }
}
/** Here, the operation is processed unconditional,
thus, in any case.*/
OPERATION ex_uncond IN pipe.DC
{
    CODING {0b00 0bxx }
    SYNTAX {~" " " "}
    BEHAVIOR {
        // Nothing
    }
}
/** In this case the operation is only executed if the execution
condition register is unequal zero.*/
OPERATION ex_if_equal IN pipe.DC
{
    DECLARE
    {
        INSTANCE cond_reg_idx;
        INSTANCE read_conditon_register_or_forward_dc;
    }
    CODING {0b10 cond_reg_idx }
```

TABLE XVIII-continued

```
    SYNTAX {"if" "(" ~cond_reg_idx ~")" " " }
    BEHAVIOR
    {
        dc_cond_reg=cond_reg_idx;
        if(dc_cond_reg!=0){
            read_conditon_register_or_forward_dc( );
            PIPELINE_REGISTER(pipe,DC/EX).exectrue.
    (dc_cond_value!=0);
        }
        else{
            PIPELINE_REGISTER(pipe,DC/EX).exec_true=0;
        }
    }
}
/** In this case the operation is only executed if the execution
condition register is equal zero.*/
    OPERATION ex_if_notequal IN pipe.DC
    {
    DECLARE
    {
        INSTANCE cond_reg_idx;
        INSTANCE read_conditon_register_or_forward_dc;
    }
    CODING {0b11 cond_reg_idx }
    SYNTAX {"if" "(" "!" ~cond_reg_idx ~")" }
    BEHAVIOR
    {
        dc_cond_reg=cond_reg_idx;
        if(dc_cond_reg!=0){
            read_conditon_register_or_forward dc( );
            PIPELINE_REGISTER(pipe,DC/EX).exec_
    true=(dc_cond_value==0);
        }
        else{
            PIPELINE_REGISTER (pipe, DC/EX).exec_true=0;
        }
    }
}
© 2003, Coware, Inc.
****************************************************
```

Figure 11:
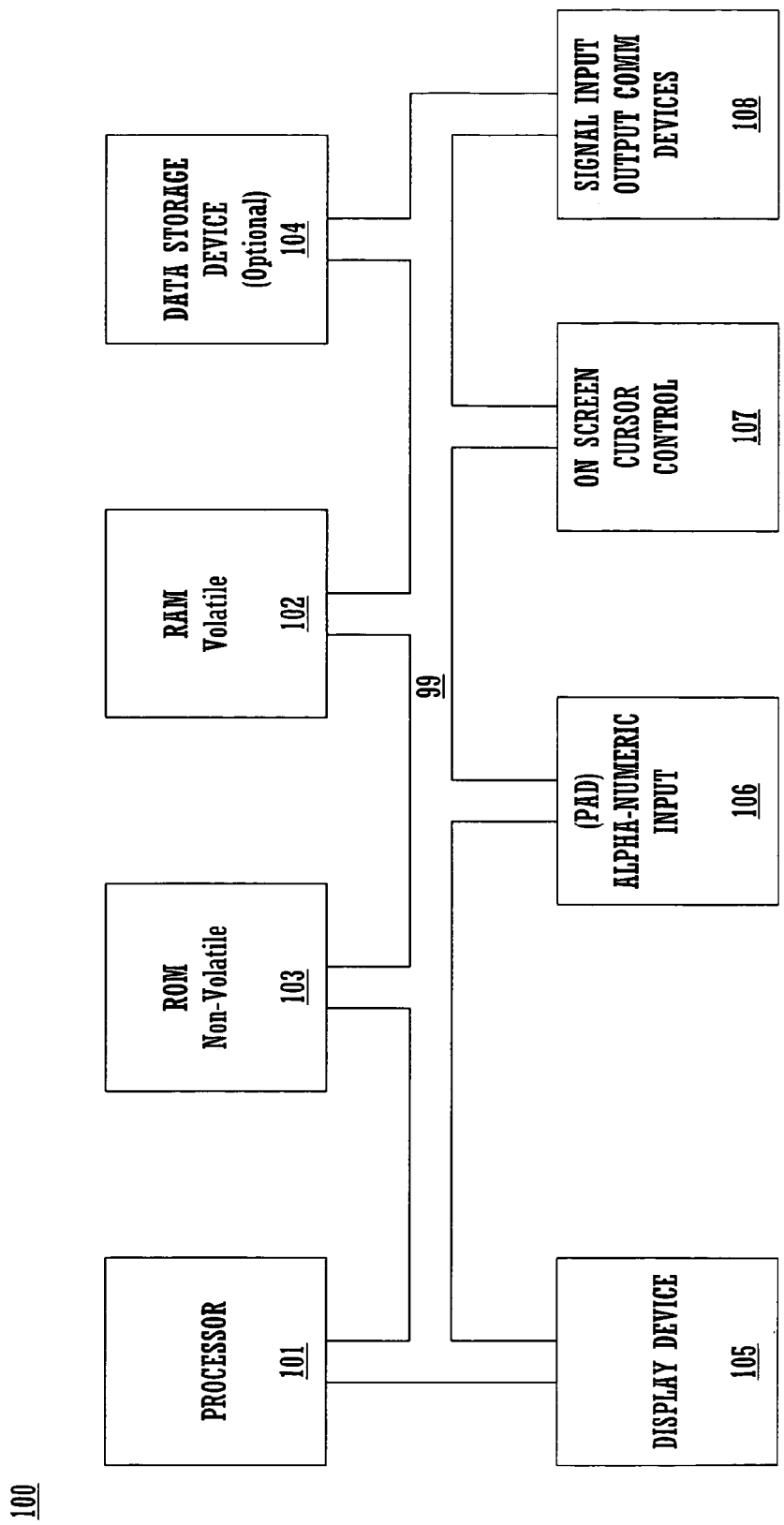
FIG. 11 is an exemplary computer system that may serve as a platform upon which embodiments of the present invention may be executed.

FIG. 11 illustrates circuitry of an exemplary computer system 100, which may form a platform for embodiments of generating a compiler description from an architecture description, using a GUI. The compiler 180, Ipacker 184, and assembler/linker, as well as the compiler environment 170, of FIG. 1 may also be implemented using computer system 100. The compiler generator with GUI 160 of FIG. 1 may be implemented by computer system 100. Computer system 100 includes an address/data bus 99 for communicating information, a central processor 101 coupled with the bus for processing information and instructions, a volatile memory 102 (e.g., random access memory RAM) coupled with the bus 99 for storing information and instructions for the central processor 101 and a non-volatile memory 103 (e.g., read only memory ROM) coupled with the bus 99 for storing static information and instructions for the processor 101. Computer system 100 also includes an optional data storage device 104 (e.g., a magnetic or optical disk and disk drive) coupled with the bus 99 for storing information and instructions.

With reference still to FIG. 11, system 100 also includes an alphanumeric input device 106 including alphanumeric and function keys coupled to bus 99 for communicating information and command selections to central processor unit 101. System 100 also includes a cursor control device 107 coupled to bus 99 for communicating user input information and command selections to central processor unit 101. System 100 of the present embodiment also includes a display device 105 coupled to bus 99 for displaying information. A signal input/output communication device 108 coupled to bus 99 provides communication with external devices.

The preferred embodiment of the present invention, a process and system for semi-automatically generating a compiler description from an architecture description are thus described. While the present invention has been described in particular embodiments, it should be appreciated that the present invention should not be construed as limited by such embodiments, but rather construed according to the below claims.

What is claimed is:

1. A computer-implemented method of scheduling instructions, comprising:

maintaining a memory resident directed acyclic graph comprising nodes representing instructions and the nodes connected via edges whose weights represent dependencies between pairs of instructions;

maintaining a ready list that includes ready nodes currently in the graph that have no predecessor node in the graph and have not been scheduled, a priority associated with each ready node in the ready list, wherein for at least one of the ready nodes the associated priority is determined based on the weights of one or more edges connected to the ready node in the graph;

maintaining a non-scheduled list that includes non-scheduled nodes currently in the graph that have not been scheduled and are not included in the ready list, a priority associated with each non-scheduled node included in the non-scheduled list, wherein for at least one of the non-scheduled nodes the associated priority is determined based on the weights of one or more edges connected to the non-scheduled node in the graph; and automatically determining whether the next node to be scheduled is to be taken from the ready list or from the non-scheduled list, the determining further comprising:

identifying a non-scheduled node with the highest priority among the non-scheduled nodes included in the non-scheduled list;

scheduling the identified non-scheduled node in response to the priority associated with the identified non-scheduled node being higher than the priority associated with each ready node included in the ready list, and scheduling a ready node with the highest priority among the ready nodes included in the ready list in response to the priority associated with the identified non-scheduled node not being higher than the priority associated with each ready node included in the ready list.

2. The method of claim 1, wherein the maintaining of the graph comprises automatically extracting information from an architecture description to construct the directed acyclic graph data structure.

3. The method of claim 2, wherein the information comprises data flow hazards.

4. The method of claim 1, wherein determining a priority associated with a node included in the graph comprises:

accumulating edge weights for paths from the node to leaf nodes; and assigning the priority to the node based on the path having the maximum accumulated edge weight.

5. The method of claim 1, wherein the dependencies comprise read after write, write after write, and write after read.

6. The method of claim 1, wherein the node scheduled is a father node of nodes that have zero latency.

7. A computer system comprising a processor and a non-transitory computer readable medium coupled to the processor via a bus, wherein the non-transitory computer readable medium comprises instructions that when executed by the process processor implement a method of scheduling instructions, comprising:

maintaining a memory resident directed acyclic graph comprising nodes representing instructions and the nodes connected via edges whose weights represent dependencies between pairs of instructions;

maintaining a ready list that includes ready nodes currently in the graph that have no predecessor node in the graph and have not been scheduled, a priority associated with each ready node in the ready list, wherein for at least one of the ready nodes the associated priority is determined based on the weights of one or more edges connected to the ready node in the graph;

maintaining a non-scheduled list that includes non-scheduled nodes currently in the graph that have not been scheduled and are not included in the ready list, a priority associated with each non-scheduled node included in the non-scheduled list, wherein for at least one of the non-scheduled nodes the associated priority is determined based on the weights of one or more edges connected to the non-scheduled node in the graph; and automatically determining whether the next node to be scheduled is to be taken from the ready list or from the non-scheduled list, the determining further comprising:

identifying a non-scheduled node with the highest priority among the non-scheduled nodes included in the non-scheduled list, scheduling the identified non-scheduled node in response to the priority associated with the identified non-scheduled node being higher than the priority associated with each ready node included in the ready list, and scheduling a ready node with the highest priority among the ready nodes included in the ready list in response to the priority associated with the identified non-scheduled node not being higher than the priority associated with each ready node included in the ready list.

8. The computer system of claim 7, wherein the maintaining of the graph comprises automatically extracting information from an architecture description to construct the directed acyclic graph data structure.

9. The computer system of claim 8, wherein the information comprises data flow hazards.

10. The computer system of claim 7, wherein determining a priority associated with a node included in the graph comprises:

accumulating edge weights for paths from the node to leaf nodes; and assigning the priority to the node based on the path having the maximum accumulated edge weight.

11. The computer system of claim 7, wherein the dependencies comprise read after write, write after write, and write after read.

12. A non-transitory computer readable medium having stored thereon instructions that when executed on a computer processor implement a method of scheduling instructions, comprising:

maintaining a memory resident directed acyclic graph comprising nodes representing instructions and the nodes connected via edges whose weights represent dependencies between pairs of instructions;

maintaining a ready list that includes ready nodes currently in the graph that have no predecessor node in the graph and have not been scheduled, a priority associated with each ready node in the ready list, wherein for at least one of the ready nodes the associated priority is determined based on the weights of one or more edges connected to the ready node in the graph;

maintaining a non-scheduled list that includes non-scheduled nodes currently in the graph that have not been scheduled and are not included in the ready list, a priority associated with each non-scheduled node included in the non-scheduled list, wherein for at least one of the non-scheduled nodes, the associated priority is determined based on the weights of one or more edges connected to the non-scheduled node in the graph; and automatically determining whether the next node to be scheduled is to be taken from the ready list or from the non-scheduled list, the determining further comprising:

identifying a non-scheduled node with the highest priority among the non-scheduled nodes included in the non-scheduled list, scheduling the identified non-scheduled node in response to the priority associated with the identified non-scheduled node being higher than the priority associated with each ready node included in the ready list, and scheduling a ready node with the highest priority among the ready nodes included in the ready list in response to the priority associated with the identified non-scheduled node not being higher than the priority associated with each ready node included in the ready list.

13. The computer readable medium of claim 12, wherein the maintaining of the graph comprises automatically extracting information from an architecture description to construct the directed acyclic graph data structure.

14. The computer readable medium of claim 13, wherein the information comprises data flow hazards.

15. The computer readable medium of claim 12, wherein determining a priority associated with a node included in the graph comprises:

accumulating edge weights for paths from the node to leaf nodes; and assigning the priority to the given node based on the path having the maximum accumulated edge weight.

* * * * *